(12) United States Patent
Abe et al.

(10) Patent No.: US 12,228,479 B2
(45) Date of Patent: Feb. 18, 2025

(54) GAS COLLECTION DEVICE AND GAS DETECTION SYSTEM

(71) Applicant: KYOCERA Corporation, Kyoto (JP)

(72) Inventors: Shinichi Abe, Uji (JP); Daisuke Ueyama, Nara (JP); Etsuro Shimizu, Uji (JP)

(73) Assignee: KYOCERA Corporation, Kyoto (JP)

( * ) Notice: Subject to any disclaimer, the term of this patent is extended or adjusted under 35 U.S.C. 154(b) by 454 days.

(21) Appl. No.: 17/599,522

(22) PCT Filed: Mar. 26, 2020

(86) PCT No.: PCT/JP2020/013786
§ 371 (c)(1),
(2) Date: Sep. 28, 2021

(87) PCT Pub. No.: WO2020/203682
PCT Pub. Date: Oct. 8, 2020

(65) Prior Publication Data
US 2022/0146379 A1    May 12, 2022

(30) Foreign Application Priority Data

| Mar. 29, 2019 | (JP) | 2019-066721 |
| Apr. 24, 2019 | (JP) | 2019-083105 |
| Aug. 28, 2019 | (JP) | 2019-155821 |

(51) Int. Cl.
*G01N 1/24* (2006.01)
*E03D 9/052* (2006.01)

(52) U.S. Cl.
CPC ............... *G01N 1/24* (2013.01); *E03D 9/052* (2013.01); *G01N 2001/242* (2013.01); *G01N 2001/245* (2013.01)

(58) Field of Classification Search
CPC ............... G01N 1/24; G01N 2001/242; G01N 2001/245; G01N 1/44; E03D 9/052; E03D 9/05; A47K 17/00
(Continued)

(56) References Cited

U.S. PATENT DOCUMENTS

| 4,586,201 A * | 5/1986 | Todd, Jr. ................. E03D 9/052 |
| | | 4/213 |
| 10,188,246 B1 * | 1/2019 | Ciotic .................. A47K 13/307 |

(Continued)

FOREIGN PATENT DOCUMENTS

| CN | 202896500 U | 4/2013 |
| CN | 105569149 A * | 5/2016 |

(Continued)

*Primary Examiner* — Robert R Raevis
(74) *Attorney, Agent, or Firm* — Procopio, Cory, Hargreaves & Savitch LLP

(57) ABSTRACT

A gas collection device is installed in a toilet including a toilet seat and a toilet bowl. The gas collection device includes a flow path connected to a predetermined tank, and an introduction portion that introduces a sample gas into the flow path. The introduction portion is located between the toilet seat and the toilet bowl, or located inside or above the toilet seat. The introduction portion does not protrude toward an inside of the toilet bowl from a rim portion of the toilet bowl when located between the toilet seat and the rim portion. The introduction portion does not protrude toward the inside of the toilet bowl from the toilet seat when located inside or above the toilet seat.

9 Claims, 44 Drawing Sheets

(58) Field of Classification Search
USPC ........ 73/23.34, 863, 863.31, 863.81, 863.83,
73/863.84, 864, 864.34, 864.73, 864.81;
604/317, 319, 322; 600/562; 4/300, 314,
4/347–352
See application file for complete search history.

(56) References Cited

U.S. PATENT DOCUMENTS

| | | |
|---|---|---|
| 10,571,470 B2 | 2/2020 | Hasegawa et al. |
| 2008/0040842 A1* | 2/2008 | Sanabria ................. E03D 9/052 |
| | | 4/213 |
| 2015/0137569 A1 | 5/2015 | Goedert |
| 2017/0152655 A1* | 6/2017 | Abunameh ............... E03D 9/05 |

FOREIGN PATENT DOCUMENTS

| | | | | |
|---|---|---|---|---|
| CN | 105780898 B | * | 11/2017 | |
| CN | 108442483 A | * | 8/2018 | ........... A47K 13/307 |
| DE | 19752976 A1 | | 6/1998 | |
| JP | 60-22577 U | | 2/1985 | |
| JP | 3-54220 Y2 | | 11/1991 | |
| JP | H9-311097 A | | 12/1997 | |
| JP | 2000-291100 A | | 10/2000 | |
| JP | 2001-336199 A | | 12/2001 | |
| JP | 2003270242 A | * | 9/2003 | |
| JP | 2016-145809 A | | 8/2016 | |
| JP | 2018-40701 A | | 3/2018 | |
| KR | 20090043779 A | * | 5/2009 | |
| KR | 101368088 B1 | * | 2/2014 | |

\* cited by examiner

FIG. 10
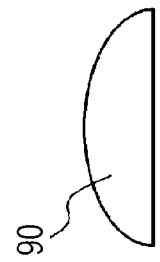
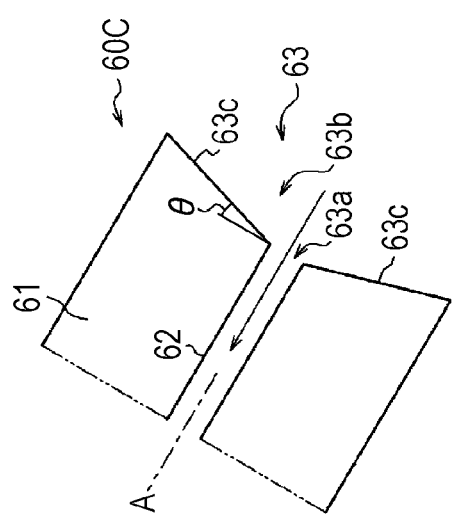

FIG. 24
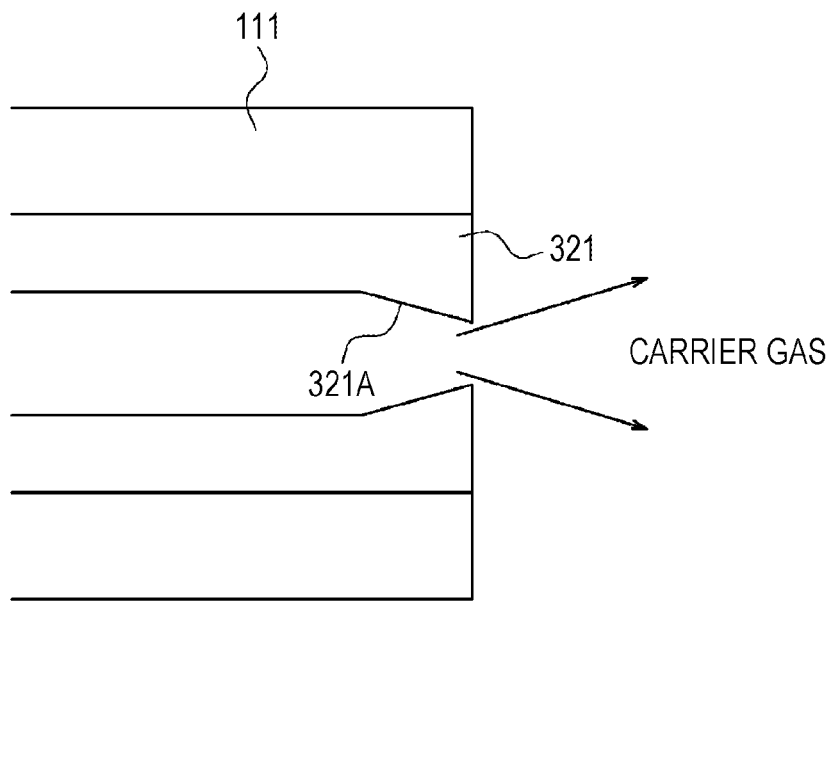
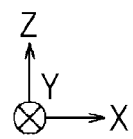
FIG. 25
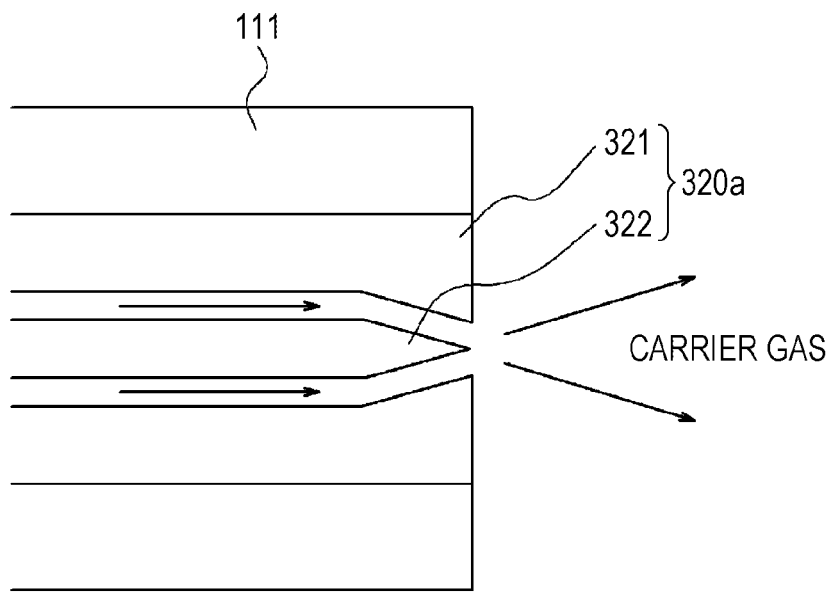
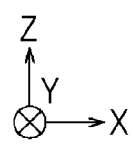

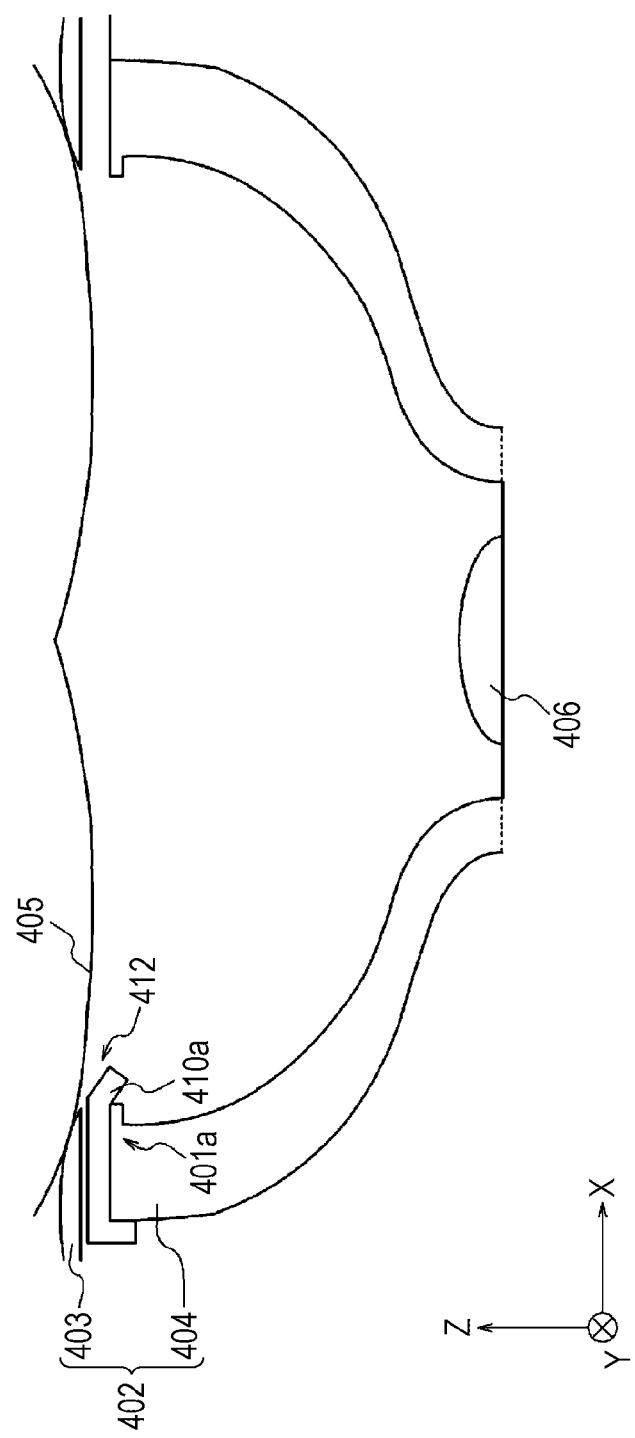

GAS COLLECTION DEVICE AND GAS DETECTION SYSTEM

CROSS REFERENCES TO RELATED APPLICATIONS

The present application claims priority to Japanese Patent Application No. 2019-083105 filed in Japan on Apr. 24, 2019, Japanese Patent Application No. 2019-066721 filed in Japan on Mar. 29, 2019, and Japanese Patent Application No. 2019-155821 filed in Japan on Aug. 28, 2019, the entire disclosure of which is incorporated herein by reference.

TECHNICAL FIELD

The present disclosure relates to a gas collection device and a gas detection system.

BACKGROUND ART

Conventionally, a known system detects an odiferous gas generated from feces discharged by a subject (for example, PTL 1).

CITATION LIST

Patent Literature

PTL 1: Japanese Unexamined Patent Application Publication No. 2016-145809

SUMMARY OF INVENTION

A gas collection device according to an embodiment of the present disclosure is a gas collection device installed in a toilet including a toilet seat and a toilet bowl, the gas collection device including:
 a flow path connected to a predetermined tank; and
 an introduction portion that introduces a sample gas into the flow path and that is located between the toilet seat and the toilet bowl or located inside or above the toilet seat.
 The introduction portion
 does not protrude toward an inside of the toilet bowl from a rim portion of the toilet bowl when located between the toilet seat and the rim portion, and
 does not protrude toward the inside of the toilet bowl from the toilet seat when located inside or above the toilet seat.
 A gas detection system according to an embodiment of the present disclosure includes:
 a sensor unit that outputs a voltage corresponding to a concentration of a specific gas; and
 a gas collection device that collects a sample gas to be supplied to the sensor unit.
 The gas collection device is installed in a toilet including a toilet seat and a toilet bowl, the gas collection device including
 a flow path connected to a predetermined tank, and
 an introduction portion that introduces the sample gas into the flow path and that is located between the toilet seat and the toilet bowl or located inside or above the toilet seat.
 The introduction portion
 does not protrude toward an inside of the toilet bowl from a rim portion of the toilet bowl when located between the toilet seat and the rim portion, and
 does not protrude toward the inside of the toilet bowl from the toilet seat when located inside or above the toilet seat.

BRIEF DESCRIPTION OF DRAWINGS

FIG. 10 is a view illustrating another example of the gas collection device illustrated in FIG. 4.
FIG. 24 is a cross-sectional view of an ejector taken along line L4-L4 illustrated in FIG. 23.
FIG. 25 is a cross-sectional view of an ejector of another example taken along line L4-L4 illustrated in FIG. 23.

FIG. 45 is a schematic view of a gas detection device according to a modification of the present disclosure.

DESCRIPTION OF EMBODIMENTS

In conventional systems, there is room for improvement of a device or the like that collects a gas.

The present disclosure relates to providing an improved gas collection device and an improved gas detection system.

According to an embodiment of the present disclosure, an improved gas collection device and an improved gas detection system can be provided.

Embodiments according to the present disclosure will be described below with reference to the drawings. Each drawing is schematically illustrated.

First Embodiment

Figure 1:
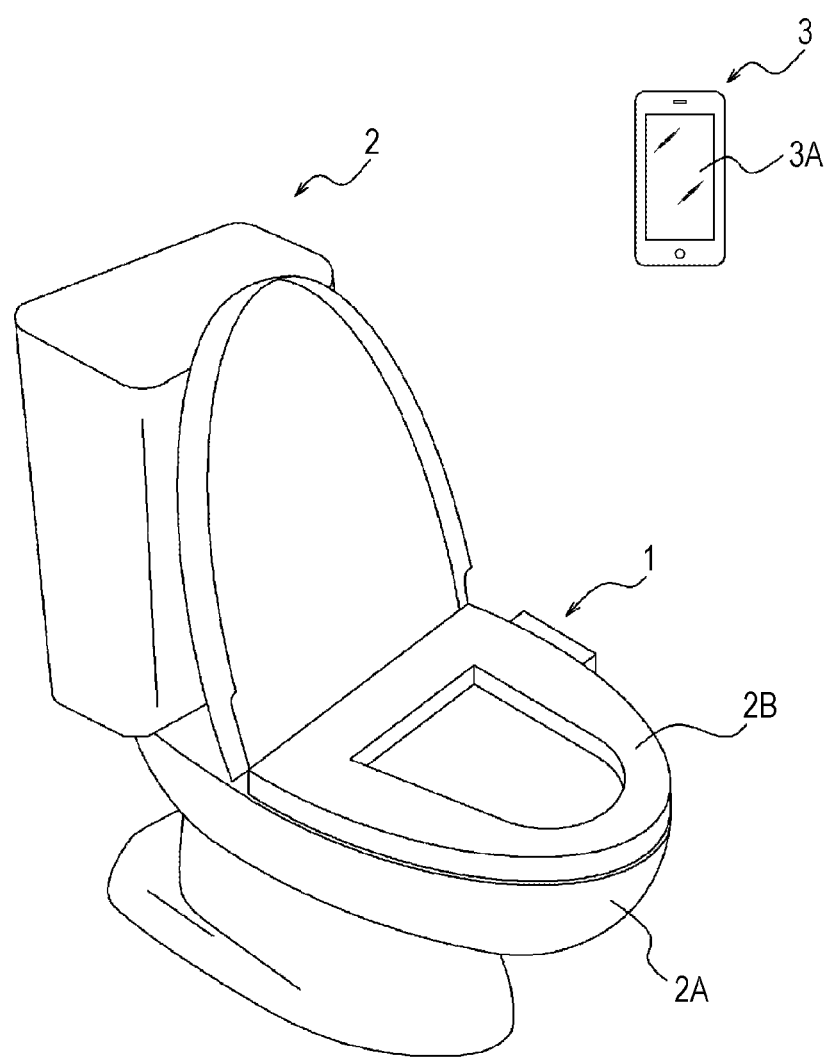
FIG. 1 is an external view of a gas detection system according to a first embodiment of the present disclosure.
Figure 2:
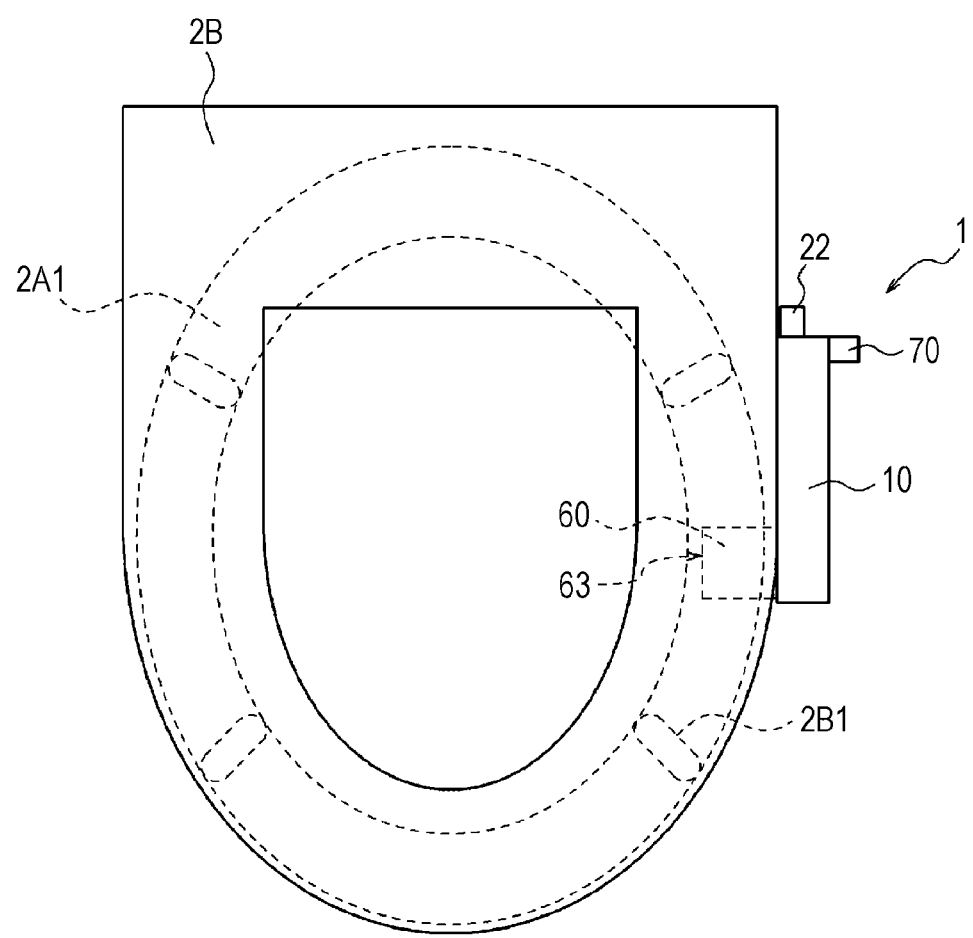
FIG. 2 is a partial top view of a configuration illustrated in FIG. 1.
Figure 3:
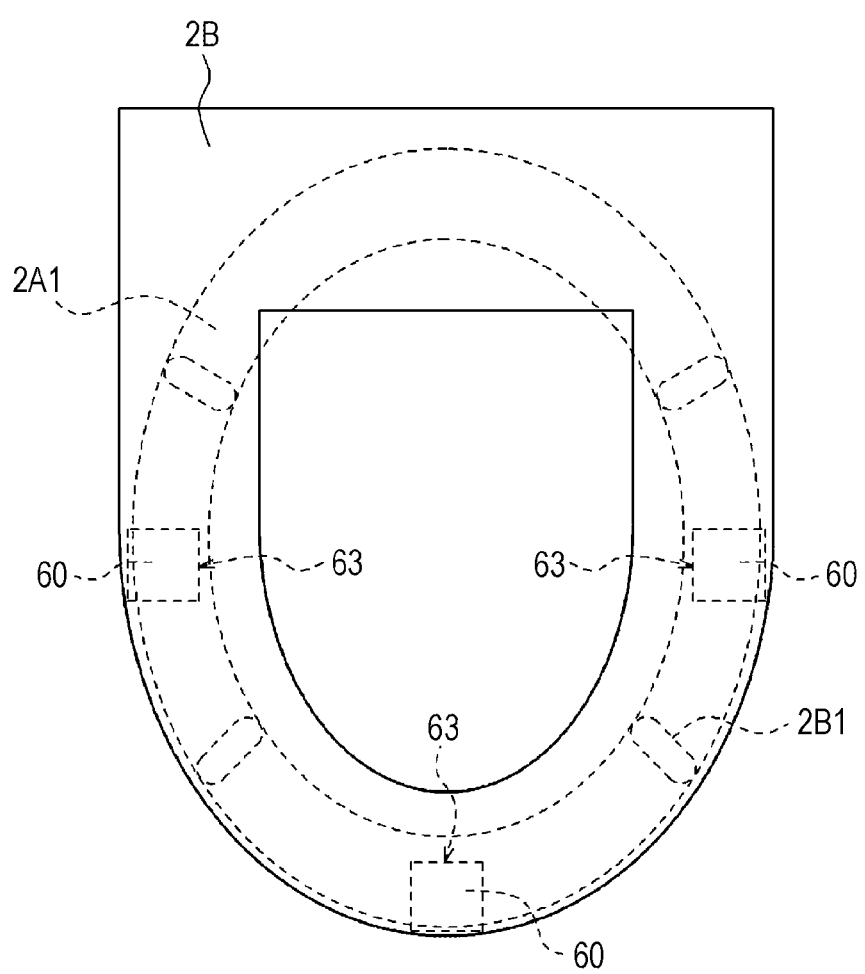
FIG. 3 is a partial top view illustrating another example of the configuration illustrated in FIG. 1.
Figure 4:
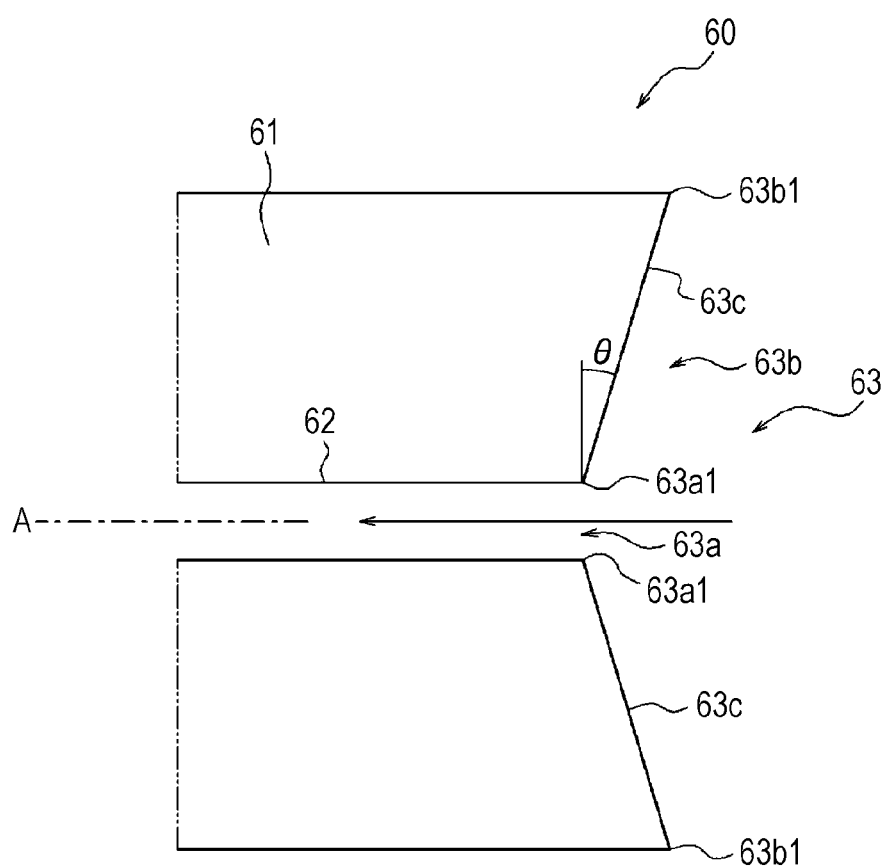
FIG. 4 is a partial cross-sectional view of a gas collection device illustrated in FIG. 2.
Figure 5:
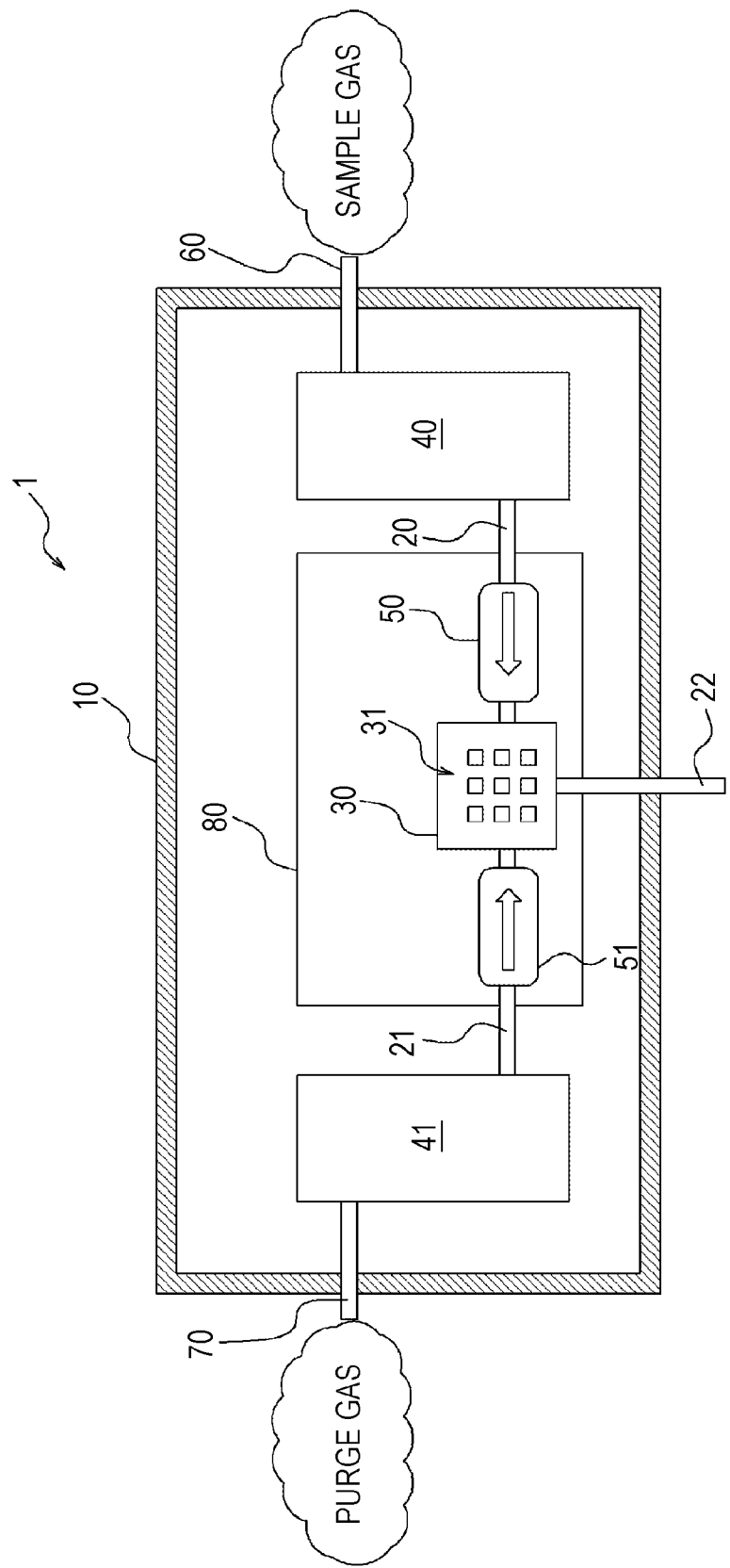
FIG. 5 is a schematic diagram of the gas detection system illustrated in FIG. 1.
Figure 6:
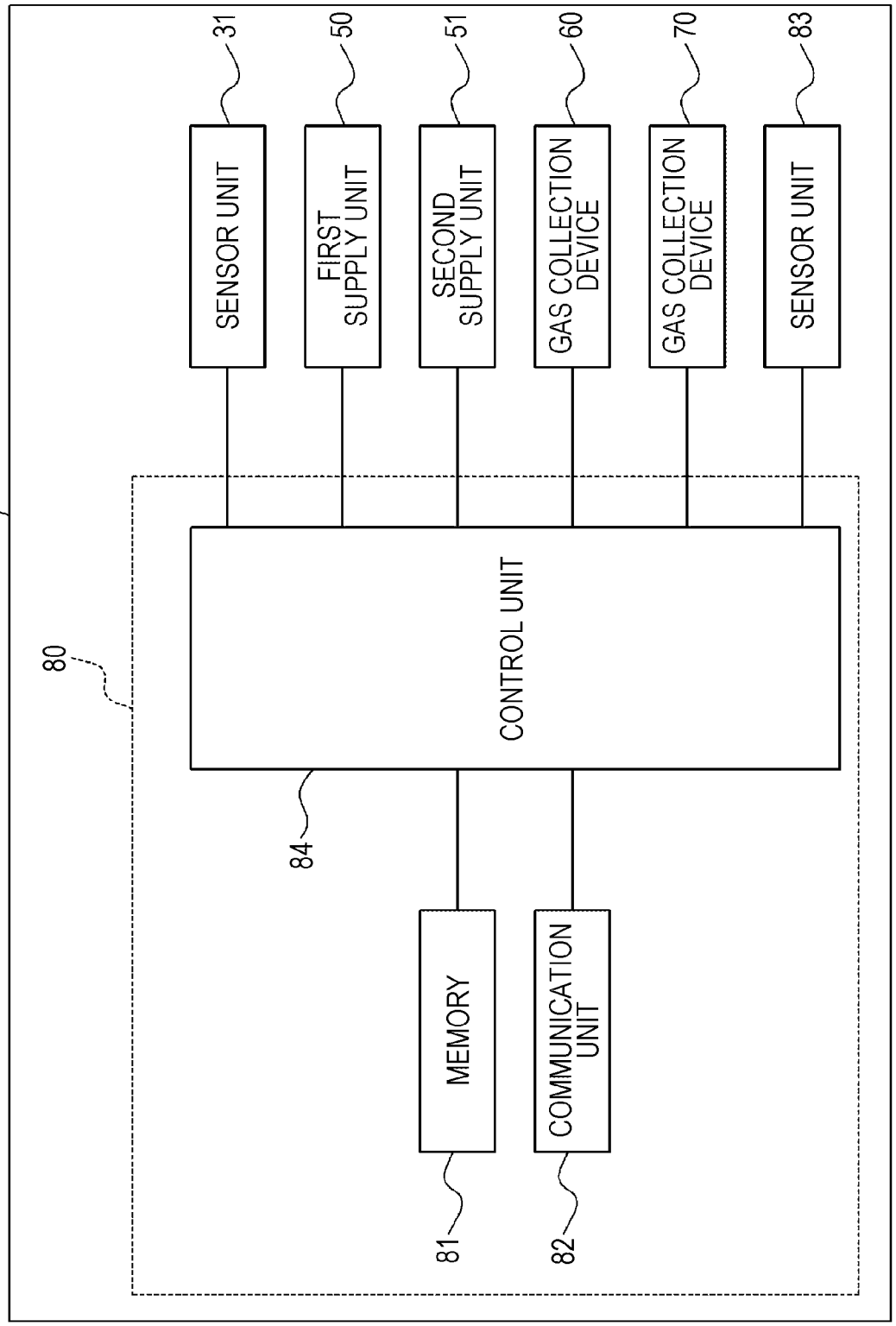
FIG. 6 is a functional block diagram of the gas detection system illustrated in FIG. 1.

FIG. 1 is an external view of a gas detection system 1 according to a first embodiment of the present disclosure. FIG. 2 is a partial top view of a configuration illustrated in FIG. 1. FIG. 3 is a partial top view illustrating another example of the configuration illustrated in FIG. 1. FIG. 4 is a partial cross-sectional view of a gas collection device 60 illustrated in FIG. 2. FIG. 5 is a schematic diagram of the gas detection system 1 illustrated in FIG. 1. FIG. 5 illustrates a state in which a portion of a housing 10 included in the gas detection system 1 has been removed. FIG. 6 is a functional block diagram of the gas detection system 1 illustrated in FIG. 1.

The gas detection system 1 illustrated in FIG. 1 is also referred to as a "gas detection device". As illustrated in FIG. 1, the gas detection system 1 is installed in a toilet 2. The toilet 2 may be, but is not limited to, a flush toilet. The toilet 2 includes a toilet bowl 2A and a toilet seat 2B. The gas detection system 1 may be installed at any position of the toilet 2. For example, the gas detection system 1 may be installed near a side portion of the toilet seat 2B of the toilet 2. A portion of the gas detection system 1 may be embedded inside the toilet seat 2B. Feces of a subject can be discharged in the toilet bowl 2A of the toilet 2. The gas detection system 1 can acquire a gas generated from the feces discharged in the toilet bowl 2A as a sample gas. The gas detection system 1 can detect the type of a gas included in the sample gas, the concentration of the gas, and the like. The gas detection system 1 can transmit a detection result or the like to an electronic device 3.

The toilet 2 can be installed in a toilet room of, for example, a house or a hospital. The toilet 2 can be used by the subject. As described above, the toilet 2 includes the toilet bowl 2A and the toilet seat 2B. Feces of the subject can be discharged in the toilet bowl 2A.

As illustrated in FIG. 2, the toilet bowl 2A includes a rim portion 2A1. The rim portion 2A1 may have an oval ring shape in a top view. The toilet seat 2B may include a U-shaped portion in a top view. The toilet seat 2B may include, for example, four cushions 2B1 on a surface facing the rim portion 2A1. When the toilet seat 2B is placed on the toilet bowl 2A, the cushions 2B1 come into contact with the rim portion 2A1, and hence a gap can be formed between the rim portion 2A1 of the toilet bowl 2A and the toilet seat 2B.

The electronic device 3 illustrated in FIG. 1 is, for example, a smartphone used by the subject. However, the electronic device 3 is not limited to the smartphone and may be any electronic device. When the electronic device 3 is brought into the toilet room by the subject, the electronic device 3 can exist inside the toilet room as illustrated in FIG. 1. However, when the subject does not bring the electronic device 3 into the toilet room, the electronic device 3 may exist outside the toilet room. The electronic device 3 can receive the detection result from the gas detection system 1 through wireless communication or wired communication. The electronic device 3 can display the received detection result on a display unit 3A. The display unit 3A may include a display capable of displaying characters and the like and a touch screen capable of detecting a contact with a finger or the like of a user (subject). The display may include a display device such as a LCD (Liquid Crystal Display), an OELD (Organic Electro-Luminescence Display), or an IELD (Inorganic Electro-Luminescence Display). A detection method of the touch screen may be any method such as a capacitance method, a resistance film method, a surface acoustic wave method (or an ultrasonic method), an infrared method, an electromagnetic induction method, or a load detection method.

As illustrated in FIG. 5, the gas detection system 1 includes the housing 10, a flow path 20, a flow path 21, a discharge path 22, a chamber 30, a first storage tank 40 (predetermined tank), a second storage tank 41, a first supply unit 50, a second supply unit 51, and a circuit board 80. The gas detection system 1 includes a sensor unit 31 in the chamber 30. As illustrated in FIG. 2, the gas detection system 1 includes a gas collection device 60 and a gas collection device 70. As illustrated in FIG. 6, the gas detection system 1 includes a memory 81, a communication unit 82, and a control unit 84 in the circuit board 80. The gas detection system 1 may include a sensor unit 83. The gas detection system 1 may include a battery, a speaker, and so forth.

Hereinafter, the first supply unit 50 will be described as a component of the gas detection system 1. However, the first supply unit 50 may be a component of the gas collection device 60. In this case, the first supply unit 50 may be attached to a flow path 62 of the gas collection device 60 as illustrated in FIG. 4. Similarly, the second supply unit 51 will be described as a component of the gas detection system 1. However, the second supply unit 51 may be a component of the gas collection device 70.

As illustrated in FIG. 2, the gas detection system 1 includes one gas collection device 60. However, the number of gas collection devices 60 included in the gas detection system 1 is not limited to one. The gas detection system 1 may include two or more gas collection devices 60. For example, when the gas detection system 1 includes two or more gas collection devices 60, each gas collection device 60 may be located at a position which will be described below with reference to FIG. 3.

The housing 10 illustrated in FIG. 5 houses various components of the gas detection system 1. The housing 10 may be made of any material. For example, the housing 10 may be made of a material such as metal or resin.

The flow path 20 illustrated in FIG. 5 supplies a sample gas stored in the first storage tank 40 to the chamber 30 via the first supply unit 50. One end of the flow path 20 is connected to the first storage tank 40. The other end of the flow path 20 is connected to the chamber 30. The flow path 20 may be constituted of a tubular member such as a resin tube or a metal or glass pipe.

The flow path 21 illustrated in FIG. 5 supplies a purge gas stored in the second storage tank 41 to the chamber 30 via the second supply unit 51. One end of the flow path 21 is connected to the second storage tank 41. The other end of the flow path 21 is connected to the chamber 30. The flow path 21 may be constituted of a tubular member such as a resin tube or a metal or glass pipe.

The discharge path 22 illustrated in FIG. 5 discharges an exhaust gas from the chamber 30 to the outside. The exhaust gas can contain the sample gas and the purge gas after a detection process. The discharge path 22 may be constituted of a tubular member such as a resin tube or a metal or glass pipe.

As illustrated in FIG. 5, the chamber 30 includes the sensor unit 31 therein. The chamber 30 may include a plurality of sensor units 31. The chamber 30 may be divided into a plurality of chambers. Each of the plurality of sensor units 31 may be disposed in a corresponding one of the plurality of divided chambers 30. The plurality of divided chambers 30 may be connected to one another. The flow path 20 is connected to the chamber 30. The sample gas is supplied from the flow path 20 to the chamber 30. The flow path 21 is connected to the chamber 30. The purge gas is supplied from the flow path 21 to the chamber 30. The discharge path 22 is connected to the chamber 30. The chamber 30 discharges the sample gas and the purge gas after the detection process from the discharge path 22. The chamber 30 may be made of a material such as metal or resin.

As illustrated in FIG. 5, the sensor unit 31 is disposed in the chamber 30. The sensor unit 31 outputs a voltage corresponding to the concentration of a specific gas to the control unit 84 illustrated in FIG. 6. The specific gas includes a specific gas to be detected and a specific gas not to be detected. When the sample gas is a gas generated from feces, examples of the specific gas to be detected include methane, hydrogen, carbon dioxide, methyl mercaptan, hydrogen sulfide, acetic acid, and trimethylamine. When the sample gas is a gas generated from feces, examples of the specific gas not to be detected include ammonia and water. Each of the plurality of sensor units 31 can output a voltage corresponding to the concentration of at least one of these gases to the control unit 84 illustrated in FIG. 6. The sensor unit 31 may be a semiconductor sensor, a catalytic combustion sensor, a solid-electrolyte sensor, or the like.

As illustrated in FIG. 5, the first storage tank 40 is connected to the gas collection device 60. A valve may be located between the first storage tank 40 and the gas collection device 60. The valve may be constituted of an electromagnetically driven, piezoelectrically driven, or motor-driven valve. The valve may switch the connection state between the first storage tank 40 and the gas collection device 60 to a state in which the first storage tank 40 and the gas collection device 60 are connected to each other or a state in which the first storage tank 40 and the gas collection device 60 are not connected to each other under the control of the control unit 84 illustrated in FIG. 6.

The sample gas is supplied from the gas collection device 60 to the first storage tank 40. The first storage tank 40 can store the sample gas. The sample gas stored in the first storage tank 40 is supplied to the chamber 30 via the flow path 20 and the first supply unit 50. The first storage tank 40 may be constituted of a tank or the like having a rectangular-parallelepiped shape, a circular tubular shape, a bag shape, or a shape that accommodates gaps between various components housed inside the housing 10. The first storage tank 40 may be provided with a heater for heating the sample gas.

An adsorbent may be disposed inside the first storage tank 40. The adsorbent may contain any material depending on the application. The adsorbent may contain, for example, at least one of activated carbon, silica gel, zeolite, and molecular sieve. The adsorbent may contain a plurality of types or may contain a porous material. The adsorbent may adsorb a gas not to be detected contained in the sample gas. Examples of the adsorbent for adsorbing the gas not to be detected include silica gel and zeolite. The sample gas may be concentrated in the first storage tank 40. In this case, the adsorbent may adsorb a gas to be detected contained in the sample gas. Examples of the adsorbent for adsorbing the gas to be detected include activated carbon and molecular sieve. However, the combination of these may be appropriately changed depending on the polarity of the gas molecules to be adsorbed.

As illustrated in FIG. 5, the second storage tank 41 is connected to the gas collection device 70. A valve may be located between the second storage tank 41 and the gas collection device 70. The valve may be constituted of an electromagnetically driven, piezoelectrically driven, or motor-driven valve. The valve may switch the connection state between the second storage tank 41 and the gas collection device 70 to a state in which the second storage tank 41 and the gas collection device 70 are connected to each other or a state in which the second storage tank 41 and the gas collection device 70 are not connected to each other under the control of the control unit 84 illustrated in FIG. 6.

The purge gas is supplied from the gas collection device 70 to the second storage tank 41. The second storage tank 41 can store the purge gas. The purge gas stored in the second storage tank 41 is supplied to the chamber 30 via the flow path 21 and the second supply unit 51. The second storage tank 41 may be constituted of a tank or the like having a rectangular-parallelepiped shape, a circular tubular shape, a bag shape, or a shape that accommodates gaps between various components housed inside the housing 10. The second storage tank 41 may be provided with a heater for heating the purge gas.

An adsorbent may be disposed inside the second storage tank 41. The adsorbent may contain any material depending on the application. The adsorbent may contain, for example, at least one of activated carbon, silica gel, zeolite, and molecular sieve. The adsorbent may contain a plurality of types or may contain a porous material. The adsorbent may adsorb a gas not to be detected that can be contained in the purge gas. Examples of the adsorbent for adsorbing the gas not to be detected include silica gel and zeolite. The adsorbent may adsorb a gas to be detected that can be contained in the purge gas. Examples of the adsorbent for adsorbing the gas to be detected include activated carbon and molecular sieve. However, the combination of these may be appropriately changed depending on the polarity of the gas molecules to be adsorbed.

As illustrated in FIG. 5, the first supply unit 50 is attached to the flow path 20. The first supply unit 50 supplies the sample gas stored in the first storage tank 40 to the chamber 30 under the control of the control unit 84. The arrow illustrated in the first supply unit 50 indicates the direction in which the first supply unit 50 sends the sample gas. The first supply unit 50 may be constituted of a piezoelectric pump, a motor pump, or the like.

As illustrated in FIG. 5, the second supply unit 51 is attached to the flow path 21. The second supply unit 51 supplies the purge gas stored in the second storage tank 41 to the chamber 30 under the control of the control unit 84. The arrow illustrated in the second supply unit 51 indicates the direction in which the second supply unit 51 sends the purge gas. The second supply unit 51 may be constituted of a piezoelectric pump, a motor pump, or the like.

The gas collection device 60 collects the gas generated from feces discharged in the toilet bowl 2A as the sample gas. For example, the control unit 84 (described later) causes a flow of the gas directed from the gas collection device 60 toward the first storage tank 40 as illustrated in FIG. 5 described later, and hence the gas collection device 60 collects the gas generated from the feces discharged in the toilet bowl 2A as the sample gas. As illustrated in FIG. 2, the gas collection device 60 may be installed between the toilet seat 2B and the rim portion 2A1 of the toilet bowl 2A. For example, the gas collection device 60 may be disposed on the back surface of the toilet seat 2B. In this case, a portion of the gas collection device 60 may be located in a gap formed between the rim portion 2A1 of the toilet bowl 2A and the toilet seat 2B when the rim portion 2A1 of the toilet bowl 2A and the cushions 2B1 of the toilet seat 2B abut against each other. For example, when the gap between the rim portion 2A1 and the toilet seat 2B is small, a portion of the gas collection device 60 may be embedded inside the toilet seat 2B.

As illustrated in FIG. 2, the gas collection device 60 may be located between the toilet seat 2B and the rim portion 2A1 in a gentle arc area on the right side of the oval ring-shaped rim portion 2A1 in a top view. However, the position of the gas collection device 60 between the toilet seat 2B and the rim portion 2A1 is not limited thereto. The gas collection device 60 may be located at any position on the oval ring-shaped rim portion 2A1 between the toilet seat 2B and the rim portion 2A1. For example, as illustrated in FIG. 3, the gas collection device 60 may be located in a protruding area of the oval ring-shaped rim portion 2A1. For example, as illustrated in FIG. 3, the gas collection device 60 may be located in a gentle arc area on the left side of the oval ring-shaped rim portion 2A1 in a top view. When the position of the gas collection device 60 and the position of the housing 10 are separated from each other, the gas collection device 60 may be connected to the first storage tank 40 in the housing 10 via a tubular member such as a resin tube or a metal or glass pipe.

As illustrated in FIG. 4, the gas collection device 60 includes a housing 61, the flow path 62, and an introduction portion 63. In the gas collection device 60, the side on which the introduction portion 63 is located is also referred to as a "front side".

The housing 61 illustrated in FIG. 4 may be circular cylindrical or angular cylindrical. In the present embodiment, the housing 61 has a circular cylindrical shape. However, the housing 61 may have any shape. The central axis of the circular cylindrical housing 61 is referred to as a "central axis A". As described above, when the gas collection device 60 is disposed on the back surface of the toilet seat 2B illustrated in FIG. 2, the central axis A may be substantially parallel to the back surface of the toilet seat illustrated in FIG. 3. The housing 61 may be made of any material. For example, the housing 61 may be made of a material such as metal or resin.

The flow path 62 illustrated in FIG. 4 is connected to the first storage tank 40 illustrated in FIG. 5 as the predetermined tank. The flow path 62 is disposed inside the housing 61. The flow path 62 is connected to the introduction portion 63. The flow path 62 introduces the sample gas flowing in from a first opening 63a of the introduction portion 63 into the first storage tank 40 illustrated in FIG. 5. The flow path 62 may be formed by embedding a tube in the housing 61. The flow path 62 is disposed such that the central axis of the flow path 62 coincides with the central axis A of the housing 61. However, at least a portion of the flow path 62 may be bent.

The introduction portion 63 illustrated in FIG. 4 introduces the sample gas into the flow path 62. In the present embodiment, the introduction portion 63 is located between the toilet seat 2B and the rim portion 2A1 of the toilet bowl 2A as illustrated in FIG. 2. The introduction portion 63 faces the inside of the toilet bowl 2A. A portion of the introduction portion 63 may be embedded inside the toilet seat 2B. In the present embodiment, as illustrated in FIG. 2, the introduction portion 63 does not protrude toward the inside of the toilet bowl 2A. With such a configuration, it is possible to reduce adhesion of feces, urine, and so forth to the introduction portion 63. As illustrated in FIG. 4, the introduction portion 63 include the first opening 63a, a second opening 63b, and an introduction surface 63c.

As illustrated in FIG. 4, the first opening 63a is connected to the flow path 62. The first opening 63a may be defined as a region surrounded by an opening end 63a1. The opening end 63a1 is the boundary between the flow path 62 and the introduction surface 63c. The opening end 63a1 may be circular. The center of the circular first opening 63a may be located on the central axis A.

As illustrated in FIG. 4, the second opening 63b has an opening area larger than that of the first opening 63a. The second opening 63b may be defined as a region surrounded by an opening end 63b1. The opening end 63b1 is the boundary between the introduction surface 63c and the outer surface of the housing 61. The opening end 63b1 may be circular. The circular second opening 63b may have a diameter larger than the diameter of the circular first opening 63a. The center of the circular second opening 63b may be located on the central axis A.

As illustrated in FIG. 4, the introduction surface 63c connects the opening end 63a1 and the opening end 63b1. That is, the introduction surface 63c connects the first opening 63a and the second opening 63b. The introduction surface 63c may have an inner radius that gradually decreases from the second opening 63b toward the first opening 63a. The introduction surface 63c may be inclined at an angle θ toward the front side with respect to a plane perpendicular to the central axis A. A portion of the sample gas not introduced into the flow path 62 flows along the introduction surface 63c in a direction away from the central axis A. Since the introduction surface 63c is inclined toward the front side at the angle θ, the sample gas flows in the direction away from the central axis A and toward the front side. The sample gas flowing in this manner can flow toward the gas collection device 60 by the gas collection device 60 sucking the gas again. With such a configuration, a circulation flow is generated. Since the circulation flow is generated, the gas generated from the feces in the present embodiment can reach the gas collection device 60 faster than, for example, in a case where the gas reaches the gas collection device 60 by natural diffusion. Since the gas generated from the feces quickly reaches the gas collection device 60, the gas collection device 60 can efficiently collect the sample gas. A gas collection device 60B can collect the sample gas by utilizing the circulation flow instead of utilizing natural diffusion. With such a configuration, it is possible to reduce the probability that the concentration of the sample gas decreases due to natural diffusion.

The introduction surface 63c illustrated in FIG. 4 may have a shape symmetrical about the central axis A. In other words, the introduction surface 63c may have the same sectional shape along the central axis A. With such a configuration, a more uniform circulation flow can be likely generated in all directions around the central axis A.

The gas collection device 70 illustrated in FIG. 5 collects air in the toilet room outside the toilet bowl 2A illustrated in FIG. 1 as the purge gas. The gas collection device 70 may be disposed outside the toilet seat 2B as illustrated in FIG. 2. The gas collection device 70 may have a configuration similar to that of the gas collection device 60. In this case, the gas collection device 70 may include a housing, a flow path connected to the second storage tank 41, and an introduction portion that introduces the purge gas into the flow path.

On the circuit board 80 illustrated in FIG. 6, a wire through which an electric signal propagates, the memory 81, the communication unit 82, the control unit 84, and so forth are mounted.

The memory 81 illustrated in FIG. 6 is constituted of, for example, a semiconductor memory or a magnetic memory. The memory 81 stores various kinds of information, a program for operating the gas detection system 1, and so forth. The memory 81 may function as a working memory.

The communication unit 82 illustrated in FIG. 6 can communicate with the electronic device 3 illustrated in FIG. 1. The communication unit 82 may be capable of communicating with an external server. A communication method used in communication between the communication unit 82, and the electronic device 3 and the external server may be a short-range wireless communication standard, a wireless communication standard for connection to a mobile phone network, or a wired communication standard. Examples of the short-range wireless communication standard may include WiFi (registered trademark), Bluetooth (registered trademark), infrared, and NFC (Near Field Communication). Examples of the wireless communication standard for connection to the mobile phone network may include LTE (Long Term Evolution) and a fourth generation or higher mobile communication system. The communication method used in the communication between the communication unit 82, and the electronic device 3 and the external server may be a communication standard such as LPWA (Low Power Wide Area) or LPWAN (Low Power Wide Area Network).

The sensor unit 83 illustrated in FIG. 6 may include at least one of an image camera, an individual identification switch, an infrared sensor, a pressure sensor, and so forth. The sensor unit 83 outputs the detection result to the control unit 84. In addition, the sensor unit 83 may include an arbitrary sensor for authenticating a subject. Examples of the sensor include a load sensor for detecting a body weight, a sensor for detecting a sitting height, a sensor for detecting a pulse, a sensor for detecting a blood flow, a sensor for detecting a face, and a sensor for detecting voice.

For example, when the sensor unit 83 includes an infrared sensor, the sensor unit 83 can detect that the subject has entered the toilet room by detecting reflected light from an object of infrared light emitted by the infrared sensor. The sensor unit 83 outputs a signal indicating that the subject has entered the toilet room to the control unit 84 as a detection result.

For example, when the sensor unit 83 includes a pressure sensor, the sensor unit 83 can detect that the subject is sitting on the toilet seat 2B by detecting the pressure applied to the toilet seat 2B illustrated in FIG. 1. The sensor unit 83 outputs a signal indicating that the subject is sitting on the toilet seat 2B to the control unit 84 as a detection result.

For example, when the sensor unit 83 includes a pressure sensor, the sensor unit 83 can detect that the subject has stood up from the toilet seat 2B by detecting a decrease in the pressure applied to the toilet seat 2B illustrated in FIG. 1. The sensor unit 83 outputs a signal indicating that the subject has stood up from the toilet seat 2B to the control unit 84 as a detection result.

For example, when the sensor unit 83 includes an image camera, an individual identification switch, and so forth, the sensor unit 83 collects data such as a face image, a sitting height, and a weight. The sensor unit 83 identifies and detects an individual from the collected data. The sensor unit 83 outputs a signal indicating the identified individual to the control unit 84 as a detection result.

For example, when the sensor unit 83 includes an individual identification switch or the like, the sensor unit 83 identifies (detects) an individual based on an operation of the individual identification switch. In this case, personal information may be registered (stored) in advance in the memory 81. The sensor unit 83 outputs a signal indicating the identified individual to the control unit 84 as a detection result.

The control unit 84 illustrated in FIG. 6 includes at least one processor. The processor may include at least one of a general-purpose processor that reads a specific program and executes a specific function and a dedicated processor dedicated to a specific process. The dedicated processor may include an ASIC (Application Specific Integrated Circuit). The processor may include a PLD (Programmable Logic Device). The PLD may include a FPGA (Field-Programmable Gate Array). The control unit 84 may include a SoC (System-on-a-Chip) and/or a SiP (System-in-a-Package) with which one or more processors cooperate.

The control unit 84 causes the gas collection device 70 to suck air in the toilet room outside the toilet bowl 2A illustrated in FIG. 1 as the purge gas. For example, the control unit 84 controls the second supply unit 51 to discharge the gas remaining in the second storage tank 41 from the discharge path 22 via the chamber 30. By the discharge of the gas remaining in the second storage tank 41 from the discharge path 22, the control unit 84 causes a flow of the gas from the gas collection device 70 toward the second storage tank 41 to be generated. By causing the flow of the gas from the gas collection device 70 toward the second storage tank 41 to be generated, the control unit 84 causes the gas collection device 70 to suck the purge gas.

By continuously causing the gas collection device 70 to suck the purge gas, the control unit 84 causes the second storage tank 41 to store the purge gas. The control unit 84 may cause the gas collection device 60 to suck the purge gas after a lapse of a predetermined time from the detection of that the subject has stood up from the toilet seat 2B based on the detection result of the sensor unit 83.

The control unit 84 may cause the second storage tank 41 to store the purge gas if cleanliness of the purge gas is high when the purge gas is sucked into the gas collection device 70. In this case, the control unit 84 may continuously control the second supply unit 51 to supply the purge gas to the chamber 30. The control unit 84 may determine whether the cleanliness of the purge gas is high based on the detection result of the sensor unit 31. In addition to the sensor unit 31, the gas detection system 1 may further include a dedicated sensor unit that detects the cleanliness of the purge gas. The dedicated sensor unit may be provided inside the gas collection device 70. The control unit 84 may determine whether the cleanliness of the purge gas is high based on the detection result of the dedicated sensor unit.

The control unit 84 causes the gas collection device 60 to suck the sample gas. For example, the control unit 84 controls the first supply unit 50 to discharge the gas remaining in the first storage tank 40 from the discharge path 22 via the chamber 30. By the discharge of the gas remaining in the first storage tank 40 from the discharge path 22, the control unit 84 causes a flow of the gas from the gas collection device 60 toward the first storage tank 40 to be generated. By causing the flow of the gas from the gas collection device 60 toward the first storage tank 40 to be generated, the control unit 84 causes the gas collection device 60 to suck the sample gas.

By causing the gas collection device 60 to suck the sample gas, the control unit 84 causes the first storage tank 40 to store the sample gas. The control unit 84 may cause the gas collection device 60 to suck the sample gas after a lapse of a predetermined time from the detection of that the subject is sitting on the toilet seat 2B based on the detection result of the sensor unit 83.

The control unit 84 controls the first supply unit 50 and the second supply unit 51 to alternately supply the sample gas stored in the first storage tank 40 and the purge gas stored in the second storage tank 41 to the chamber 30. By the alternate supply with the purge gas and the sample gas to the chamber 30, the control unit 84 acquires a voltage waveform from the sensor unit 31. The control unit 84 detects the type and concentration of the gas included in the sample gas based on the acquired voltage waveform. For example, the control unit 84 detects the type and concentration of the gas included in the sample gas by machine learning for the voltage waveform. The control unit 84 may transmit the detected type and concentration of the gas as a detection result to the electronic device 3 via the communication unit 82.

As described above, in the gas detection system 1 according to the first embodiment, the introduction portion 63 of the gas collection device 60 is located between the toilet seat 2B and the rim portion 2A1 of the toilet bowl 2A as illustrated in FIG. 2. The introduction portion 63 does not protrude toward the inside of the toilet bowl 2A. With such a configuration, it is possible to reduce adhesion of feces, urine, and so forth to the introduction portion 63. Since the adhesion of feces, urine, and the like to the introduction portion 63 is reduced, the sample gas can be smoothly collected from the introduction portion 63 to the first storage tank 40 via the flow path 62. Since the adhesion of feces, urine, and the like to the introduction portion 63 is reduced, it is possible to reduce the probability that the gas generated from the feces of another person is mixed into the sample gas. Since the probability that the gas generated from the feces of another person is mixed into the sample gas is reduced, the gas detection system 1 can more accurately detect the type and concentration of the gas included in the sample gas.

Thus, according to the first embodiment, the improved gas collection device 60 can be provided.

Second Embodiment

Figure 7:
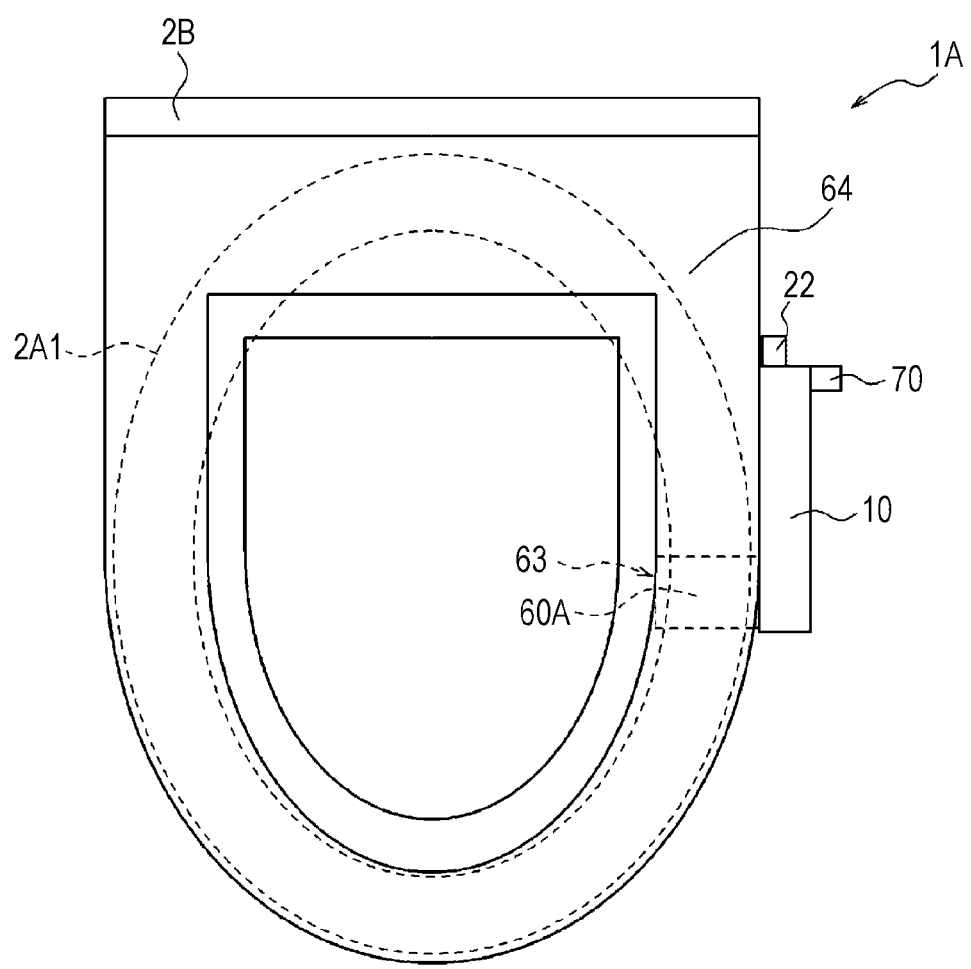
FIG. 7 is an external view of a gas detection system according to a second embodiment of the present disclosure.

FIG. 7 is an external view of a gas detection system 1A according to a second embodiment of the present disclosure. The configuration illustrated in FIG. 7 corresponds to the top view illustrated in FIG. 2. The gas detection system 1A includes one gas collection device 60A. However, the number of gas collection devices 60A included in the gas detection system 1A is not limited to one. The gas detection system 1A may include two or more gas collection devices 60A.

Figure 8:
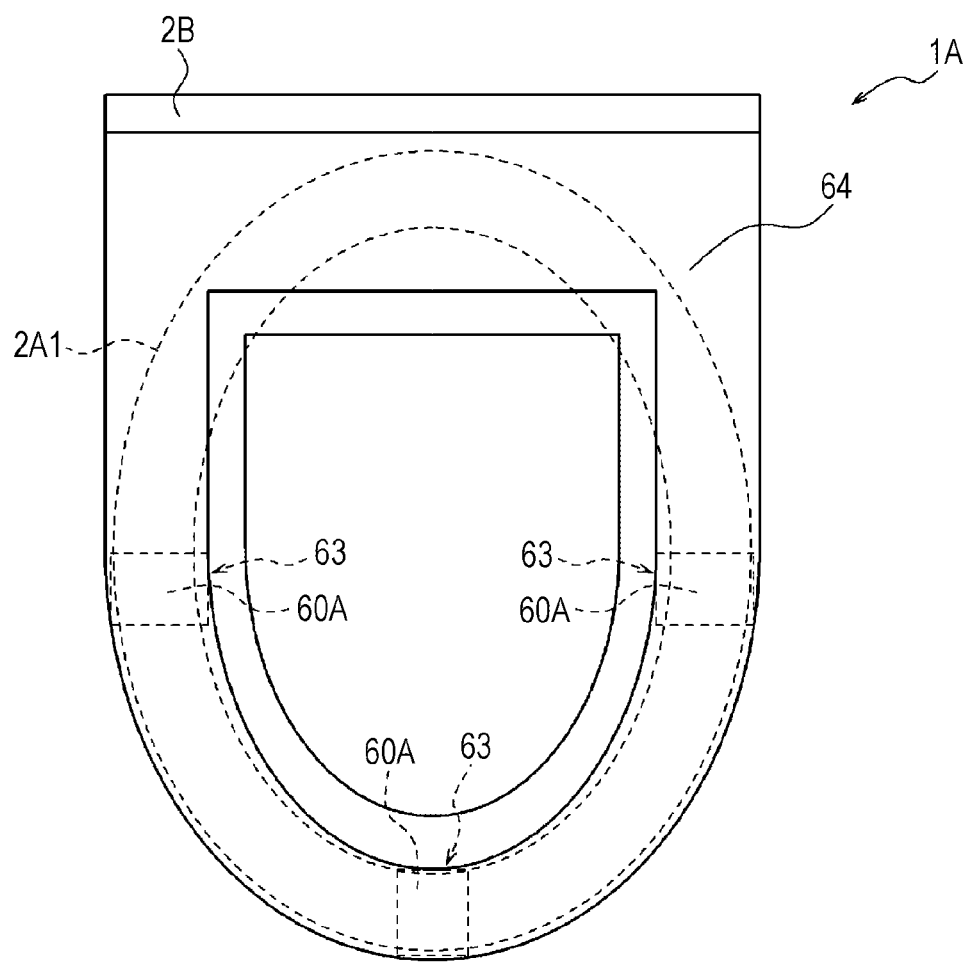
FIG. 8 is a partial top view illustrating another example of a configuration illustrated in FIG. 7.

The gas collection device 60A is located above the toilet seat 2B. The gas collection device 60A may be located above the toilet seat 2B, in a gently curved area on the right side of the U-shaped portion of the toilet seat 2B in a top view. However, the position of the gas collection device 60A above the toilet seat 2B is not limited thereto. FIG. 8 is a partial top view illustrating another example of the configuration illustrated in FIG. 7. For example, the gas collection device 60A may be located in a protruding area of the U-shaped portion of the toilet seat 2B in the top view illustrated in FIG. 8. For example, the gas collection device 60A may be located in a gently curved area on the left side of the U-shaped portion of the toilet seat 2B in the top view illustrated in FIG. 8. A portion of the gas collection device 60A may be embedded within the toilet seat 2B. When the position of the gas collection device 60A and the position of the housing 10 are separated from each other, the gas collection device 60A may be connected to the first storage tank 40 in the housing 10 via a tubular member such as a resin tube or a metal or glass pipe.

The gas collection device 60A illustrated in FIG. 7 includes a housing 61, a flow path 62, and an introduction portion 63, similarly to the gas collection device 60 illustrated in FIG. 4. The gas collection device 60A according to the second embodiment includes a seat member 64.

The introduction portion 63 of the gas collection device 60A is located above the toilet seat 2B. A portion of the introduction portion 63 may be embedded inside the toilet seat 2B. The introduction portion 63 does not protrude toward the inside of the toilet bowl 2A from the toilet seat 2B. With such a configuration, it is possible to reduce adhesion of feces, urine, and so forth to the introduction portion 63.

The seat member 64 accommodates the difference in height between an upper portion of the gas collection device 60 and an upper portion of the toilet seat 2B. The seat member 64 may be disposed above the toilet seat 2B in an area excluding an area in which the gas collection device 60 is disposed. Since the seat member 64 accommodates the difference in height between the upper portion of the gas collection device 60 and the upper portion of the toilet seat 2B, the subject can sit on the toilet seat 2B without feeling discomfort. The seat member 64 may be made of a flexible resin member or the like.

The seat member 64 may cover an upper surface of the gas collection device 60A when the housing 61 of the gas collection device 60A is rigid. In this case, the seat member 64 may be made of a flexible material.

Other structures and effects of the gas collection device 60A according to the second embodiment are similar to the configurations and effects of the gas collection device 60 according to the first embodiment.

Third Embodiment

Figure 9:
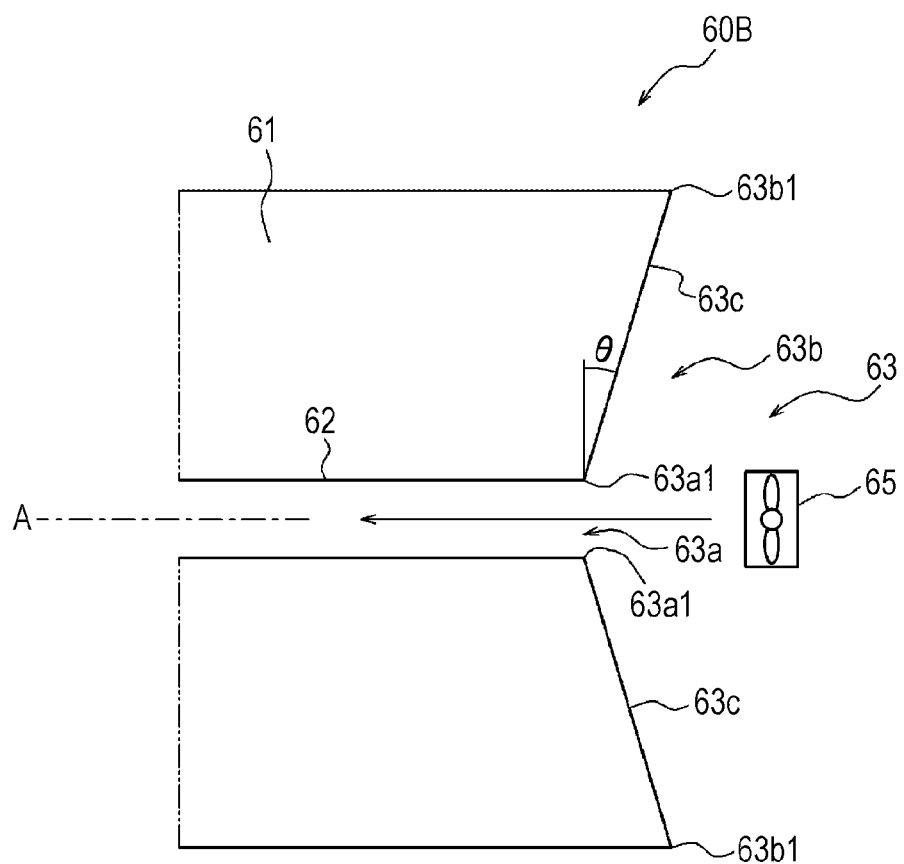
FIG. 9 is a partial cross-sectional view of a gas collection device according to a third embodiment of the present disclosure.

FIG. 9 is a partial cross-sectional view of a gas collection device 60B according to a third embodiment of the present disclosure.

The gas collection device 60B may be employed in the gas detection system 1 illustrated in FIG. 1, or may be employed in the gas detection system 1A illustrated in FIG. 7. The gas collection device 60B includes a housing 61, a flow path 62, an introduction portion 63, and a blower 65.

The blower 65 faces the introduction portion 63. That is, the blower 65 is disposed on the front side of the housing 61. The blower 65 can blow the sample gas to the introduction portion 63. The distance from the housing 61 to the blower 65 may be appropriately adjusted.

The blower 65 may include a fan and a mechanism for driving the fan. The fan may be a multi-blade fan. The mechanism for driving the fan may include a motor for rotating the fan, a casing for protecting the fan, and a rotating shaft serving as the center of rotation of the fan. The blower 65 can rotate the fan by driving the motor under the control of the control unit 84 illustrated in FIG. 6 described above. Since the fan rotates around the rotating shaft as the center, the blower 65 can blow the sample gas on the front side toward the housing 61. The blower 65 can send air having a blowing region equivalent to the outer shape thereof.

Since the blower 65 blows the sample gas on the front side toward the housing 61, the sample gas can be drawn into the vicinity of the first opening 63a of the introduction portion 63. Of the sample gas drawn into the vicinity of the first opening 63a, the sample gas that has not flowed into the flow path 62 can be blown to the introduction surface 63c by the blower 65. Since the sample gas is blown to the introduction surface 63c by the blower 65, the above-described circulation flow can be more likely generated. Since the circulation flow is more likely generated, the gas generated from the feces can be quickly drawn toward the gas collection device 60B. Since the gas generated from the feces is quickly drawn toward the gas collection device 60B, it is possible to reduce the probability that the concentration of the gas decreases. Since the probability that the concentration of the gas generated from the feces decreases is reduced, the gas collection device 60B can collect a high-concentration sample gas.

The blower 65 may be disposed such that the rotating shaft of the fan of the blower 65 coincides with the center of the first opening 63a. That is, the blower 65 may be disposed such that the center of the blowing region and the center of the first opening 63a coincide with each other. In the example illustrated in FIG. 9, the blower 65 is disposed such that the rotating shaft of the fan of the blower 65 coincides with the central axis A. With such a configuration, the sample gas blown by the blower 65 can be more likely introduced into the flow path 62 from the first opening 63a of the introduction portion 63.

The blower 65 may be larger than the first opening 63a. That is, the blowing region may be larger than the first opening 63a. In other words, the area occupied by the blower 65 may be larger than the area occupied by the first opening 63a as viewed from the front side of the housing 61. Since the blower 65 is larger than the first opening 63a, the high-concentration sample gas in a central portion of the gas flowing to the gas collection device 60B by the circulation flow can be efficiently drawn to the first opening 63a. With such a configuration, the gas collection device 60B can collect the high-concentration sample gas.

The blower 65 may be smaller than the second opening 63b. In other words, as viewed from the front side of the housing 61, the area occupied by the blower 65 may be smaller than the area occupied by the second opening 63b.

Other structures and effects of the gas collection device 60B according to the third embodiment are similar to the configurations and effects of the gas collection device 60 according to the first embodiment.

Figure 12:
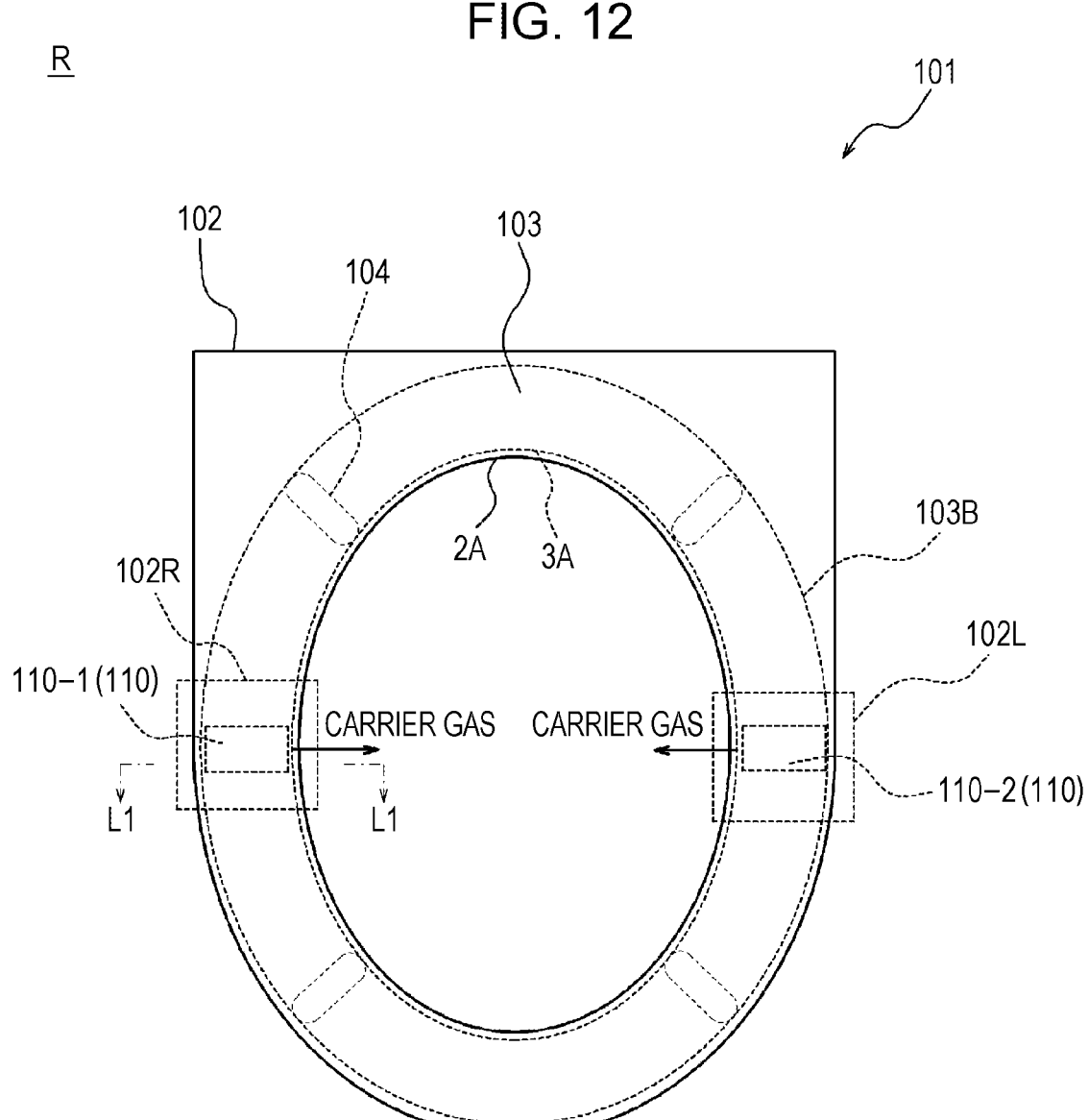
FIG. 12 is a schematic view of a gas collection device according to a fourth embodiment of the present disclosure.
Figure 13:
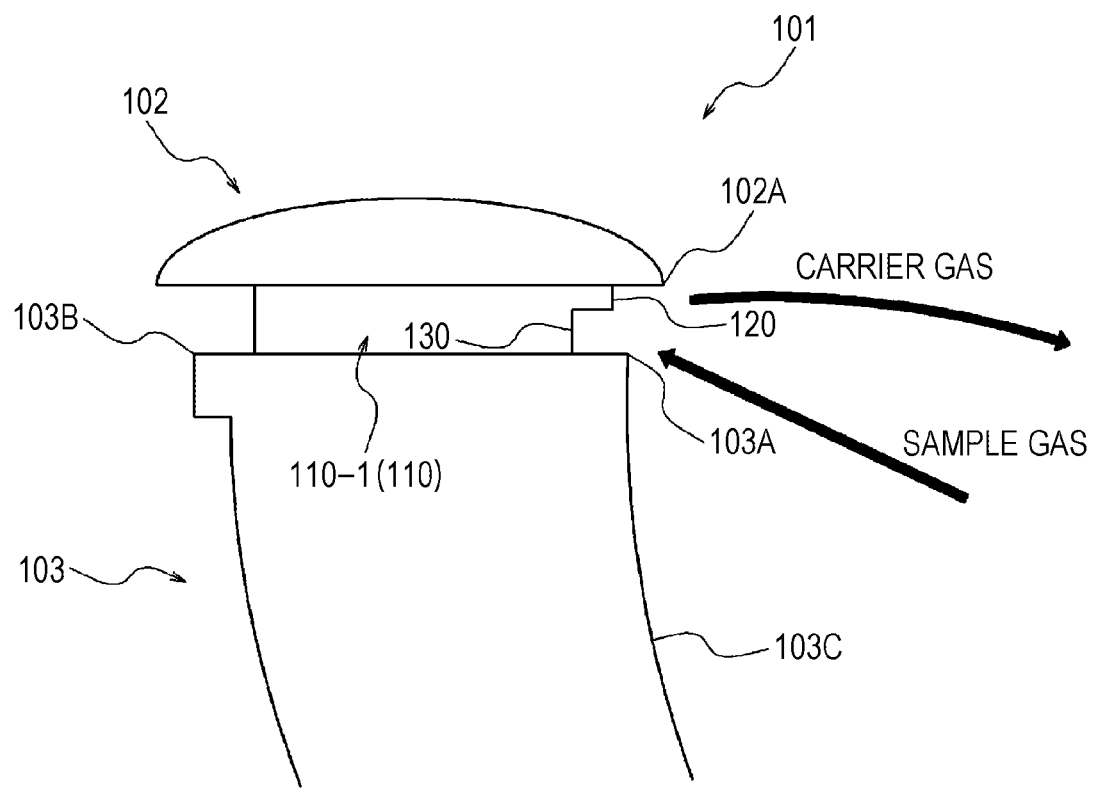
FIG. 13 is a cross-sectional view of a gas collector taken along line L1-L1 illustrated in FIG. 12.

Hereinafter, in FIGS. 12 to 26, a direction from the right side toward the left side as viewed from the subject when the subject is sitting on a toilet seat 102 illustrated in FIG. 12 is defined as a positive direction of the X axis. When the positive direction of the X axis and a negative direction of the X axis are not particularly distinguished from each other, they are collectively referred to as an "X direction". When the subject is sitting on the toilet seat 102 illustrated in FIG. 12, a direction from the front surface toward the back surface of the subject is defined as a positive direction of the Y axis. When the positive direction of the Y axis and a negative direction of the Y axis are not particularly distinguished from each other, they are collectively referred to as a "Y direction". A direction from a toilet bowl 103 toward the toilet seat 102 illustrated in FIG. 13 is defined as a positive direction of the Z axis. When the positive direction of the Z axis and a negative direction of the Z axis are not particularly distinguished from each other, they are collectively referred to as a "Z direction".

Fourth Embodiment

FIG. 12 is a schematic view of a gas collection device 101 according to a fourth embodiment of the present disclosure. FIG. 13 is a cross-sectional view of a gas collector 110 taken along line L1-L1 illustrated in FIG. 12.

As illustrated in FIG. 12, the gas collection device 101 can be installed in a toilet room R. A toilet seat 102 and a toilet bowl 103 are disposed in the toilet room R. A subject can sit on the toilet seat 102. The subject sitting on the toilet seat 102 can discharge feces into the toilet bowl 103. The gas collection device 101 collects the gas generated from the feces discharged to the toilet bowl 103 as a sample gas.

In the configuration illustrated in FIG. 12, an inner edge 103A of the toilet bowl 103 is larger than an inner edge 102A of the toilet seat 102. However, the size of the inner edge 102A of the toilet seat 102 may be the same as the size of the inner edge 103A of the toilet bowl 103. Alternatively, the inner edge 102A of the toilet seat 102 may be larger than the inner edge 103A of the toilet bowl 103. A cushion 104 may be disposed between the toilet seat 102 and the toilet bowl 103. The cushion 104 may be provided integrally with the toilet seat 102. In this case, the cushion 104 is provided on a surface of the toilet seat 102 facing the toilet bowl 103.

As illustrated in FIG. 12, the gas collection device 101 includes a gas collector 110-1 and a gas collector 110-2.

Hereinafter, when the gas collector 110-1 and the gas collector 110-2 are not particularly distinguished from each other, they are collectively referred to as a "gas collector 110". The gas collection device 101 illustrated in FIG. 12 includes two gas collectors 110. However, the number of gas collectors 110 included in the gas collection device 101 is not limited to two. The gas collection device 101 may include at least one gas collector 110.

As illustrated in FIG. 13, the gas collector 110 is located between the toilet seat 102 and the toilet bowl 103 in the Z direction. The distance between the toilet seat 102 and the toilet bowl 103 in the Z direction may be appropriately adjusted in accordance with the length (height) of the gas collector 110 in the Z direction. Alternatively, when the distance between the toilet seat 102 and the toilet bowl 103 in the Z direction is fixed, a portion of the gas collector 110 may be embedded in at least one of the toilet seat 102 and the toilet bowl 103. When the cushion 104 illustrated in FIG. 12 is disposed between the toilet seat 102 and the toilet bowl 103, the gas collector 110 may be disposed in a gap between the toilet seat 102 and the toilet bowl 103 generated by disposing the cushion 104.

As illustrated in FIG. 13, the gas collector 110 is located between the inner edge 102A of the toilet seat 102 and the inner edge 103A of the toilet bowl 103. As illustrated in FIG. 13, the gas collector 110 may be located not to protrude from the inner edge 102A of the toilet seat 102 and the inner edge 103A of the toilet bowl 103. Since the gas collector 110 is disposed not to protrude from the inner edge 102A of the toilet seat 102 and the inner edge 103A of the toilet bowl 103, it is possible to reduce the probability that the gas collector 110 is contaminated by feces, urine, or the like of the subject. As illustrated in FIG. 13, the gas collector 110 includes an ejector 120 and an evacuator 130.

The ejector 120 illustrated in FIG. 13 can eject a carrier gas toward the inside of the toilet bowl 103 in a top view illustrated in FIG. 12. The carrier gas may be air in the toilet room R illustrated in FIG. 12. The carrier gas ejected from the ejector 120 can swirl inside the toilet bowl 103 depending on the shape of an inner surface 103C of the toilet bowl 103 illustrated in FIG. 13. Since the carrier gas circulates inside the toilet bowl 103, the gas generated from the feces located on a bottom portion of the toilet bowl 103 can be carried toward the evacuator 130.

The evacuator 130 illustrated in FIG. 13 can suck the gas from the toilet bowl 103 as a sample gas. The evacuator 130 sucks the gas from the toilet bowl 103 to suck the gas generated from the feces and carried by the carrier gas.

As illustrated in FIG. 13, the evacuator 130 is located on the negative direction side of the Z axis with respect to the ejector 120. In other words, the evacuator 130 is located between the toilet seat 102 and the toilet bowl 103 and is closer to the toilet bowl 103 than the ejector 120. A distal end portion of the evacuator 130 is retracted from a distal end portion of the ejector 120 in a direction from the inside toward the outside of the toilet bowl 103 (in FIG. 13, a direction from the inner edge 103A toward an outer edge 103B of the toilet bowl 103). With such a configuration, it is possible to reduce the probability that the evacuator 130 blocks the flow of the carrier gas ejected by the ejector 120. With such a configuration, the evacuator 130 can be located at a position to which the gas generated from the feces is likely carried by the carrier gas.

As illustrated in FIG. 12, the gas collector 110 may be located in at least one of a left portion 102L and a right portion 102R. The left portion 102L is a portion of the toilet seat 102 located on the left side as viewed from the subject when the subject is sitting on the toilet seat 102. The right portion 102R is a portion of the toilet seat 102 located on the right side as viewed from the subject when the subject is sitting on the toilet seat 102. Since the gas collector 110 is located in one of the left portion 102L and the right portion 102R, the carrier gas ejected by the ejector 120 can efficiently carry the gas generated from feces 106 in the toilet bowl 103 to the evacuator 130 as illustrated in FIG. 14.

Figure 14:
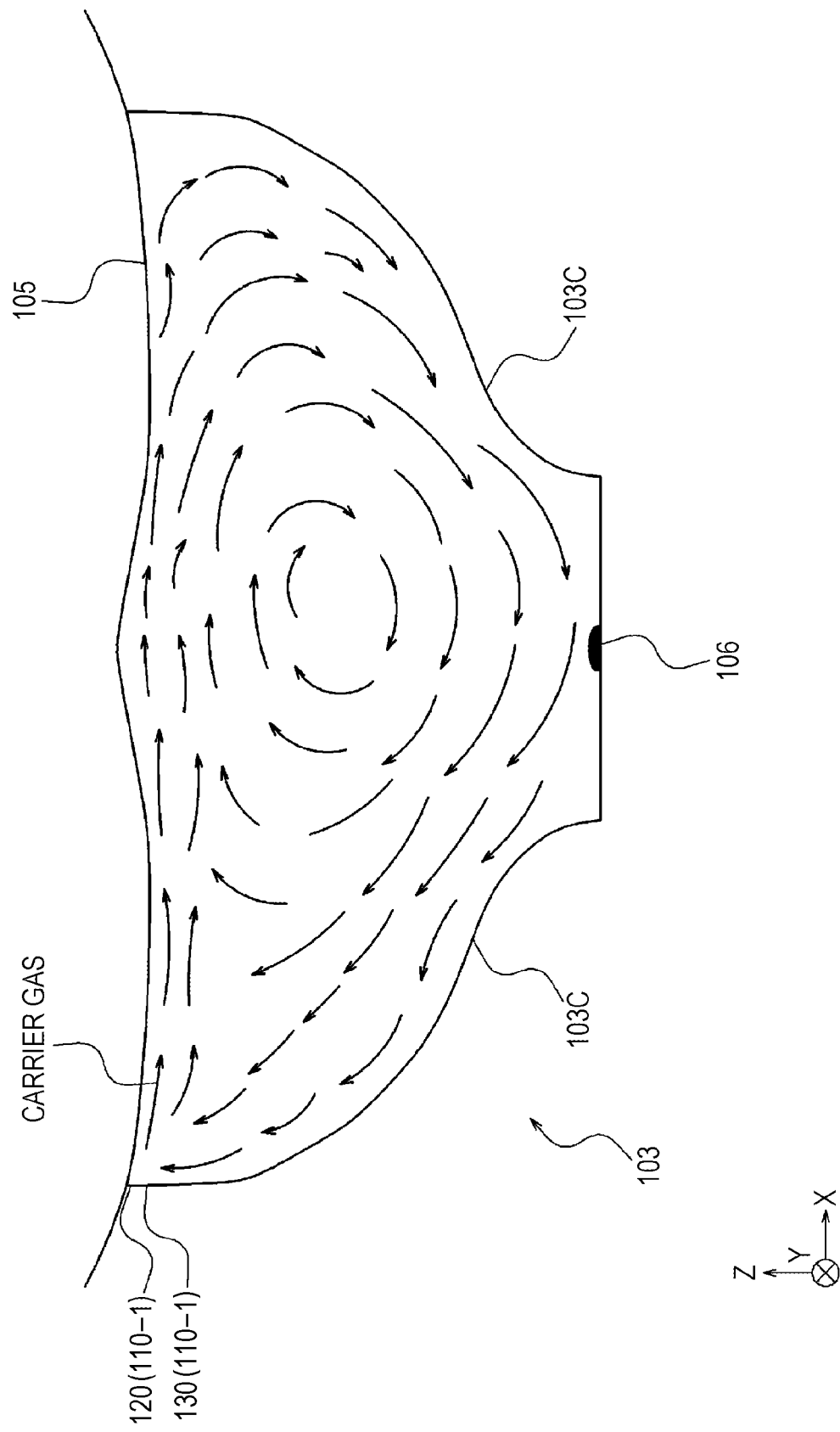
FIG. 14 is a view illustrating an example of a flow of a gas in a toilet bowl illustrated in FIG. 12.

FIG. 14 is a view illustrating an example of a flow of a gas in the toilet bowl 103 illustrated in FIG. 12. In the configuration illustrated in FIG. 14, the gas collector 110-1 is disposed in the right portion 102R illustrated in FIG. 12. In the configuration illustrated in FIG. 13, when the subject is sitting on the toilet seat 102 illustrated in FIG. 12, buttocks 105 of the subject are located on the positive direction side of the Z axis of the toilet bowl 103. As illustrated in FIG. 14, the carrier gas ejected from the ejector 120 can flow along the surfaces of the buttocks 105 of the subject. The carrier gas flowing along the surfaces of the buttocks 105 of the subject can flow toward the feces 106 depending on the shape of the inner surface 103C located on the positive direction side of the X axis of the toilet bowl 103. The carrier gas flowing toward the feces 106 carries the gas generated from the feces 106 to the evacuator 130. Thus, in the configuration illustrated in FIG. 14, the carrier gas can swirl in the ZX plane. The carrier gas can carry the gas generated from the feces 106 to the evacuator 130 by swirling in the ZX plane.

As illustrated in FIG. 12, when the gas collection device 101 includes two gas collectors 110, the gas collector 110-2, which is one of the two gas collectors 110, may be located in the left portion 102L. The gas collector 110-1, which is the other of the two gas collectors 110, may be located in the right portion 102R. In this case, the gas collector 110-1 and the gas collector 110-2 may face each other. With such a configuration, as illustrated in FIG. 15, the carrier gas ejected by the ejector 120 of each of the facing gas collectors 110 can efficiently carry the gas generated from the feces 106 to the evacuator 130.

Figure 15:
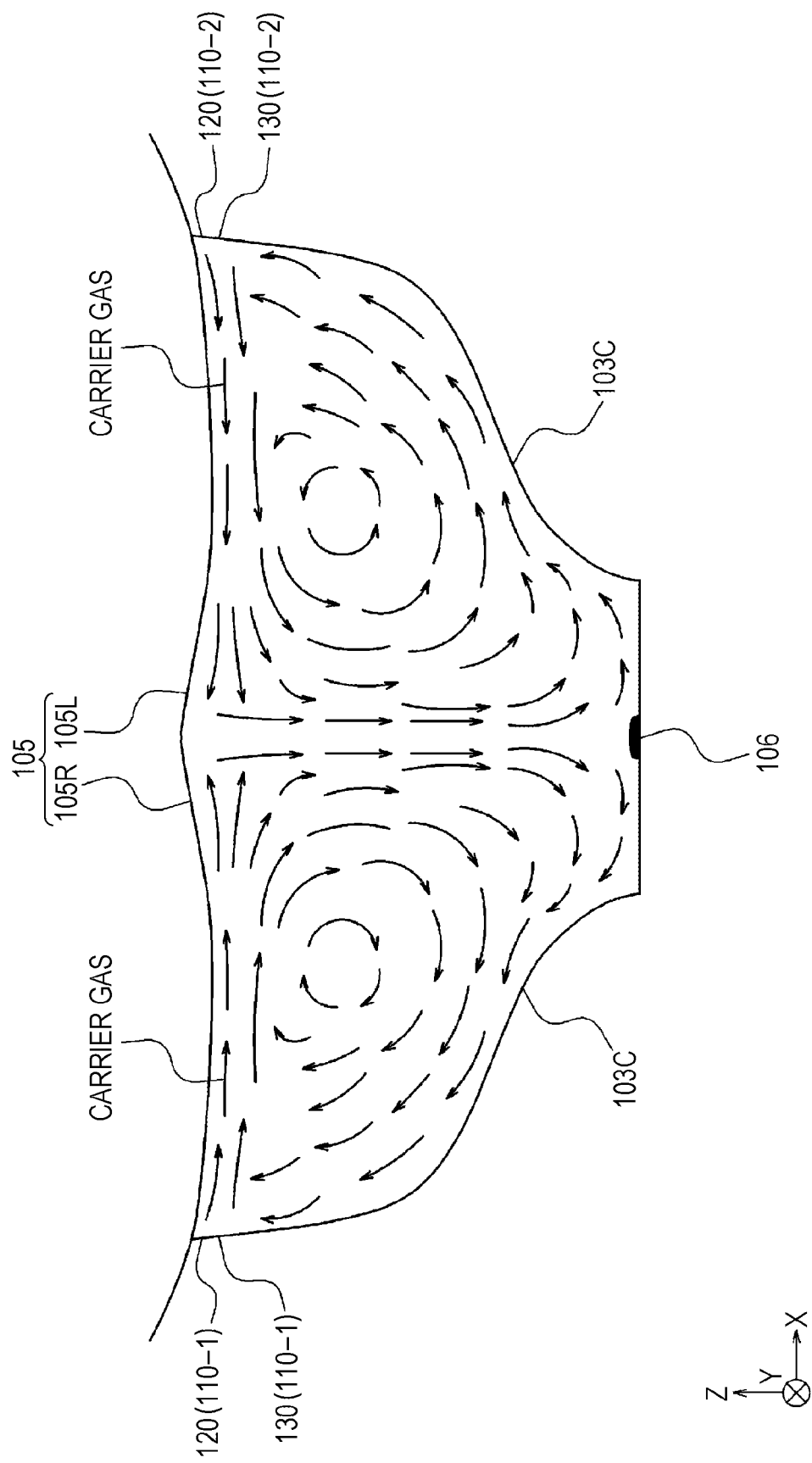
FIG. 15 is a view illustrating another example of the flow of the gas in the toilet bowl illustrated in FIG. 12.

FIG. 15 is a view illustrating another example of the flow of the gas in the toilet bowl 103 illustrated in FIG. 12. In the configuration illustrated in FIG. 15, the gas collector 110-1 and the gas collector 110-2 are located in the right portion 102R and the left portion 102L illustrated in FIG. 12, respectively. In the configuration illustrated in FIG. 15, when the subject is sitting on the toilet seat 102 illustrated in FIG. 12, the buttocks 105 of the subject are located on the positive direction side of the Z axis of the toilet bowl 103. As illustrated in FIG. 15, the carrier gas ejected from the ejector 120 of the gas collector 110-1 flows along the surface of a right buttock 105R of the buttocks 105 of the subject. The carrier gas ejected from the ejector 120 of the gas collector 110-2 can flow along the surface of a left buttock 105L of the buttocks 105 of the subject. The carrier gas flowing along the surface of the right buttock 105R and the carrier gas flowing along the surface of the left buttock 105L can collide with each other near the area between the right buttock 105R and the left buttock 105L. The carrier gases colliding with each other near the area between the right buttock 105R and the left buttock 105L can flow toward the feces 106. A portion of the carrier gas flowing toward the feces 106 can carry the gas generated from the feces 106 to the evacuator 130 of the gas collector 110-1. Another portion of the carrier gas flowing toward the feces 106 can carry the gas generated from the feces 106 to the evacuator 130 of the gas collector 110-2. In this manner, in the configuration illustrated in FIG. 15, a portion of the carrier gas can swirl on the negative direction side of the X axis in the ZX plane. Since the portion of the carrier gas swirls on the negative direction side of the X axis in the ZX plane, the portion of the carrier gas can carry the gas generated from the feces 106 to the evacuator 130 of the gas collector 110-1. In the configuration illustrated in FIG. 15, another portion of the carrier gas can swirl on the positive direction side of the X axis in the ZX plane. Since the other portion of the carrier gas swirls on the positive direction side of the X axis in the ZX plane, the other portion of the carrier gas can carry the gas generated from the feces 106 to the evacuator 130 of the gas collector 110-2.

Figure 16:
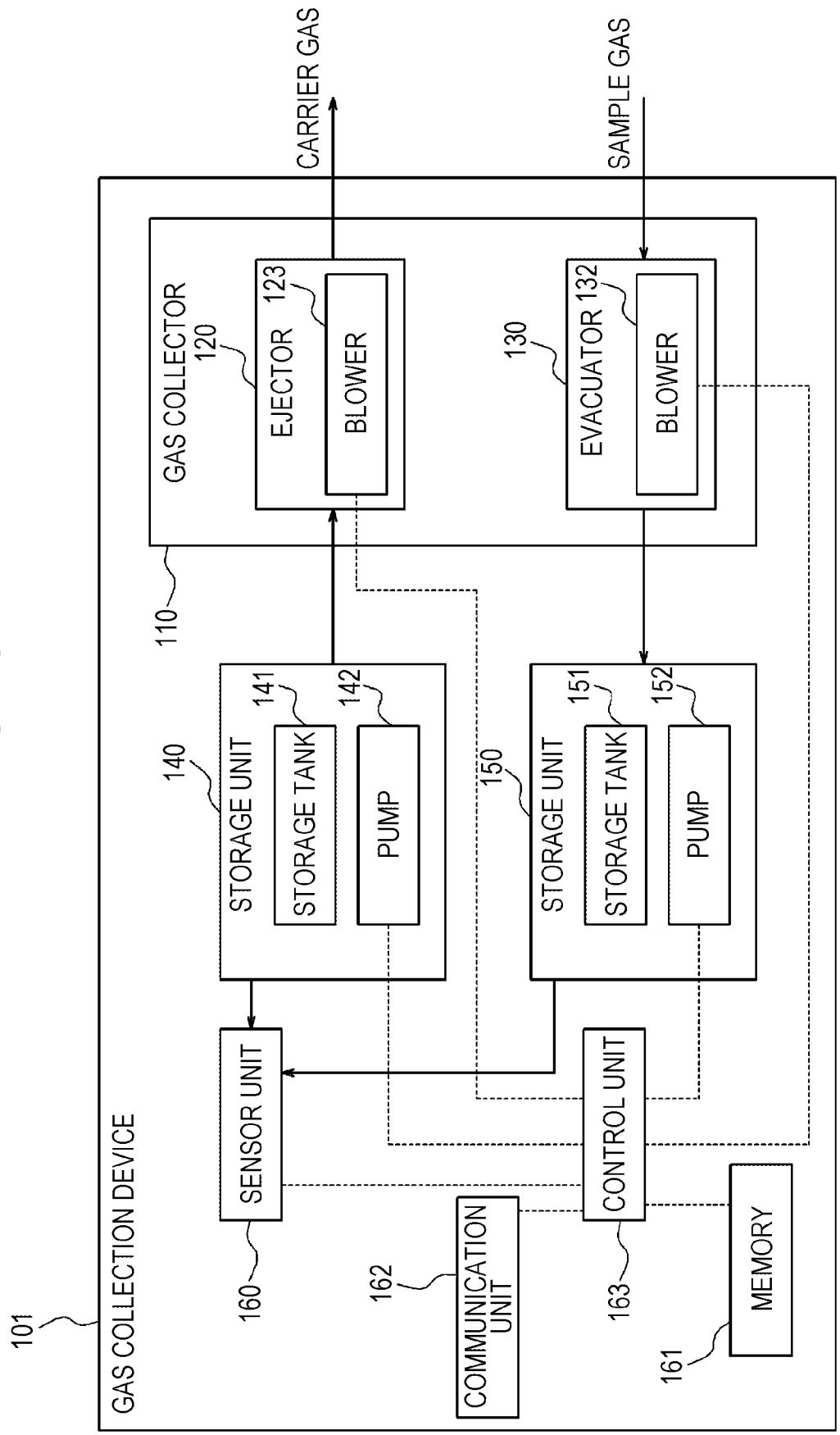
FIG. 16 is a functional block diagram of the gas collection device illustrated in FIG. 12.

FIG. 16 is a functional block diagram of the gas collection device 101 illustrated in FIG. 12. As illustrated in FIG. 16, the gas collection device 101 may include, in addition to the gas collector 110, a storage unit 140, a storage unit 150, a plurality of sensor units 160, a memory 161, a communication unit 162, and a control unit 163. A solid line connecting the respective components illustrated in FIG. 16 indicates a flow of a gas. A broken line connecting the respective components illustrated in FIG. 16 indicates a flow of communication or control. The gas collection device 101 is also referred to as a "gas detection device" when including the sensor units 160. The gas collection device 101 may include a dedicated housing that houses the storage unit 140, the storage unit 150, the sensor units 160, the memory 161, the communication unit 162, and the control unit 163 illustrated in FIG. 16. In order to reduce the size of the gas collector 110, the dedicated housing may be disposed at a position different from the position of the gas collector 110 illustrated in FIG. 12. For example, the dedicated housing may be disposed near the gas collector 110. Alternatively, when the gas collection device 101 includes, for example, one gas collector 110, a housing 111 of the gas collector 110 may include the storage unit 140, the storage unit 150, the sensor units 160, the memory 161, the communication unit 162, and the control unit 163 illustrated in FIG. 16.

Figure 17:
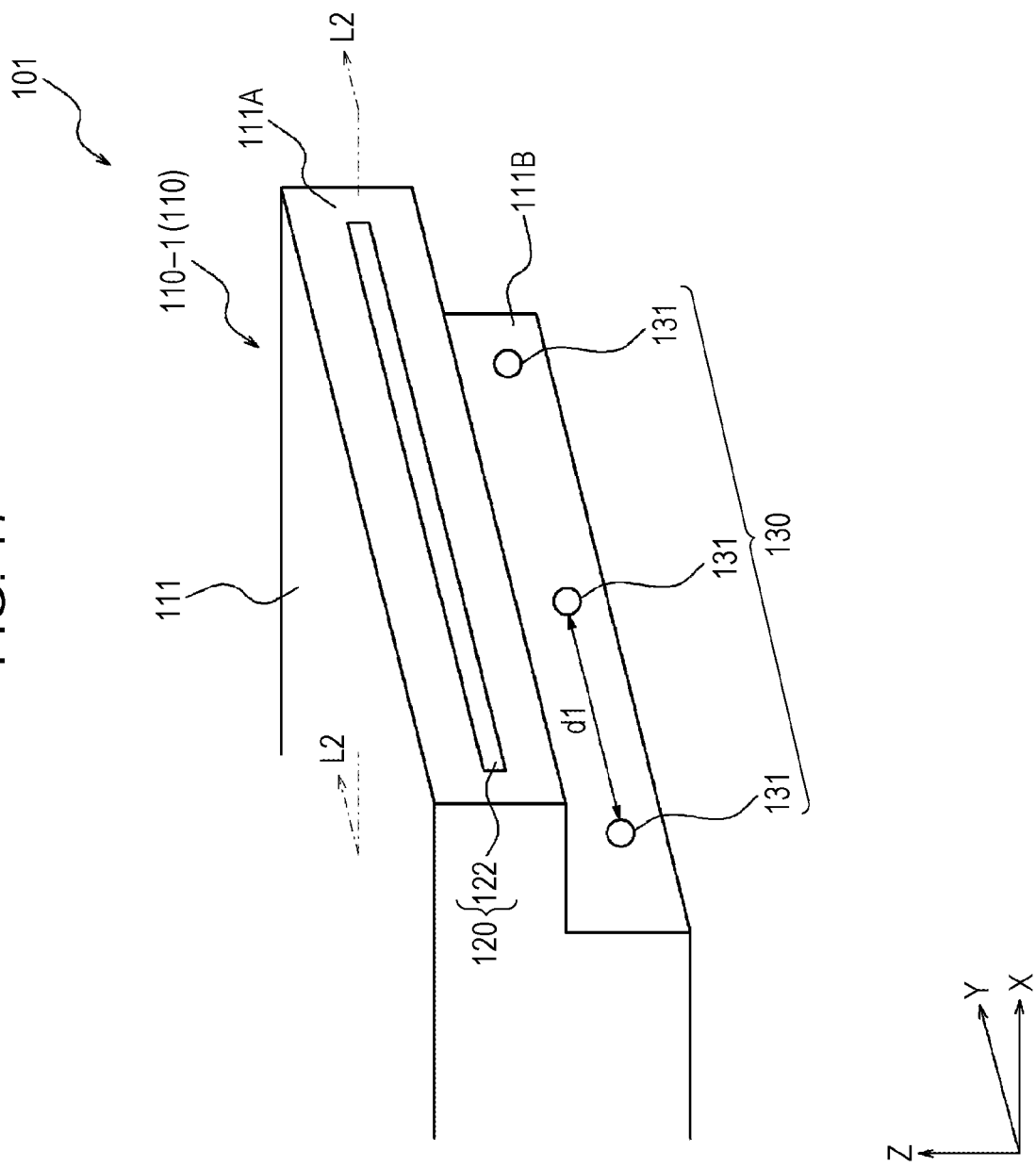
FIG. 17 is a partial enlarged view of the gas collector illustrated in FIG. 12.
Figure 18:
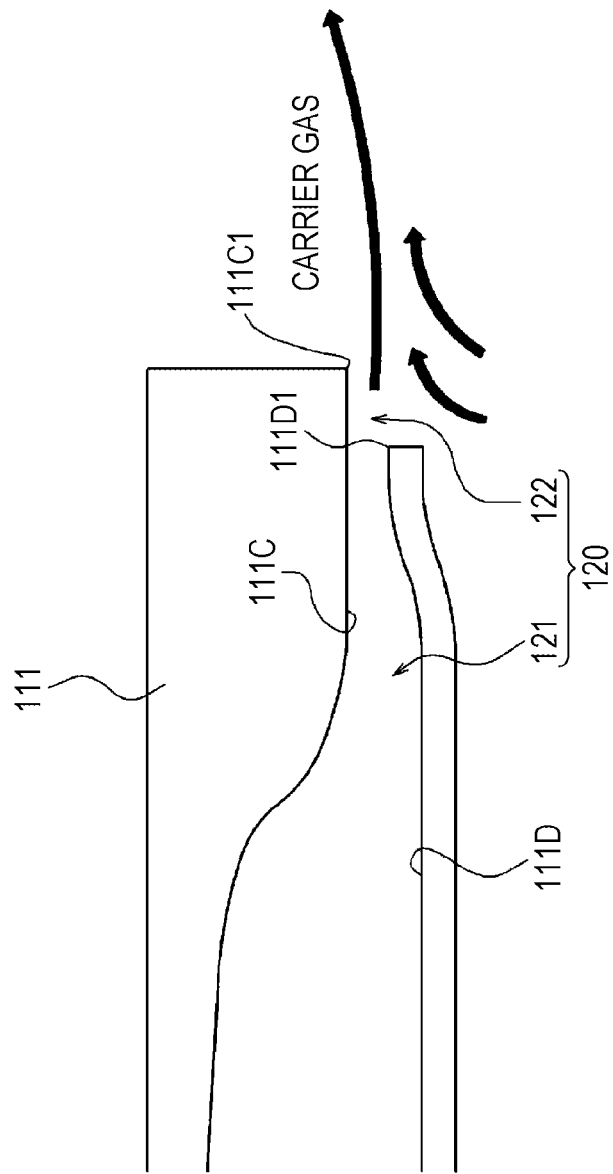
FIG. 18 is a cross-sectional view of an ejector taken along line L2-L2 illustrated in FIG. 17.

FIG. 17 is a partial enlarged view of the gas collector 110 illustrated in FIG. 13. FIG. 18 is a cross-sectional view of the ejector 120 taken along line L2-L2 illustrated in FIG. 17. As illustrated in FIG. 17, the gas collector 110 includes the ejector 120 and the evacuator 130 described above in the housing 111. The housing 111 illustrated in FIG. 17 may be made of a material such as synthetic resin.

As illustrated in FIG. 17, the housing 111 includes a front surface 111A and a front surface 111B. The front surface 111A and the front surface 111B are surfaces facing the inside of the toilet bowl 103. A distal end portion of the ejector 120 is disposed in the front surface 111A. A distal end portion of the evacuator 130 is disposed in the front surface 111B. The front surface 111A protrudes toward the inside of the toilet bowl 103 from the front surface 111B.

As illustrated in FIG. 18, the housing 111 includes an inner peripheral surface 111C and an inner peripheral surface 111D. The inner peripheral surface 111C is a surface located on the positive direction side of the Z axis among the inner peripheral surfaces of the housing 111. The inner peripheral surface 111D is a surface located on the negative direction side of the Z axis among the inner peripheral surfaces of the housing 111.

As illustrated in FIG. 18, the ejector 120 includes a flow path 121 and at least one opening 122. As illustrated in FIG. 16, the ejector 120 includes a blower 123.

As illustrated in FIG. 18, the flow path 121 is connected to the opening 122. When the blower 123 illustrated in FIG. 16 is driven, the carrier gas stored in the storage unit 140 illustrated in FIG. 16 can flow into the flow path 121. The carrier gas flowing into the flow path 121 is ejected from the opening 122. The flow path 121 may be defined by inner peripheral surfaces of the housing 111. The direction of the carrier gas ejected from the opening 122 may be appropriately adjusted by appropriately adjusting the shapes of the inner peripheral surface 111C and the inner peripheral surface 111D. For example, the shape of the inner peripheral surface 111C and the shape of the inner peripheral surface 111D may be appropriately adjusted so that the Coanda effect is exhibited by the carrier gas ejected from the opening 122. Since the Coanda effect is exhibited by the carrier gas ejected from the opening 122, the carrier gas can entrain the lower gas and be ejected to the inside of the toilet bowl 103. With such a configuration, the gas generated from the feces can be carried to the evacuator 130 with a smaller amount of carrier gas.

As illustrated in FIG. 18, the carrier gas is ejected from the opening 122. The opening 122 may be defined as a region surrounded by an end portion 111C1 of the inner peripheral surface 111C of the housing 111 on the positive direction side of the X axis and an end portion 111D1 of the inner peripheral surface 111D of the housing 111 on the positive direction side of the X axis. The opening 122 faces the inside of the toilet bowl 103 in the top view illustrated in FIG. 12. For example, in the configuration illustrated in FIG. 17, the positive direction side of the X axis corresponds to the inside of the toilet bowl 103 in the top view illustrated in FIG. 12. That is, in the configuration illustrated in FIG. 17, the opening 122 faces the positive direction of the X axis. The opening 122 extends substantially along the inner edge 103A of the toilet bowl 103 illustrated in FIG. 12. For example, the inner edge 103A near the gas collector 110-1 illustrated in FIG. 12 has a gentle arc shape in a top view. Hence, in the configuration illustrated in FIG. 17, the Y direction corresponds to a direction in which the inner edge 103A near the gas collector 110-1 illustrated in FIG. 12 substantially extends. Thus, in the configuration illustrated in FIG. 18, the opening 122 extends in the Y direction.

The blower 123 illustrated in FIG. 16 may include, for example, a fan and a motor. The blower 123 blows the carrier gas stored in the storage unit 140 toward the opening 122 via the flow path 121 illustrated in FIG. 18 under the control of the control unit 163. However, a compressor-type device may be employed instead of the blower 123. In this case, the compressor-type device may be located outside the gas collector 110. Since the compressor-type device instead of the blower 123 is located outside the gas collector 110, the size of the gas collector 110 can be reduced.

As illustrated in FIG. 17, the evacuator 130 includes at least one nozzle 131. However, the evacuator 130 may include a plurality of nozzles 131. In the case where the evacuator 130 includes the plurality of nozzles 131, even when the suction force of one of the plurality of nozzles 131 decreases due to contamination or the like, the suction force of the other nozzles can be maintained. With such a configuration, the evacuator 130 can maintain reliability. As illustrated in FIG. 16, the evacuator 130 includes a blower 132.

The plurality of nozzles 131 are arranged substantially along the inner edge 103A of the toilet bowl 103 illustrated in FIG. 12. For example, as described above, in the configuration illustrated in FIG. 17, the Y direction corresponds to a direction in which the inner edge 103A near the gas collector 110-1 illustrated in FIG. 12 substantially extends. Thus, in the configuration illustrated in FIG. 17, the plurality of nozzles 131 are arranged along the Y direction. As illustrated in FIG. 17, the plurality of nozzles 131 may be arranged in the Y direction at a distance d1 therebetween. The distance d1 may be appropriately determined in consideration of the number of nozzles 131 and the like.

The nozzles 131 illustrated in FIG. 17 each may be constituted of a tubular member made of resin, ceramics, metal, glass, or the like. In the configuration illustrated in FIG. 17, the distal end portion of the nozzle 131 does not protrude from the front surface 111B. However, the distal end portion of the nozzle 131 illustrated in FIG. 17 may protrude from the front surface 111B similarly to a nozzle 331 illustrated in FIG. 22 described later or a nozzle 331a illustrated in FIG. 26 described later.

The blower 132 illustrated in FIG. 16 blows the gas near the nozzle 131 illustrated in FIG. 17 toward the storage unit 150 illustrated in FIG. 16 under the control of the control unit 163. Since the blower 132 blows the gas near the nozzle 131 illustrated in FIG. 6 toward the storage unit 150 illustrated in FIG. 16, the gas can be sucked from the nozzle 131 illustrated in FIG. 17.

The storage unit 140 illustrated in FIG. 16 includes a storage tank 141 and a pump 142. The storage tank 141 can store a carrier gas. The storage tank 141 may be constituted of a rectangular-parallelepiped, circular tubular, or bag-shaped tank. The carrier gas stored in the storage tank 141 can be supplied to the ejector 120. The carrier gas stored in the storage tank 141 can be supplied to the sensor unit 160 by the pump 142. The carrier gas is supplied to the sensor unit 160 as a purge gas. In the present embodiment, the same gas (air in the toilet room R) is used as the purge gas and the carrier gas. However, a gas different from the carrier gas may be used as the purge gas. The pump 142 may be constituted of a piezoelectric pump, a motor pump, or the like. The pump 142 supplies the carrier gas stored in the storage tank 141 to the sensor unit 160 under the control of the control unit 163.

The storage unit 150 illustrated in FIG. 16 includes a storage tank 151 and a pump 152. The storage tank 151 can store the sample gas sucked by the evacuator 130. The storage tank 151 may be constituted of a rectangular-parallelepiped, circular tubular, or bag-shaped tank. The sample gas stored in the storage tank 151 is supplied to the sensor unit 160 by the pump 152. The pump 152 may be constituted of a piezoelectric pump, a motor pump, or the like. The pump 152 supplies the sample gas stored in the storage tank 151 to the sensor unit 160 under the control of the control unit 163.

The sensor unit 160 illustrated in FIG. 16 outputs a voltage corresponding to the concentration of a specific gas to the control unit 163. The specific gas includes a specific gas to be detected and a specific gas not to be detected. When the sample gas is a gas generated from feces, examples of the specific gas to be detected include methane, hydrogen, carbon dioxide, methyl mercaptan, hydrogen sulfide, acetic acid, and trimethylamine. When the sample gas is a gas generated from feces, examples of the specific gas not to be detected include ammonia and water. Each of the plurality of sensor units 160 can output a voltage corresponding to the concentration of at least one of these gases to the control unit 163.

The carrier gas (purge gas) from the storage unit 140 and the sample gas from the storage unit 150 are alternately supplied to the sensor unit 160 illustrated in FIG. 16. When the carrier gas (purge gas) and the sample gas are alternately supplied, the sensor unit 160 outputs a voltage waveform to the control unit 163. The sensor unit 160 may include a semiconductor sensor, a catalytic combustion sensor, a solid-electrolyte sensor, or the like.

The memory 161 illustrated in FIG. 16 is constituted of, for example, a semiconductor memory or a magnetic memory. The memory 161 stores various kinds of information, a program for operating the gas collection device 101, and so forth. The memory 161 may function as a working memory.

The communication unit 162 illustrated in FIG. 16 can communicate with an external communication device. The external communication device may include an external server. A communication method used in communication between the communication unit 162 and the external communication device may be a short-range wireless communication standard, a wireless communication standard for connection to a mobile phone network, or a wired communication standard. Examples of the short-range wireless communication standard may include WiFi (registered trademark), Bluetooth (registered trademark), infrared, and NFC. The wireless communication standard for connection to the mobile phone network may include, for example, LTE or a fourth generation or higher mobile communication system. A communication method used in communication between the communication unit 162 and the external communication device may be a communication standard such as LPWA or LPWAN.

The control unit 163 illustrated in FIG. 16 includes at least one processor. The processor may include at least one of a general-purpose processor that reads a specific program and executes a specific function and a dedicated processor dedicated to a specific process. The dedicated processor may include an application specific IC. The processor may include a programmable logic device. The PLD may include an FPGA. The control unit 163 may include at least one of an SoC and an SiP in which one or more processors cooperate with each other. The control unit 163 can communicate with an external communication device via the communication unit 162.

The control unit 163 illustrated in FIG. 16 controls the pump 142 to supply the carrier gas (purge gas) stored in the storage tank 141 to the sensor unit 160. The control unit 163 controls the pump 152 to supply the sample gas stored in the storage tank 151 to the sensor unit 160. The control unit 163 alternately supplies the purge gas and the sample gas to the sensor unit 160 at a predetermined cycle. For example, as illustrated in FIG. 19, the control unit 163 supplies the purge gas and the sample gas to the sensor unit 160 at a predetermined cycle including a period T1 and a period T2.

Figure 19:
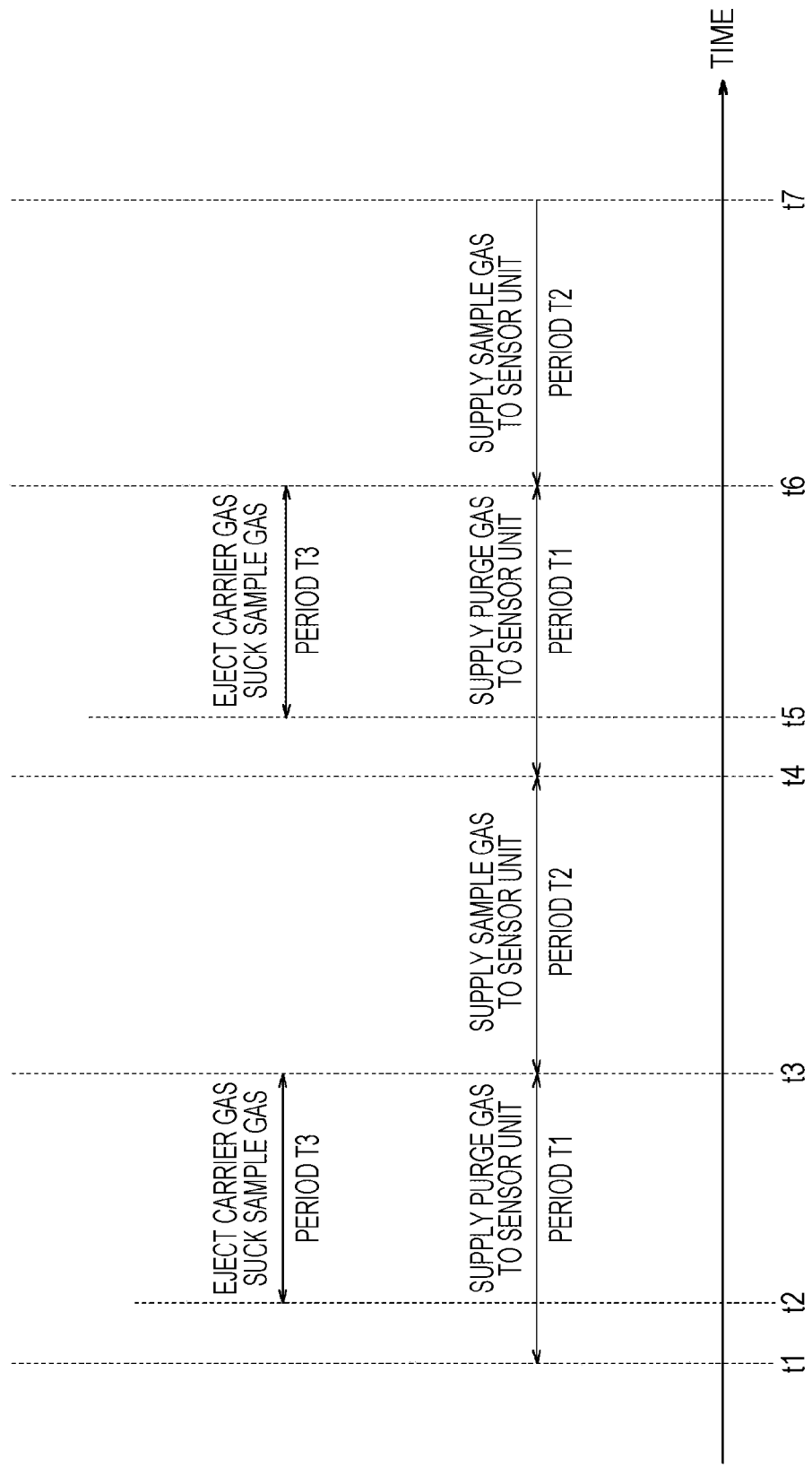
FIG. 19 is a timing chart presenting an example of control of the gas collection device illustrated in FIG. 12.

FIG. 19 is a timing chart presenting an example of control of the gas collection device 101 illustrated in FIG. 12. As illustrated in FIG. 19, the control unit 163 supplies the purge gas to the sensor unit 160 in a period (period T1) from a time t1 to a time t3. The control unit 163 supplies the sample gas to the sensor unit 160 in a period (period T2) from the time t3 to a time t4. The control unit 163 supplies the purge gas to the sensor unit 160 in a period (period T1) from the time t4 to a time t6. The control unit 163 supplies the sample gas to the sensor unit 160 in a period (period T2) from the time t6 to a time t7.

The control unit 163 illustrated in FIG. 16 acquires a voltage waveform from the sensor unit 160 by alternately supplying the purge gas and the sample gas to the sensor unit 160 at a predetermined cycle. The control unit 163 detects the type and concentration of the gas included in the sample gas based on the acquired voltage waveform. For example, the control unit 163 detects the type and concentration of the gas included in the sample gas by machine learning for the voltage waveform. The control unit 163 may transmit the detected type and concentration of the gas included in the sample gas to an external communication device via the communication unit 162.

The control unit 163 can control the ejector 120 and the evacuator 130. The control unit 163 controls the blower 123 to cause the ejector 120 to eject the carrier gas. The control unit 163 controls the blower 132 to cause the evacuator 130 to suck the sample gas. The control unit 163 may cause the ejector 120 to eject the carrier gas and cause the evacuator 130 to suck the sample gas for a period set based on the above-described predetermined cycle.

For example, as illustrated in FIG. 19, the control unit 163 may cause the ejector 120 to eject the carrier gas for a period T3 set based on a predetermined cycle and cause the evacuator 130 to suck the sample gas. More specifically, the control unit 163 may cause the ejector 120 to eject the carrier gas and cause the evacuator 130 to suck the sample gas in a period (period T3) from a time t2 to the time T3 and in a period (period T3) from a time t5 to the time t6. In this manner, since the ejector 120 is caused to eject the carrier gas and the evacuator 130 is caused to suck the sample gas in the period T3, the ejector 120 can be prevented from continuously ejecting the carrier gas. Since the ejector 120 is prevented from continuously ejecting the carrier gas, it is possible to reduce the probability that the concentration of the gas generated from the feces in the toilet bowl 103 decreases due to the carrier gas.

In this manner, in the gas collection device 101 according to the fourth embodiment, as illustrated in FIG. 13, the evacuator 130 is located closer to the toilet bowl 103 than the ejector 120 in the Z direction. The distal end portion of the evacuator 130 is retracted from the distal end portion of the ejector 120 in a direction from the inner edge 103A toward the outer edge 103B of the toilet bowl 103. Since the evacuator 130 is located closer to the toilet bowl 103 than the ejector 120 and the distal end portion of the evacuator 130 is retracted from the distal end portion of the ejector 120, it is possible to reduce the probability that the evacuator 130 interferes with the flow of the carrier gas ejected by the ejector 120. Since the evacuator 130 is located closer to the toilet bowl 103 than the ejector 120 and the distal end portion of the evacuator 130 is retracted from the distal end portion of the ejector 120, the evacuator 130 can be located at a position to which the gas generated from the feces is likely carried by the carrier gas. With such a configuration, in the gas collection device 101 according to the present embodiment, the evacuator 130 can efficiently collect the gas generated from the feces.

In the gas collection device 101 according to the fourth embodiment, as illustrated in FIG. 13, the gas collector 110 is disposed between the toilet seat 102 and the toilet bowl 103 not to protrude from the inner edge 102A of the toilet seat 102 and the inner edge 103A of the toilet bowl 103. With such a configuration, it is possible to reduce the probability that the gas collector 110 is contaminated by feces, urine, or the like of the subject.

Therefore, according to the fourth embodiment, an improved gas collection device 101 and an improved method for controlling the gas collection device 101 can be provided.

Fifth Embodiment

Figure 20:
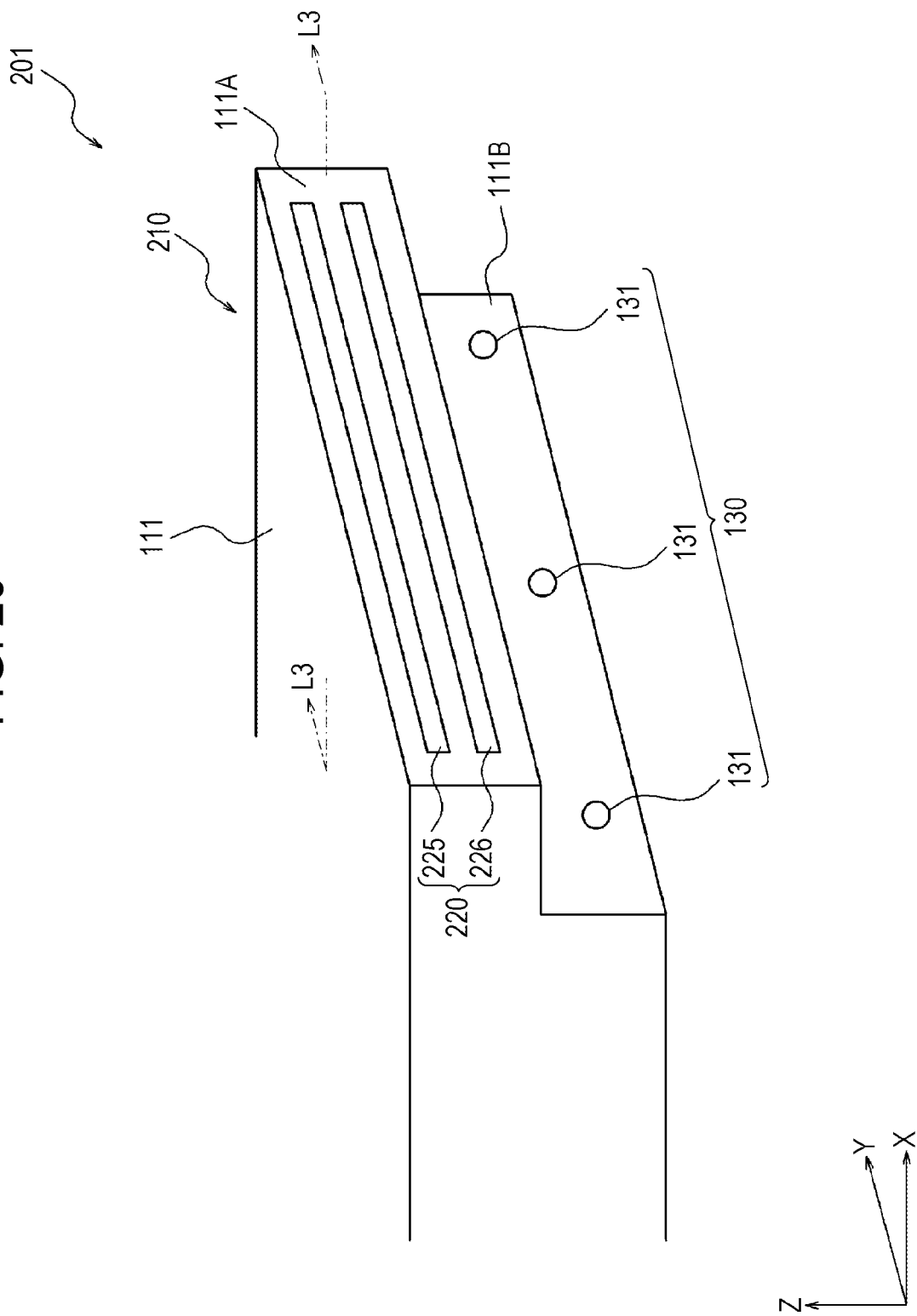
FIG. 20 is a view illustrating a gas collector of a gas collection device according to a fifth embodiment of the present disclosure.
Figure 21:
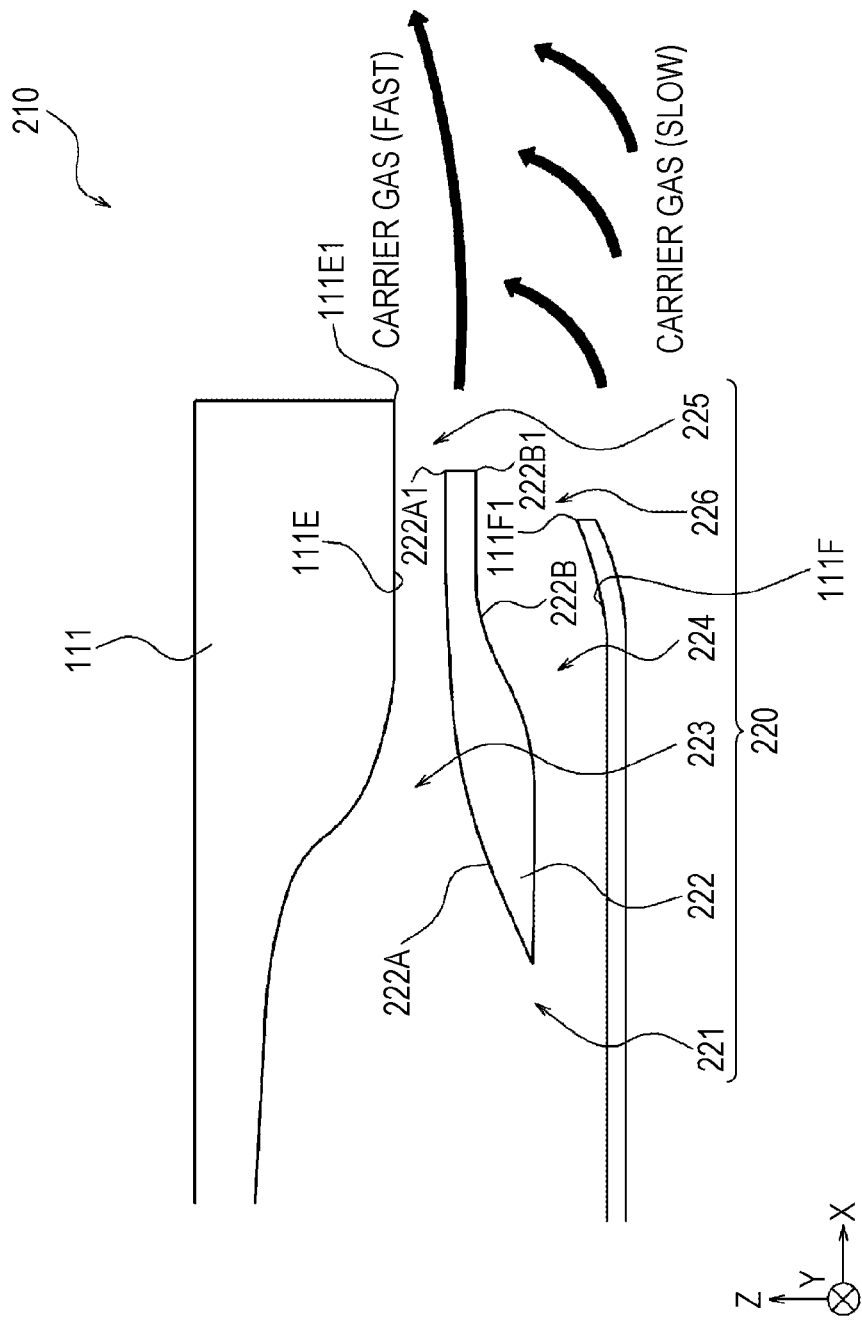
FIG. 21 is a cross-sectional view of an ejector taken along line L3-L3 illustrated in FIG. 20.

FIG. 20 is a view illustrating a gas collector 210 of a gas collection device 201 according to a fifth embodiment of the present disclosure. FIG. 20 is a partial enlarged view of the gas collector 210. FIG. 21 is a cross-sectional view of an ejector 220 taken along line L3-L3 illustrated in FIG. 20.

As illustrated in FIG. 20, the gas collection device 201 includes at least one gas collector 210. Similarly to the gas collection device 101 according to the fourth embodiment, the gas collection device 201 may include, in addition to the gas collector 210, a storage unit 140, a storage unit 150, a plurality of sensor units 160, a memory 161, a communication unit 162, and a control unit 163 like those illustrated in FIG. 16 described above.

Similarly to the gas collector 110 according to the fourth embodiment, the gas collector 210 illustrated in FIG. 20 is disposed between the toilet seat 102 and the toilet bowl 103 not to protrude from the inner edge 102A of the toilet seat 102 and the inner edge 103A of the toilet bowl 103 illustrated in FIG. 12 described above.

As illustrated in FIG. 21, the gas collector 210 includes the ejector 220 in a housing 111. As illustrated in FIG. 20, the gas collector 210 includes an evacuator 130 in the housing 111. The gas collector 210 may include an evacuator 330 illustrated in FIG. 22 described later or an evacuator 330a illustrated in FIG. 26 described later instead of the evacuator 130.

As illustrated in FIG. 20, the housing 111 includes a front surface 111A and a front surface 111B similarly to the configuration illustrated in FIG. 17 described above. As illustrated in FIG. 21, the housing 111 includes an inner peripheral surface 111E and an inner peripheral surface 111F. The inner peripheral surface 111E is an inner peripheral surface located on the positive direction side of the Z axis among the inner peripheral surfaces of the housing 111. The inner peripheral surface 111F is an inner peripheral surface located on the negative direction side of the Z axis among the inner peripheral surfaces of the housing 111.

As illustrated in FIG. 21, the ejector 220 includes a flow path 221, an adjustment member 222, a flow path 223, a flow path 224, a first opening 225, and a second opening 226. The ejector 220 includes a blower 123 similarly to the ejector 120 illustrated in FIG. 16 described above.

When the blower 123 illustrated in FIG. 16 described above is driven, the carrier gas stored in the storage unit 140 illustrated in FIG. 16 described above can flow into the flow path 221 illustrated in FIG. 21. The flow path 221 may be defined by inner peripheral surfaces of the housing 111. The flow path 221 branches into the flow path 223 and the flow path 224 on the positive direction side of the X axis.

The adjustment member 222 illustrated in FIG. 21 is located between the flow path 223 and the flow path 224. The adjustment member 222 may be a portion of the housing 111. The adjustment member 222 includes an outer peripheral surface 222A and an outer peripheral surface 222B. The outer peripheral surface 222A is an outer peripheral surface located on the positive direction side of the Z axis among the outer peripheral surfaces of the adjustment member 222. The outer peripheral surface 222B is an outer peripheral surface located on the negative direction side of the Z axis among the outer peripheral surfaces of the adjustment member 222.

The flow path 223 illustrated in FIG. 21 is connected to the flow path 221. The carrier gas from the flow path 221 flows into the flow path 223. The carrier gas flowing into the flow path 223 is ejected from the first opening 225. The flow path 223 may be defined by the inner peripheral surface 111E of the housing 111 and the outer peripheral surface 222A of the adjustment member 222. The shape of the inner peripheral surface 111E and the shape of the outer peripheral surface 222A may be appropriately adjusted so that the flow velocity of the carrier gas ejected from the first opening 225 is higher than the flow velocity of the carrier gas ejected from the second opening 226.

The flow path 224 illustrated in FIG. 21 is connected to the flow path 221. The carrier gas from the flow path 221 flows into the flow path 224. The carrier gas flowing into the flow path 224 is ejected from the second opening 226. The flow path 224 is located on the negative direction side of the Z axis with respect to the flow path 223. The flow path 224 may be defined by the inner peripheral surface 111F of the housing 111 and the outer peripheral surface 222B of the adjustment member 222. The shape of the inner peripheral surface 111F and the shape of the outer peripheral surface 222B may be appropriately adjusted so that the flow velocity of the carrier gas ejected from the second opening 226 is higher than the flow velocity of the carrier gas ejected from the first opening 225.

As illustrated in FIG. 21, the carrier gas is ejected from the first opening 225. The first opening 225 may be defined as a region surrounded by an end portion 111E1 of the inner peripheral surface 111E of the housing 111 on the positive direction side of the X axis and an end portion 222A1 of the outer peripheral surface 222A of the adjustment member 222 on the positive direction side of the X axis. The flow velocity of the carrier gas ejected from the first opening 225 is higher than the flow velocity of the carrier gas ejected from the second opening 226. The first opening 225 faces the inside of the toilet bowl 103 in the top view illustrated in FIG. 12 described above, similarly to the opening 122 illustrated in FIG. 17 described above. The first opening 225 extends along the inner edge 103A of the toilet bowl 103 illustrated in FIG. 12 described above, similarly to the opening 122 illustrated in FIG. 17 described above.

As illustrated in FIG. 21, the carrier gas is ejected from the second opening 226. The second opening 226 may be defined as a region surrounded by an end portion 111F1 of the inner peripheral surface 111F of the housing 111 on the positive direction side of the X axis and an end portion 222B1 of the outer peripheral surface 222B of the adjustment member 222 on the positive direction side of the X axis. The flow velocity of the carrier gas ejected from the second opening 226 is lower than the flow velocity of the carrier gas ejected from the first opening 225. As illustrated in FIG. 20, the second opening 226 is located on the negative direction side of the Z axis with respect to the first opening 225. In other words, the second opening 226 is located closer to the toilet bowl 103 than the first opening 225 between the toilet seat 102 and the toilet bowl 103 illustrated in FIG. 12. Similarly to the first opening 225, the second opening 226 faces the inside of the toilet bowl 103 in the top view illustrated in FIG. 12 described above. Similarly to the first opening 225, the second opening 226 extends along the inner edge 103A of the toilet bowl 103 illustrated in FIG. 12 described above.

Thus, in the gas collector 210 according to the fifth embodiment, as illustrated in FIG. 21, the flow velocity of the carrier gas ejected from the first opening 225 is higher than the flow velocity of the carrier gas ejected from the second opening 226. With such a configuration, the gas collector 210 according to the fifth embodiment can efficiently exhibit the Coanda effect. Since the Coanda effect is efficiently exhibited, the carrier gas can efficiently swirl inside the toilet bowl 103 illustrated in FIG. 13 described above. Since the carrier gas efficiently swirls inside the toilet bowl 103 illustrated in FIG. 13 described above, the carrier gas can efficiently carry the gas generated from the feces to the evacuator 130 illustrated in FIG. 20. Thus, the gas collector 210 according to the fifth embodiment can more efficiently collect the gas generated from the feces.

Other effects and configurations of the gas collection device 201 according to the fifth embodiment are similar to those of the gas collection device 101 according to the fourth embodiment.

Sixth Embodiment

Figure 22:
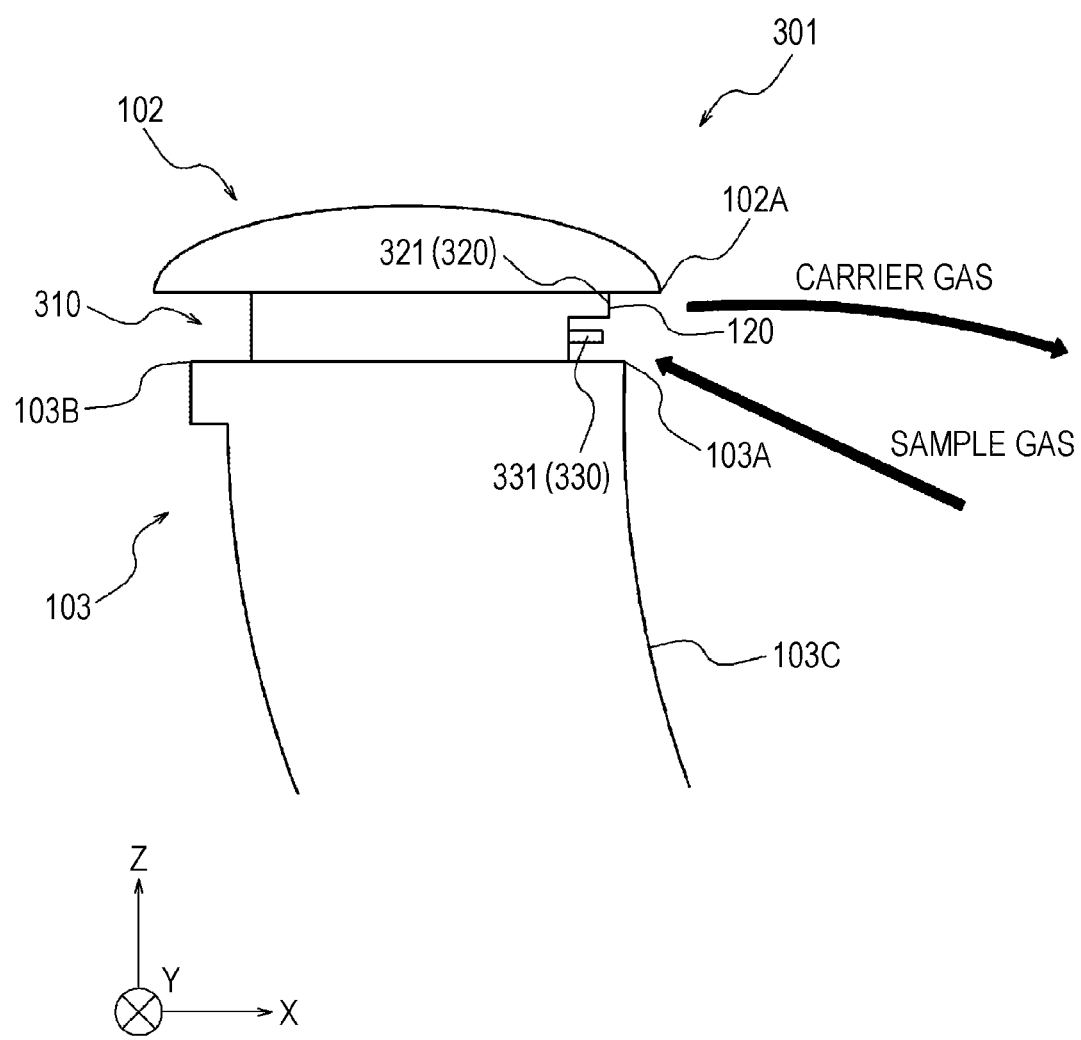
FIG. 22 is a view illustrating a gas collector of a gas collection device according to a sixth embodiment of the present disclosure.
Figure 23:
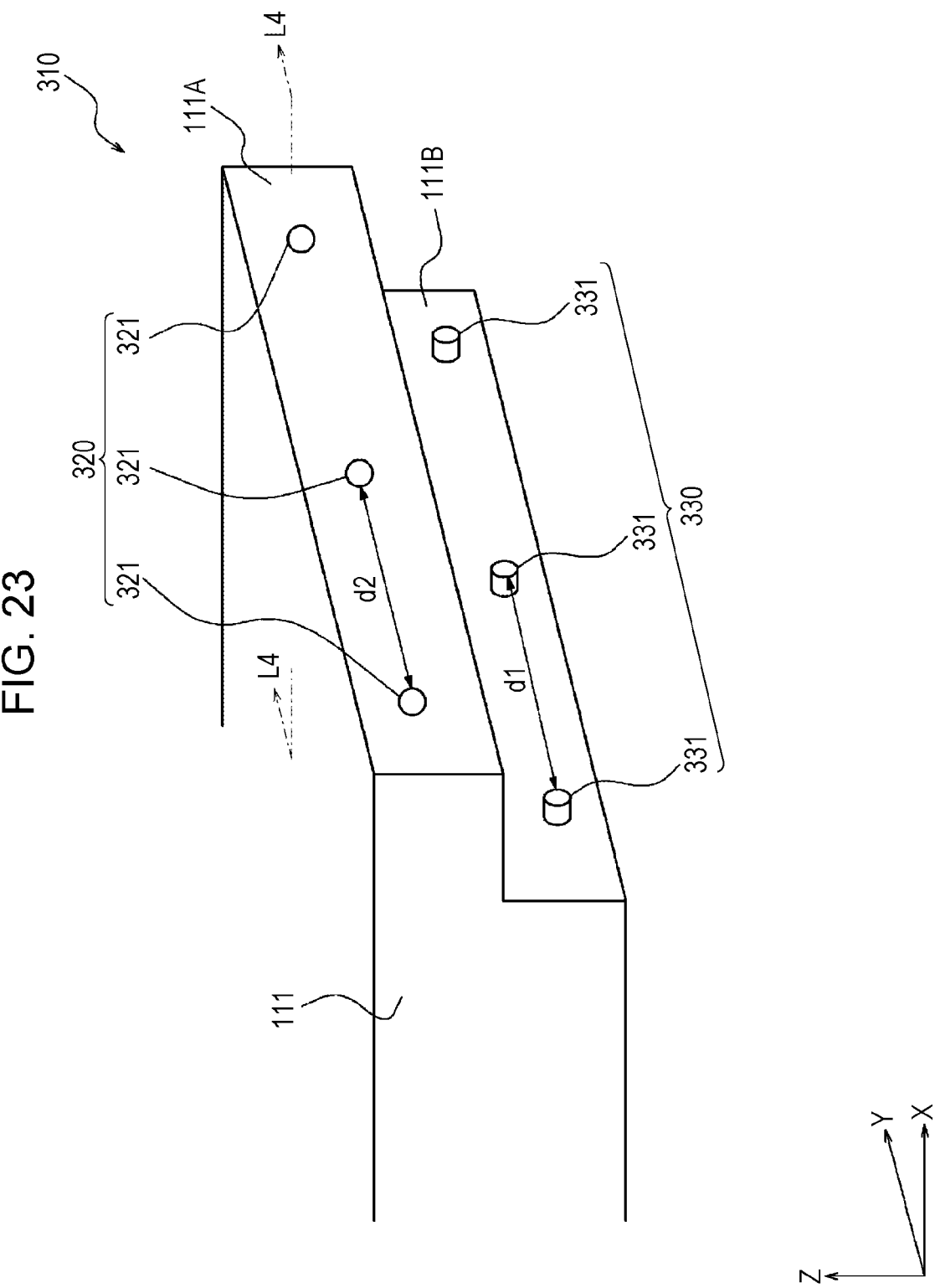
FIG. 23 is a partial enlarged view of the gas collector illustrated in FIG. 22.

FIG. 22 is a view illustrating a gas collector 310 of a gas collection device 301 according to a sixth embodiment of the present disclosure. FIG. 22 corresponds to a cross-sectional view taken along line L1-L1 illustrated in FIG. 12. FIG. 23 is a partial enlarged view of the gas collector 310 illustrated in FIG. 22. FIG. 24 is a cross-sectional view of an ejector 320 taken along line L4-L4 illustrated in FIG. 23.

As illustrated in FIG. 22, the gas collection device 301 includes at least one gas collector 310. Similarly to the gas collection device 101 according to the fourth embodiment, the gas collection device 301 may include, in addition to the gas collector 310, a storage unit 140, a storage unit 150, a plurality of sensor units 160, a memory 161, a communication unit 162, and a control unit 163 like those illustrated in FIG. 16 described above.

Similarly to the gas collector 110 according to the fourth embodiment, the gas collector 310 illustrated in FIG. 22 is disposed between the toilet seat 102 and the toilet bowl 103 not to protrude from the inner edge 102A of the toilet seat 102 and the inner edge 103A of the toilet bowl 103.

As illustrated in FIG. 23, the gas collector 310 includes the ejector 320 in a housing 111. As illustrated in FIG. 23, the gas collector 310 includes an evacuator 330 in the housing 111. The gas collector 310 may include the evacuator 130 illustrated in FIG. 17 described above instead of the evacuator 330.

As illustrated in FIG. 23, the ejector 320 includes a plurality of nozzles 321. The ejector 320 includes a blower 123 similarly to the ejector 120 illustrated in FIG. 16 described above.

The nozzles 321 illustrated in FIG. 23 each may be constituted of a tubular member such as a resin tube or a metal or glass pipe. The plurality of nozzles 321 are arranged substantially along the inner edge 103A of the toilet bowl 103 illustrated in FIG. 12 described above. For example, the inner edge 103A near the gas collector 110-1 illustrated in FIG. 12 has a gentle arc shape in a top view as described above. Hence, in the configuration illustrated in FIG. 23, the Y direction corresponds to a direction in which the inner edge 103A near the gas collector 110-1 illustrated in FIG. 12 substantially extends. Thus, in the configuration illustrated in FIG. 23, the plurality of nozzles 321 are arranged in the Y direction. The plurality of nozzles 321 may be arranged in the Y direction at a distance d2 therebetween. The distance d2 may be appropriately determined in consideration of the number of nozzles 321 and the like. The distance d2 may be similar to the distance d1.

As illustrated in FIG. 24, the nozzles 321 may be embedded inside the housing 111. When the blower 123 illustrated in FIG. 16 described above is driven, the carrier gas stored in the storage unit 140 illustrated in FIG. 16 described above can flow into the nozzles 321. The carrier gas flowing into the nozzles 321 is ejected from distal end portions of the nozzles 321. Inner peripheral surfaces 321A of the distal end portions of the nozzles 321 may be appropriately adjusted in consideration of the direction of the carrier gas ejected from the distal end portions of the nozzles 321.

As illustrated in FIG. 23, the evacuator 330 includes a plurality of nozzles 331. The evacuator 330 includes a blower 132 similarly to the evacuator 130 illustrated in FIG. 16 described above.

Similarly to the nozzles 131 illustrated in FIG. 17 described above, the nozzles 331 illustrated in FIG. 23 each may be constituted of a tubular member such as a resin tube or a metal or glass pipe. Similarly to the nozzles 131 illustrated in FIG. 17 described above, the plurality of nozzles 331 are arranged substantially along the inner edge 103A of the toilet bowl 103 illustrated in FIG. 12 described above at the distance d1 therebetween, for example.

As illustrated in FIG. 23, the nozzles 331 protrude from the front surface 111B of the housing 111. That is, the nozzles 331 protrude from the housing 111 of the gas collector 310. With such a configuration, the nozzles 331 can suck the sample gas more efficiently depending on the shape of the inner surface 103C of the toilet bowl 103 illustrated in FIG. 22.

Other effects and configurations of the gas collection device 301 according to the sixth embodiment are similar to those of the gas collection device 101 according to the fourth embodiment.

(Another Example of Sixth Embodiment)

FIG. 25 is a cross-sectional view of an ejector 320a as another example taken along line L4-L4 illustrated in FIG. 23. As illustrated in FIG. 25, the ejector 320a may include a needle 322 inside the nozzle 321.

The needle 322 may be made of a metal material or a synthetic resin material. The inner diameter of the needle 322 is smaller than the inner diameter of the nozzle 321. When the blower 123 illustrated in FIG. 16 described above is driven, the carrier gas stored in the storage unit 140 illustrated in FIG. 16 described above can flow into an area between the outer peripheral surface of the needle 322 and the inner peripheral surface of the nozzle 321. The carrier gas flowing between the outer peripheral surface of the needle 322 and the inner peripheral surface of the nozzle 321 is ejected from the distal end portion of the ejector 320a. Since the carrier gas passes through the area between the outer peripheral surface of the needle 322 and the inner peripheral surface of the nozzle 321, the flow velocity of the carrier gas ejected from the ejector 320a can be increased. Since the flow velocity of the carrier gas is increased, the carrier gas can be ejected farther. Since the carrier gas is ejected farther, the carrier gas can be efficiently swirled depending on the shape of the inner surface 103C of the toilet bowl 103 illustrated in FIG. 22.

Other effects and configurations of the ejector 320a are similar to those of the ejector 320 illustrated in FIG. 23.

(Still Another Example of Sixth Embodiment)

Figure 26:
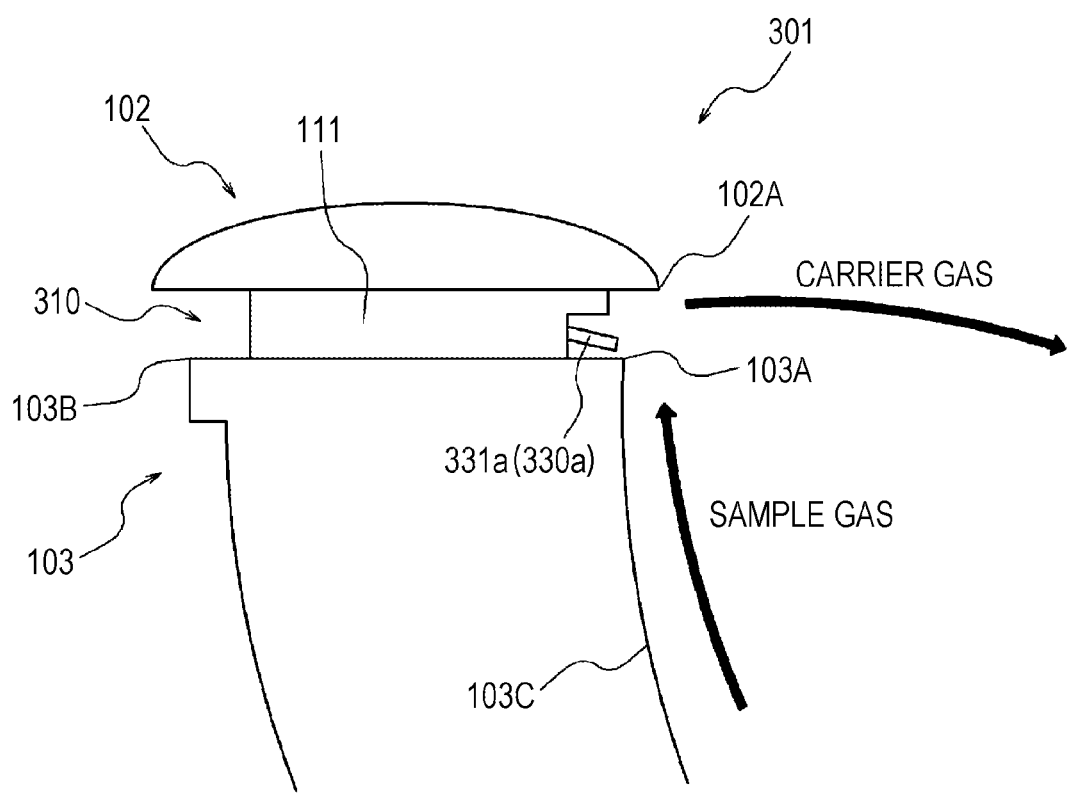
FIG. 26 is a diagram illustrating an evacuator of another example according to the sixth embodiment of the present disclosure.

FIG. 26 is a diagram illustrating an evacuator 330a of another example according to the sixth embodiment of the present disclosure. The evacuator 330a includes a nozzle 331a instead of the nozzle 331 illustrated in FIG. 22.

Similarly to the nozzles 331 illustrated in FIG. 23, a plurality of nozzles 331a protrude from the housing 111 of the gas collector 310. The distal ends of the plurality of nozzles 331a face the inner surface 103C of the toilet bowl 103. For example, the distal ends of the plurality of nozzles 331a may be inclined toward the inner surface 103C of the toilet bowl 103.

Depending on the shape of the inner surface 103C of the toilet bowl 103, the gas generated from the feces may flow toward the gas collector 310 along the surface of the inner surface 103C together with the carrier gas. In this case, since the distal ends of the plurality of nozzles 331a face the inner surface 103C of the toilet bowl 103, the evacuator 330a can efficiently suck the sample gas.

Other effects and configurations of the evacuator 330a are similar to those of the evacuator 330 illustrated in FIG. 23.

Hereinafter, seventh to fourteenth embodiments according to the present disclosure will be described with reference to FIGS. 27 to 45. In the present disclosure, examples of "a liquid flowing out from a flow path" may include water, alkaline electrolyzed water, any cleaning water except water and alkaline electrolyzed water, and a liquid detergent. In the following embodiments, "a liquid flowing out from a flow path" is assumed to be water, but is not limited thereto.

Seventh Embodiment

Figure 27:
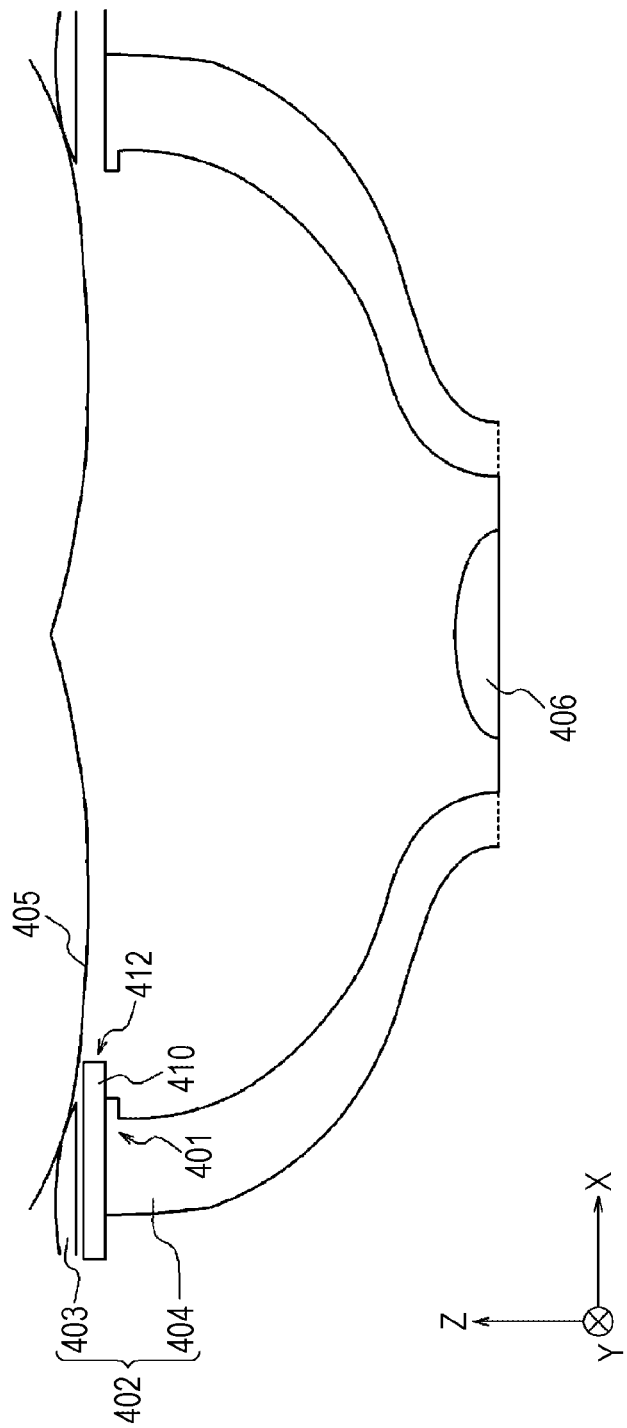
FIG. 27 is a schematic view of a gas detection device according to a seventh embodiment of the present disclosure.

FIG. 27 is a schematic view of a gas detection device 401 according to a seventh embodiment of the present disclosure. The gas detection device 401 is disposed in a toilet 402. The toilet 402 may be, but is not limited to, a flush toilet. The toilet 402 includes a toilet seat 403 and a toilet bowl 404. The gas detection device 401 may be located between the toilet bowl 404 and the toilet seat 403. When a subject is sitting on the toilet seat 403, buttocks 405 of the subject can be located above the toilet seat 403. Feces 406 of the subject are discharged into the toilet bowl 404. The gas detection device 401 acquires a gas generated from the feces 406 as a sample gas. The gas detection device 401 detects the type and concentration of a gas included in the sample gas.

In the present embodiment, a direction from the outside toward the inside of the toilet bowl 404 illustrated in FIG. 27 is referred to as a positive direction of the X axis. A direction opposite to the positive direction of the X axis is referred to as a negative direction of the X axis. Hereinafter, the positive direction of the X axis is also referred to as a "+X direction". The negative direction of the X axis is also referred to as a "−X direction". When the +X direction and the −X direction are not particularly distinguished from each other, the +X direction and the −X direction are simply referred to as an "X direction". A direction from the toilet bowl 404 toward the toilet seat 403 is referred to as a positive direction of the Z axis. A direction opposite to the positive direction of the Z axis is referred to as a negative direction of the Z axis. Hereinafter, the positive direction of the Z axis is also referred to as a "+Z direction". The negative direction of the Z axis is referred to as a "−Z direction". When the +Z direction and the −Z direction are not particularly distinguished from each other, the +Z direction and the −Z direction are simply referred to as a "Z direction". The positive direction of the Y axis and the negative direction of the Y axis are defined to constitute a right-handed coordinate system. Hereinafter, the positive direction of the Y axis is also referred to as a "+Y direction". The negative direction of the Y axis is also referred to as a "−Y direction". When the +Y direction and the −Y direction are not particularly distinguished from each other, the +Y direction and the −Y direction are simply referred to as a "Y direction".

Figure 28:
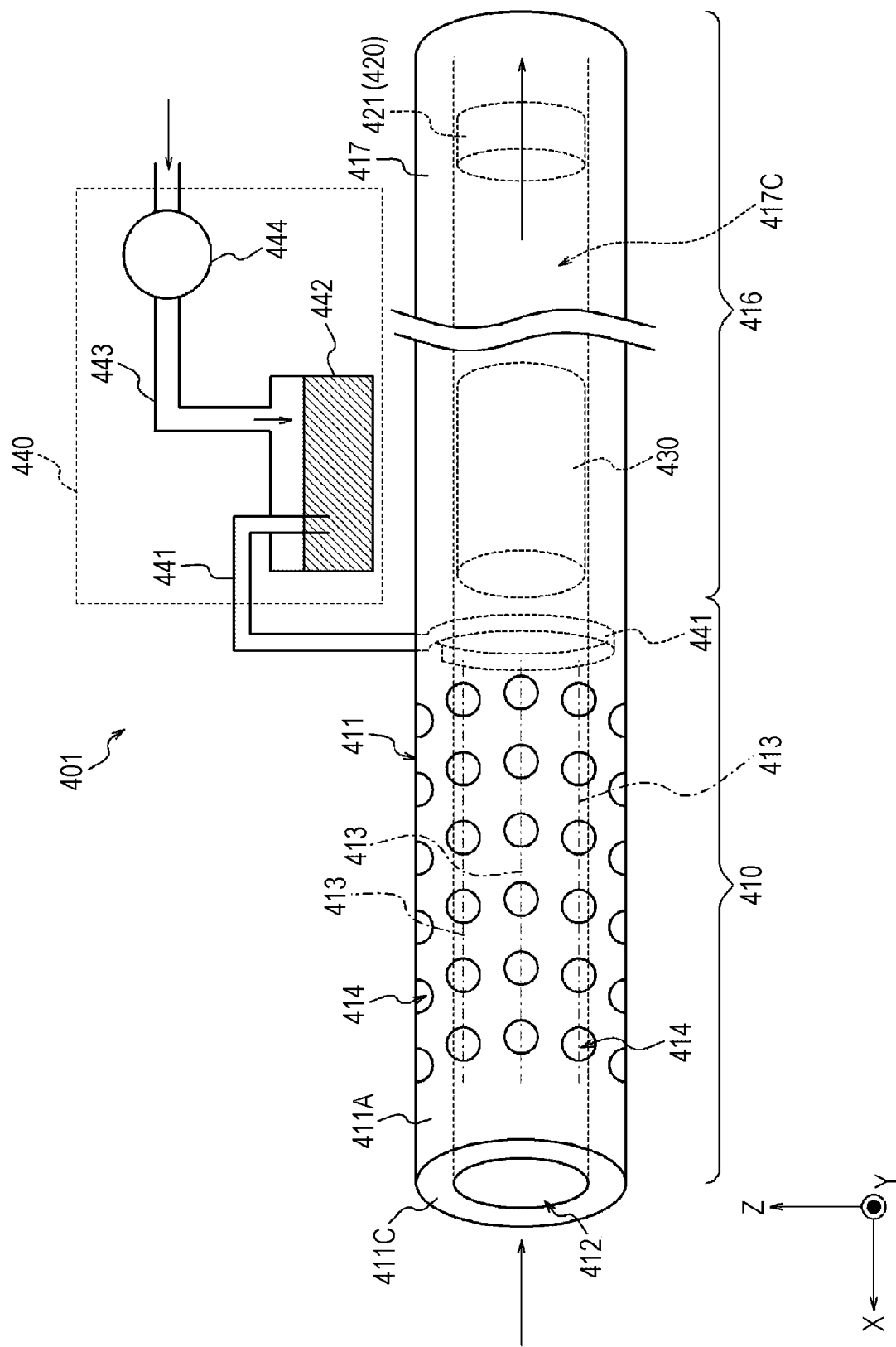
FIG. 28 is an external view of the gas detection device illustrated in FIG. 27.
Figure 29:
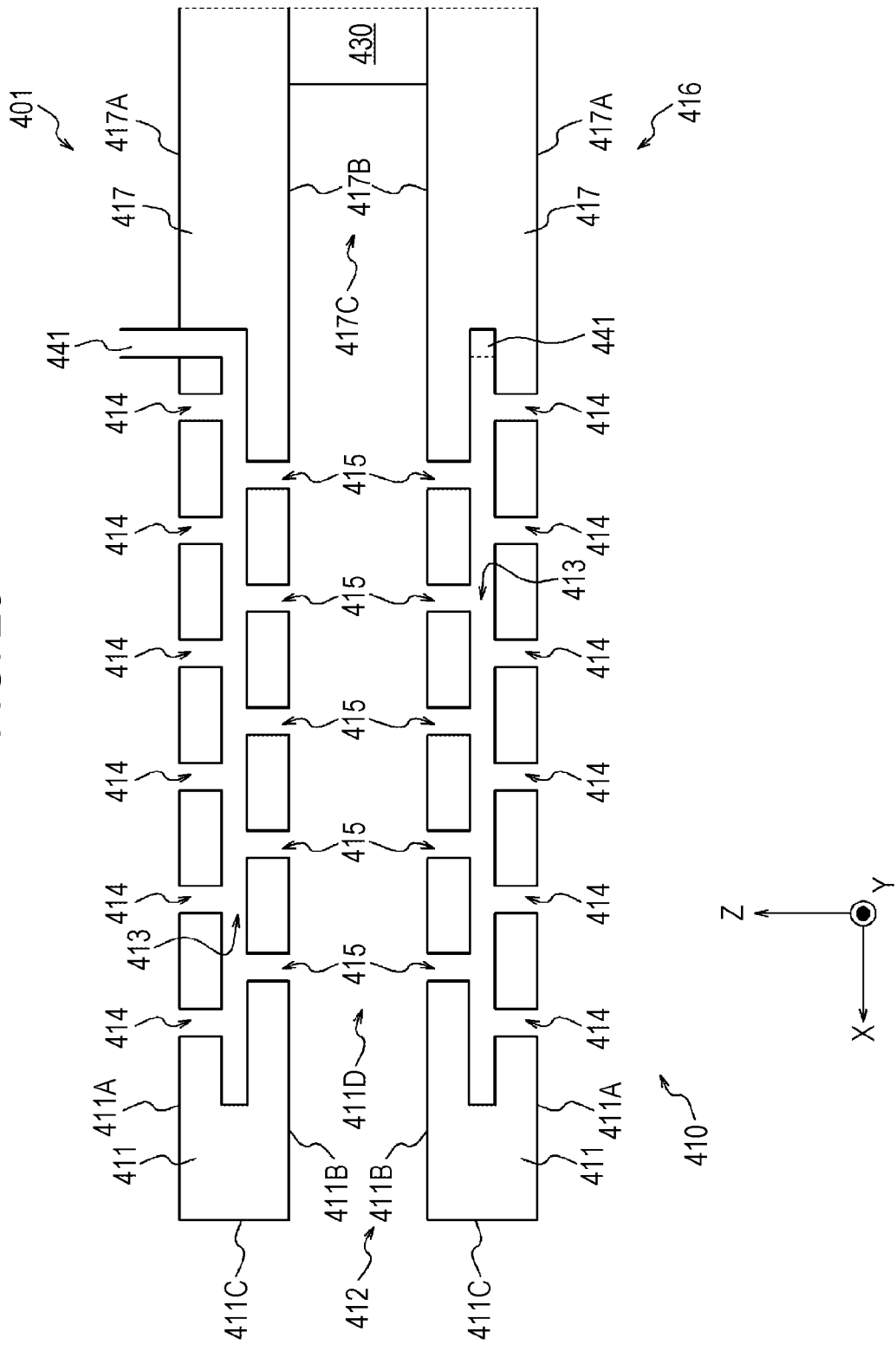
FIG. 29 is a sectional end view of the gas detection device illustrated in FIG. 28.
Figure 30:
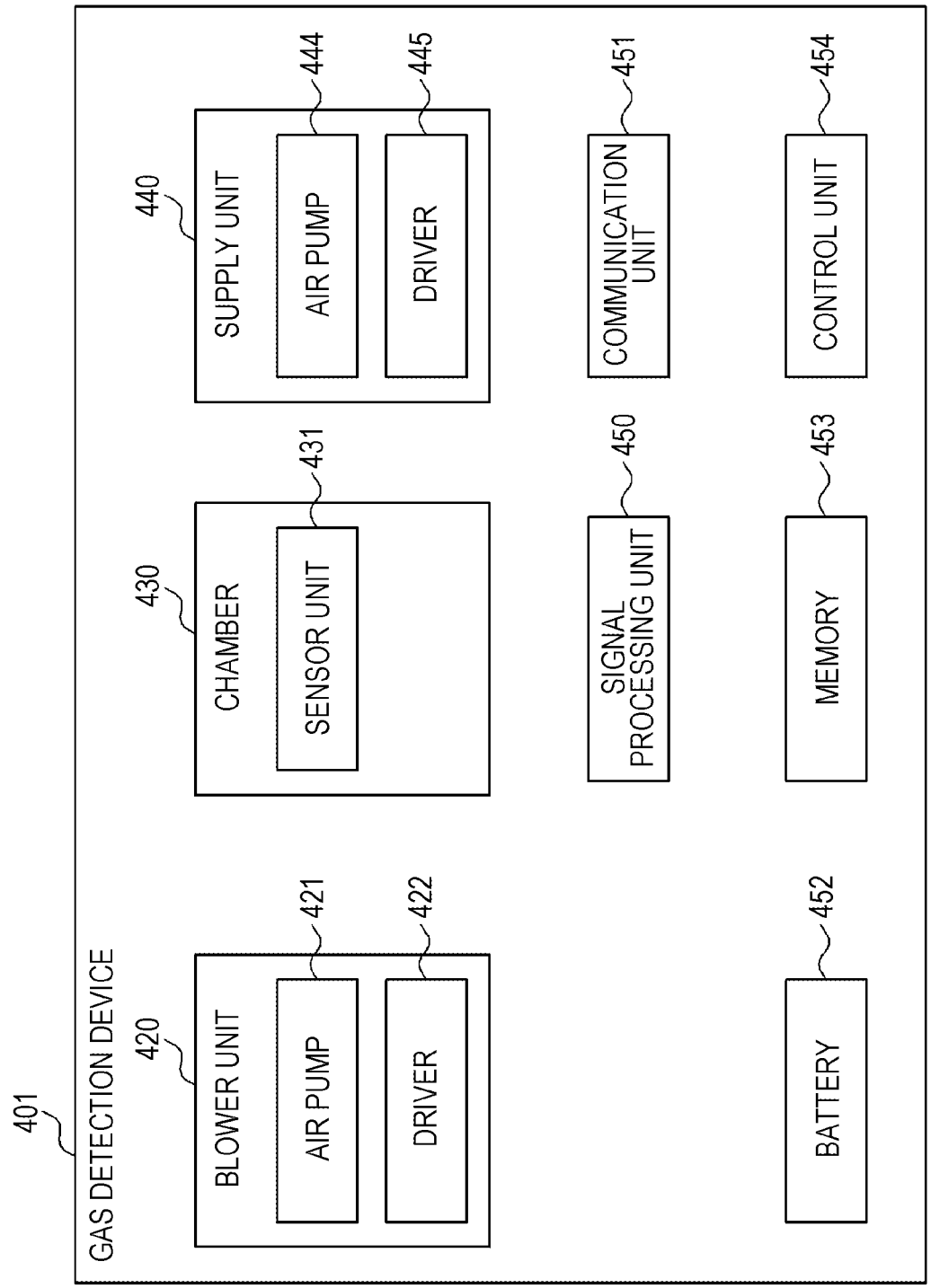
FIG. 30 is a functional block diagram of the gas detection device illustrated in FIG. 27.

FIG. 28 is an external view of the gas detection device 401 illustrated in FIG. 27. FIG. 29 is a sectional end view of the gas detection device 401 illustrated in FIG. 28. FIG. 30 is a functional block diagram of the gas detection device 401 illustrated in FIG. 27.

As illustrated in FIG. 27, the gas detection device 401 may be substantially parallel to the X direction. As illustrated in FIGS. 28 and 29, the gas detection device 401 includes a nozzle portion 410, a flow path 413, first outflow holes 414 and second outflow holes 415 as outflow holes, and a support portion 416. FIG. 28 indicates the position of the flow path 413 by a broken line. As illustrated in FIG. 29, the gas detection device 401 includes two types of outflow holes including the first outflow holes 414 and the second outflow holes 415. However, the gas detection device 401 may include at least the first outflow holes 414 or the second outflow holes 415. As illustrated in FIG. 30, the gas detection device 401 includes a blower unit 420, a chamber 430, a supply unit 440, a signal processing unit 450, a communication unit 451, a battery 452, a memory 453, and a control unit 454.

As illustrated in FIG. 27, the nozzle portion 410 may protrude toward the inside of the toilet bowl 404. As illustrated in FIG. 27, the nozzle portion 410 may be substantially parallel to the X direction. However, the shape of the nozzle portion 410 is not limited to being substantially parallel to the X direction. For example, the nozzle portion 410 may have a shape illustrated in FIG. 45 described later. The nozzle portion 410 includes a tubular side wall 411 and an opening 412.

As illustrated in FIG. 28, the side wall 411 may be circular tubular. The side wall 411 may be made of a material such as metal or resin. The side wall 411 may be made of a water-repellent material such as a fluorocarbon polymer, for example, polytetrafluoroethylene. Alternatively, the side wall 411 may be formed into a shape using a material having excellent workability such as polyester and the surface thereof may be coated with a water-repellent material. As illustrated in FIG. 29, the side wall 411 includes an outer surface 411A, an inner surface 411B, an end portion 411C, and a region 411D. The region 411D may be defined as a region surrounded by the inner surface 411B. At least one of the outer surface 411A, the inner surface 411B, and the end portion 411C may be coated with a water-repellent material. Examples of the above-described water-repellent material include substances having functional groups such as saturated fluoroalkyl groups, alkylsilyl groups, fluorosilyl groups, and long-chain alkyl groups.

As illustrated in FIG. 27, the opening 412 is open toward the inside of the toilet bowl 404. As illustrated in FIG. 29, the opening 412 may be defined as a region surrounded by the end portion 411C on the +X direction side of the inner surface 411B of the side wall 411. The opening 412 may be circular.

A cleaning liquid such as water is supplied from the supply unit 440 to the flow path 413 illustrated in FIG. 28. For example, the water supplied to the flow path 413 flows out from the first outflow holes 414 and the second outflow holes 415 illustrated in FIG. 29. The water flowing out from the first outflow holes 414 and the second outflow holes 415 can remove the feces, urine, and the like adhering to the nozzle portion 410. In other words, the nozzle portion 410 can be cleaned with the water flowing out from the first outflow holes 414 and the second outflow holes 415.

As illustrated in FIG. 29, the flow path 413 is located inside the side wall 411. One end portion on the −X direction side of the flow path 413 is connected to a water pipe 441 of the supply unit 440. The flow path 413 may extend to the vicinity of the end portion 411C of the side wall 411. The flow path 413 may be constituted of a tubular member such as a resin tube or a metal or glass pipe. Alternatively, the flow path 413 may be formed directly in the side wall 411.

The number and positions of flow paths 413 may be appropriately adjusted in accordance with the arrangement or the like of the first outflow holes 414 and the second outflow holes 415. For example, when the first outflow holes 414 are arranged in the X direction as illustrated in FIG. 28, the flow path 413 may extend in the X direction. For example, as illustrated in FIG. 28, when the first outflow holes 414 are arranged in the circumferential direction of the side wall 411, a plurality of flow paths 413 may be arranged in the circumferential direction of the side wall 411. For example, when the first outflow holes 414 and the second outflow holes 415 illustrated in FIG. 29 are located only on the +Z direction side and the −Z direction side, two flow paths 413 may be located on the +Z direction side and the −Z direction side.

The first outflow holes 414 illustrated in FIG. 29 extend from the flow path 413 toward the outer surface 411A of the side wall 411. The first outflow holes 414 are open toward the outer surface 411A. As illustrated in FIG. 28, the first outflow holes 414 may be located over the circumference of the outer surface 411A of the side wall 411. As illustrated in FIG. 28, the first outflow holes 414 may be arranged in the X direction. For example, the first outflow holes 414 may be arranged substantially parallel to the X direction. The first outflow holes 414 each may be constituted of a tubular member such as a resin tube or a metal or glass pipe. Alternatively, the first outflow holes 414 may be formed directly in the side wall 411.

Water from the flow path 413 flows out from the first outflow holes 414. The water flowing out from the first outflow holes 414 can remove the feces, urine, and the like adhering to the outer surface 411A and the end portion 411C of the side wall 411.

As illustrated in FIG. 29, the second outflow holes 415 extend from the flow path 413 toward the inner surface 411B of the side wall 411. The second outflow holes 415 may be located over the circumference of the inner surface 411B of the side wall 411. The positions of the second outflow holes 415 in the X direction each may be located between the positions of two first outflow holes 414 adjacent to each other in the X direction. The second outflow holes 415 each may be constituted of a tubular member such as a resin tube or a metal or glass pipe. Alternatively, the second outflow holes 415 may be formed directly in the side wall 411.

The water from the flow path 413 flows out from the second outflow holes 415. The water flowing out from the second outflow holes 415 can remove the feces, urine, and the like adhering to the inner surface 411B of the side wall 411.

As illustrated in FIG. 28, the support portion 416 supports the nozzle portion 410 located at an end portion thereof. The support portion 416 may extend in the X direction. For example, the support portion 416 may be substantially parallel to the X direction. The support portion 416 may house various components of the gas detection device 401. The support portion 416 may be formed integrally with the nozzle portion 410. The support portion 416 includes a tubular side wall 417.

As illustrated in FIG. 28, the side wall 417 may be circular tubular. The side wall 417 may be made of a material such as metal or resin. The side wall 417 may be integrally formed with the side wall 411. As illustrated in FIG. 29, the side wall 417 includes an outer surface 417A, an inner surface 417B, and a cavity 417C. The cavity 417C may be defined as a region surrounded by the inner surface 417B. The cavity 417C is connected to the region 411D of the nozzle portion 410. For example, the cavity 417C and the region 411D are connected to each other such that air can flow therebetween.

The blower unit 420 illustrated in FIG. 30 is driven under the control of the control unit 454. When the blower unit 420 is driven, the gas generated from the feces 406 illustrated in FIG. 27 is drawn toward the nozzle portion 410 and sucked into the nozzle portion 410 as the sample gas. The blower unit 420 includes a pump 421 (first pump) such as an air pump and a driver 422.

As illustrated in FIG. 28, the pump 421 is located within the cavity 417C. The pump 421 is located on the −X direction side with respect to the chamber 430. However, the positional relationship between the chamber 430 and the pump 421 may be opposite to the above-described positional relationship. The pump 421 can suck air from the opening 412 toward the cavity 417C. The pump 421 is driven by the driver 422 to suck air from the opening 412 toward the cavity 417C. When the pump 421 sucks air from the opening 412 toward the cavity 417C, a flow of a gas from the outside of the nozzle portion 410 toward the inside of the nozzle portion 410 via the opening 412 can be generated. Since the flow of the gas is generated, the gas generated from the feces 406 illustrated in FIG. 27 is supplied to the chamber 430 via the opening 412. The pump 421 may be constituted of a piezoelectric pump, a motor pump, or the like.

The driver 422 illustrated in FIG. 30 generates an electric signal for driving the pump 421 under the control of the control unit 454. The driver 422 may be constituted of any electric circuit capable of generating an electric signal.

The chamber 430 illustrated in FIG. 28 is located within the cavity 417C. The chamber 430 is located on the opening 412 side, that is, on the +X direction side with respect to the pump 421 of the blower unit 420. However, the positional relationship between the chamber 430 and the pump 421 may be opposite to the above-described positional relationship. When the blower unit 420 is driven, the sample gas or the like is supplied to the chamber 430.

As illustrated in FIG. 30, the chamber 430 includes a sensor unit 431 therein. The chamber 430 may include a plurality of sensor units 431. The sample gas or the like is supplied to the sensor unit 431. The sensor unit 431 outputs a voltage signal corresponding to the concentration of a specific gas to the signal processing unit 450. The sensor unit 431 may include a semiconductor sensor, a catalytic combustion sensor, a solid-electrolyte sensor, or the like.

The supply unit 440 illustrated in FIG. 28 can supply a cleaning liquid such as water to the flow path 413 of the nozzle portion 410. For example, the nozzle portion 410 can be cleaned by the supply unit 440 supplying water to the flow path 413. The supply unit 440 includes the water pipe 441, a tank 442, a tubular flow path 443, and a pump 444. As illustrated in FIG. 30, the supply unit 440 includes a driver 445.

The water pipe 441 illustrated in FIG. 28 can supply water in the tank 442 to the flow path 413. One end portion of the water pipe 441 is immersed in the water stored in the tank 442. The other end portion of the water pipe 441 extends to the inside of the side wall 411. A portion including the other end portion of the water pipe 441 is embedded in the side wall 411. The flow path 413 is connected to the water pipe 441 inside the side wall 411. The water pipe 441 may be embedded at any position of the side wall 411 depending on the number and positions of flow paths 413. For example, as illustrated in FIG. 28, when the flow paths 413 are arranged in the circumferential direction of the side wall 411, the water pipe 441 may be embedded in the circumferential direction of the side wall 411. The water pipe 441 may be constituted of a tubular member such as a resin tube or a metal or glass pipe.

The tank 442 illustrated in FIG. 28 stores water. The tank 442 is a sealed container. The tank 442 may be disposed at any position in the space where the toilet 402 illustrated in FIG. 27 is installed. Alternatively, the tank 442 may be disposed in the toilet 402 illustrated in FIG. 27. The tank 442 may be made of a material such as metal or resin.

The flow path 443 illustrated in FIG. 28 can supply air in the toilet room in which the toilet 402 illustrated in FIG. 27 is disposed to the tank 442. One end portion of the flow path 443 is located in the toilet room in which the toilet 402 illustrated in FIG. 27 is disposed. The other end portion of the flow path 443 is connected to the tank 442. When the flow path 443 supplies air to the tank 442, the pressure of the air in the tank 442 can increase. When the pressure of the air in the tank 442 increases, the air pushes the water surface in the tank 442, and hence the water in the tank 442 can flow out to the water pipe 441. The water flowing out to the water pipe 441 is supplied to the flow path 413 via the water pipe 441.

The pump 444 illustrated in FIG. 28 is attached to a portion of the flow path 443. The pump 444 can send out air from the outside of the flow path 443 toward the tank 442. The pump 444 is driven by the driver 445 to send out air from the outside of the flow path 443 toward the tank 442. When the pump 444 sends out air from the outside of the flow path 443 toward the tank 442, air from the outside of the flow path 443 is supplied to the tank 442 via the flow path 443. The pump 444 may be constituted of a piezoelectric pump, a motor pump, or the like.

The driver 445 illustrated in FIG. 30 generates an electric signal for driving the pump 444 under the control of the control unit 454. The driver 445 may be constituted of any electric circuit capable of generating an electric signal.

The signal processing unit 450 illustrated in FIG. 30 may include an amplifier and an ADC (analog-to-digital converter). The signal processing unit 450 amplifies the voltage signal output from the sensor unit 431 by an amplifier. The signal processing unit 450 converts the amplified voltage signal (analog signal) into a digital signal by the ADC. The signal processing unit 450 outputs the converted digital signal to the control unit 454.

The communication unit 451 illustrated in FIG. 30 can communicate with an external device. The external device may be a server device or an electronic device such as a smartphone used by the subject. A communication method used in communication between the communication unit 451 and the external device may be a short-range wireless communication standard, a wireless communication standard for connection to a mobile phone network, or a wired communication standard. Examples of the short-range wireless communication standard may include WiFi (registered trademark), Bluetooth (registered trademark), infrared, and NFC. The wireless communication standard for connection to the mobile phone network may include, for example, LTE or a fourth generation or higher mobile communication system. A communication method used in communication between the communication unit 451 and the external device may be a communication standard such as LPWA or LPWAN.

The battery 452 illustrated in FIG. 30 can provide power to components within the gas detection device 401. For example, the battery 452 may supply power to at least one of the blower unit 420, the sensor unit 431, the supply unit 440, the signal processing unit 450, the communication unit 451, the memory 453, and the control unit 454. The battery 452 may include at least one of a primary battery and a secondary battery.

The memory 453 illustrated in FIG. 30 is constituted of, for example, a semiconductor memory or a magnetic memory. The memory 453 stores various kinds of information and a program for operating the gas detection device 401. The memory 453 may function as a working memory.

The control unit 454 illustrated in FIG. 30 includes at least one processor. The processor may include at least one of a general-purpose processor that reads a specific program and executes a specific function and a dedicated processor dedicated to a specific process. The dedicated processor may include an application specific IC. The processor may include a programmable logic device. The PLD may include an FPGA. The control unit 454 may include at least one of an SoC and an SiP in which one or more processors cooperate with each other.

The control unit 454 can control various functional units of the gas detection device 401. For example, the control unit 454 can control the signal processing unit 450, the communication unit 451, the battery 452, and the memory 453. For example, the control unit 454 can control the pump 421 via the driver 422. For example, the control unit 454 can control the pump 444 via the driver 445.

<Detection Process for Type and Concentration of Sample Gas>

The control unit 454 can acquire a signal instructing collection of the sample gas from the external device by the communication unit 451. This signal can be transmitted from an electronic device such as a smartphone to the gas detection device 401 when the subject sitting on the toilet seat 403 illustrated in FIG. 27 and having started defecation operates the electronic device. When the control unit 454 acquires the signal instructing collection of the sample gas, the control unit 454 causes the driver 422 to drive the pump 421. When the pump 421 is driven, the gas generated from the feces 406 illustrated in FIG. 27 is sucked into the nozzle portion 410 as the sample gas. The sample gas sucked into the nozzle portion 410 is supplied to the chamber 430. When the sample gas is supplied to the chamber 430, the sensor unit 431 of the chamber 430 outputs a voltage signal corresponding to a specific gas included in the sample gas to the signal processing unit 450. The voltage signal output from the sensor unit 431 is supplied to the control unit 454 as a digital signal via the signal processing unit 450. The control unit 454 detects the type and concentration of the gas included in the sample gas based on the digital signal from the signal processing unit 450. The control unit 454 may transmit the detection result of the type and concentration of the gas to the external device through the communication unit 451.

<Cleaning Process for Nozzle>

When the collection of the sample gas is completed, the control unit 454 causes the supply unit 440 to supply water to the flow path 413. For example, the control unit 454 causes the driver 445 to drive the pump 444. When the pump 444 is driven, water stored in the tank 442 illustrated in FIG. 28 is supplied to the flow path 413 via the water pipe 441. The water supplied to the flow path 413 flows out from the first outflow holes 414 and the second outflow holes 415 illustrated in FIG. 29. The nozzle portion 410 can be cleaned with the water flowing out from the first outflow holes 414 and the second outflow holes 415.

As described above, as illustrated in FIG. 29, the gas detection device 401 according to the seventh embodiment includes the first outflow holes 414 extending from the flow path 413 toward the outer surface 411A of the side wall 411 and the second outflow holes 415 extending from the flow path 413 toward the inner surface 411B of the side wall 411. The gas detection device 401 includes the supply unit 440 capable of supplying water to the flow path 413. When the supply unit 440 supplies water to the flow path 413, the water flows out from the first outflow holes 414 and the second outflow holes 415, and the nozzle portion 410 can be cleaned. Since the nozzle portion 410 is cleaned, the feces, urine, and the like adhering to the nozzle portion 410 can be removed. Since the feces, urine, and the like adhering to the nozzle portion 410 are removed, when the gas detection device 401 collects the sample gas, it is possible to reduce the probability that the sample gas is mixed with the gas generated from the urine or the feces of another person. Since the probability that the gas generated from the urine or the feces of another person is mixed into the sample gas is reduced, the gas detection device 401 can more accurately detect the type and concentration of the gas included in the sample gas. Since the feces, urine, and the like adhering to the nozzle portion 410 are removed, the nozzle portion 410 can be kept clean. Thus, according to the present embodiment, an improved gas detection device 401 can be provided.

Eighth Embodiment

Figure 31:
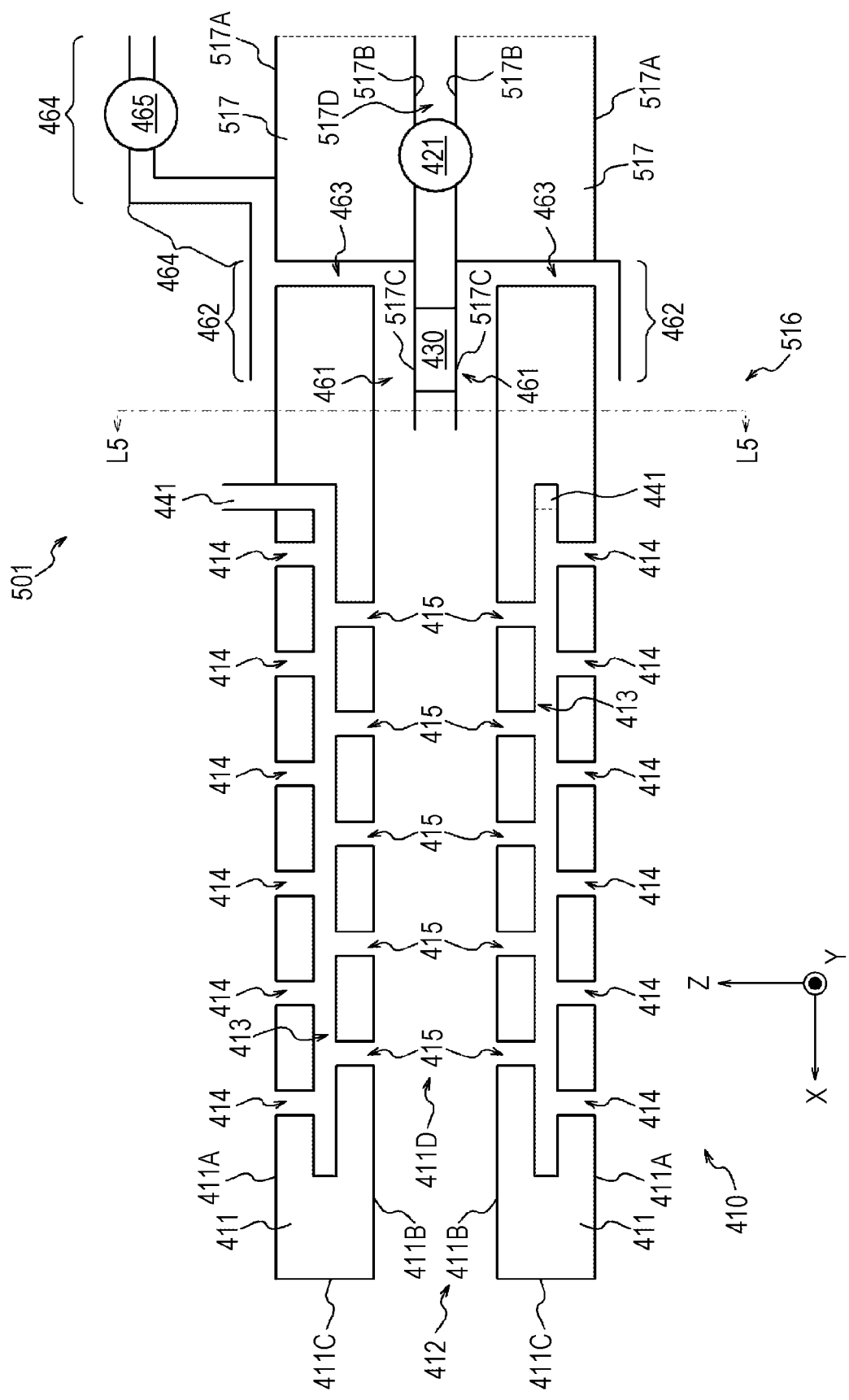
FIG. 31 is a sectional end view of a gas detection device according to an eighth embodiment of the present disclosure.
Figure 32:
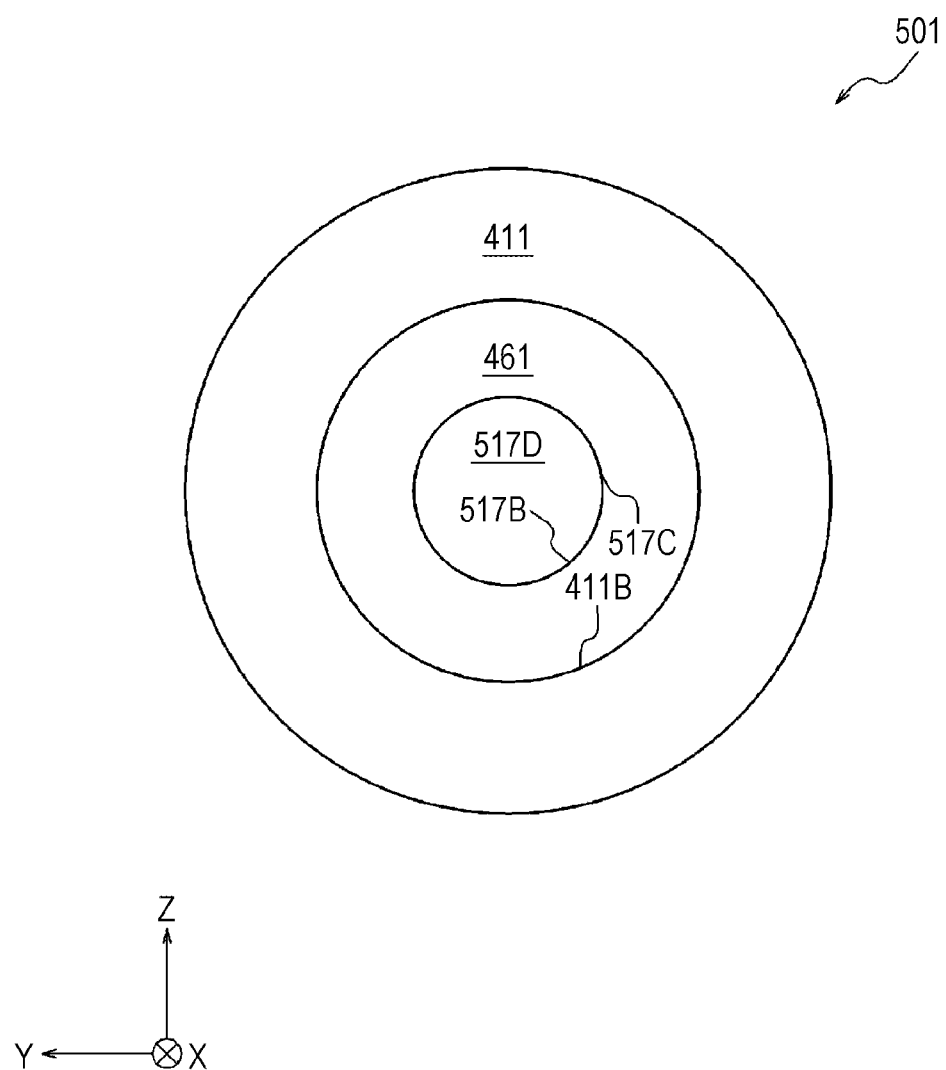
FIG. 32 is a cross-sectional view of the gas detection device taken along line L5-L5 illustrated in FIG. 31.
Figure 33:
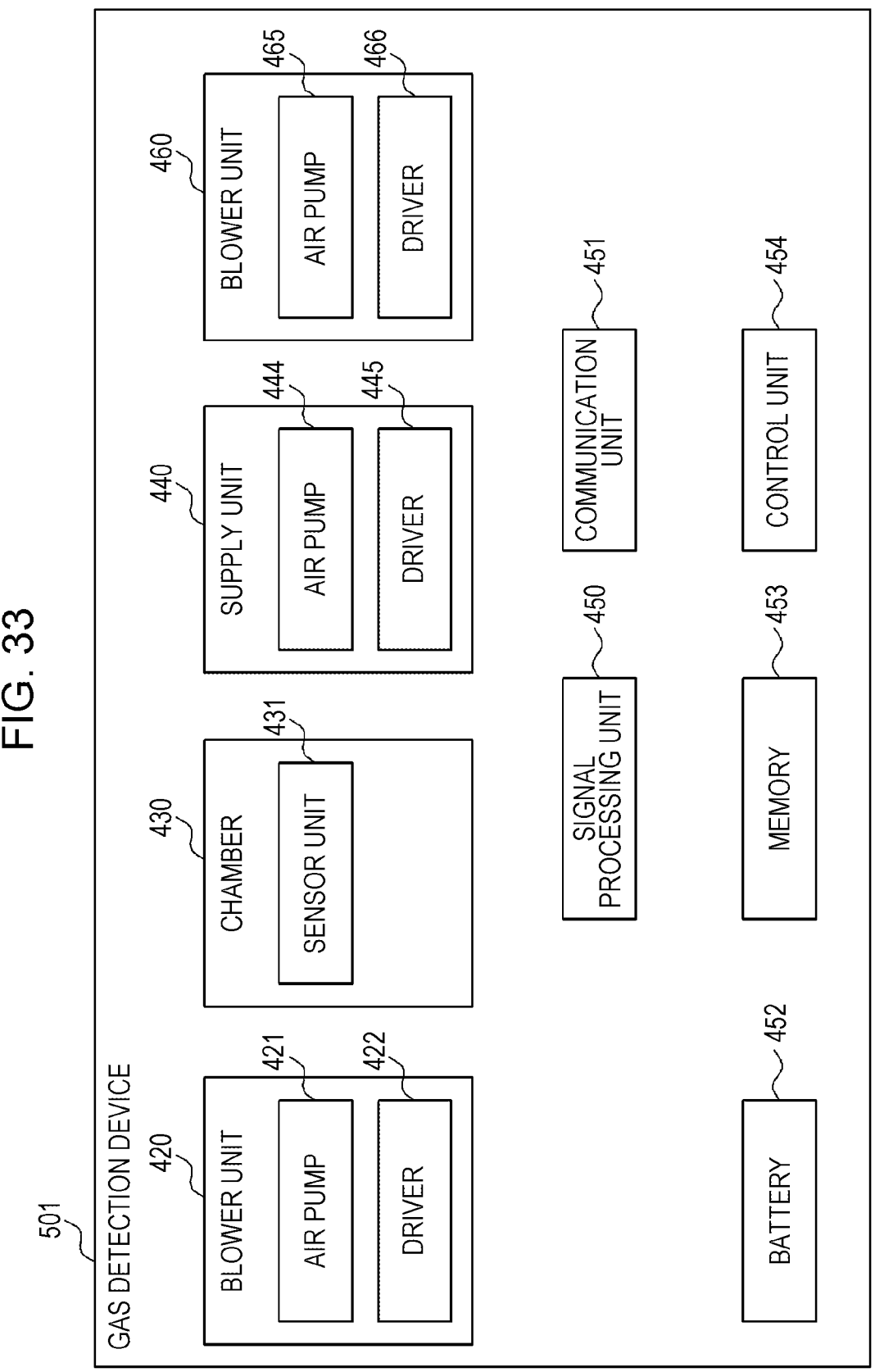
FIG. 33 is a functional block diagram of the gas detection device illustrated in FIG. 31.

FIG. 31 is a sectional end view of a gas detection device 501 according to an eighth embodiment of the present disclosure. FIG. 32 is a cross-sectional view of the gas detection device 501 taken along line L5-L5 illustrated in FIG. 31. FIG. 33 is a functional block diagram of the gas detection device 501 illustrated in FIG. 31.

As illustrated in FIG. 31, the gas detection device 501 includes a nozzle portion 410, a flow path 413, first outflow holes 414 and second outflow holes 415 as outflow holes, and a support portion 516. As illustrated in FIG. 33, the gas detection device 501 includes a blower unit 420, a chamber 430, a supply unit 440, a signal processing unit 450, a communication unit 451, a battery 452, a memory 453, a control unit 454, and a blower unit 460.

As illustrated in FIG. 31, the support portion 516 supports the nozzle portion 410. The support portion 516 may extend in the X direction. For example, the support portion 516 may be substantially parallel to the X direction. The support portion 516 may house various components of the gas detection device 501. The support portion 516 may be formed integrally with the nozzle portion 410. The support portion 516 includes a tubular side wall 517.

The side wall 517 may be circular tubular. The side wall 517 may be made of a material such as metal or resin. The side wall 517 may be formed integrally with the side wall 411 of the nozzle portion 410. As illustrated in FIG. 31, the side wall 517 includes an outer surface 517A, an inner surface 517B, an outer surface 517C, and a cavity 517D. The cavity 517D may be defined as a region surrounded by the inner surface 517B. The chamber 430 and a pump 421 can be located inside the cavity 517D. The cavity 517D may be constituted of a tubular member such as a resin tube or a metal or glass pipe. When the cavity 517D is constituted of a resin tube or a tubular member, the inner surface 517B can correspond to the inner surface of the tube or the tubular member. The outer surface 517C can also be the outer surface of the tube or the tubular member.

As illustrated in FIGS. 31 and 33, the blower unit 460 includes an air passage 461 (first air passage), an air passage 462 (second air passage), an air passage 463, an air passage 464, a pump 465 (second pump), and a driver 466. The air passages 461 to 464 each may be constituted of a tubular member such as a resin tube or a metal or glass pipe.

The air passage 461 is located inside the support portion 516. As illustrated in FIG. 32, the air passage 461 is separated from the cavity 517D by a wall including the inner surface 517B and the outer surface 517C as constituent elements. The air passage 461 may surround the cavity 517D. As illustrated in FIG. 31, one end portion of the air passage 461 is connected to the region 411D of the side wall 411 of the nozzle portion 410. For example, one end portion of the air passage 461 and the region 411D are connected to each other such that air can flow therebetween. The other end portion of the air passage 461 is connected to the air passage 463.

The air passage 462 is located on the outer surface 411A of the side wall 411 of the nozzle portion 410. The air passage 462 may surround the circumference of the outer surface 411A. One end portion of the air passage 462 is open in the +X direction, that is, toward the distal end of the nozzle portion 410. The other end portion of the air passage 462 is connected to the air passage 463 and the air passage 464.

The air passage 463 is located inside the side wall 517 of the support portion 516. An end portion of the air passage 463 located on the outer surface 517A side of the side wall 517 is connected to the air passage 462 and the air passage 464. An end portion of the air passage 463 located on the inner surface 517B side of the side wall 517 is connected to the air passage 461.

One end portion of the air passage 464 is located in the toilet room in which the toilet 402 illustrated in FIG. 27 is disposed. The other end portion of the air passage 464 is connected to the air passage 462 and the air passage 463. The air from the air passage 464 is supplied to the air passage 461 and the air passage 462 via the air passage 463.

The pump 465 is attached to the air passage 464. The pump 465 can send out air to the air passage 461 and the air passage 462 via the air passage 463 and the air passage 464. When the pump 465 is driven by the driver 466, air is sent from one end portion of the air passage 464 located in the toilet room toward the other end portion of the air passage 464 connected to the air passages 462 and 463. When the pump 465 sends out air from the one end portion toward the other end portion of the air passage 464, air in the toilet room is sent out toward the air passage 461 and the air passage 462. The air sent toward the air passage 461 can flow toward the distal end of the nozzle portion 410 along the inner surface 411B of the nozzle portion 410. The air sent toward the air passage 462 can flow toward the distal end of the nozzle portion 410 along the outer surface 411A of the nozzle portion 410.

The driver 466 illustrated in FIG. 33 generates an electric signal for driving the pump 465 under the control of the control unit 454. The driver 466 may be constituted of any electric circuit capable of generating an electric signal.

The control unit 454 illustrated in FIG. 33 can control the pump 444 and the like via the driver 445 and can also control the pump 465 via the driver 466. The control unit 454 can execute the detection process for the type and concentration of the sample gas similarly to the seventh embodiment.
<Cleaning Process for Nozzle>

Similarly to the seventh embodiment, when the collection of the sample gas is completed, the control unit 454 causes, for example, the supply unit 440 to supply water to the flow path 413. When water is supplied to the flow path 413, water flows out from the first outflow holes 414 and the second outflow holes 415. The nozzle portion 410 can be cleaned with the water flowing out from the first outflow holes 414 and the second outflow holes 415.

In the eighth embodiment, the control unit 454 causes the supply unit 440 to supply water to the flow path 413, and then causes the pump 465 to send out air toward the air passage 461 and the air passage 462. That is, in the eighth embodiment, the nozzle portion 410 is cleaned with the water flowing out from the first outflow holes 414 and the second outflow holes 415, and then the control unit 454 causes the driver 466 to drive the pump 465. As described above, the air sent toward the air passage 461 can flow toward the distal end of the nozzle portion 410 along the inner surface 411B of the nozzle portion 410. The water flowing out from the second outflow holes 415 can be dried by the air. As described above, the air sent toward the air passage 462 can flow toward the distal end of the nozzle portion 410 along the outer surface 411A of the nozzle portion 410. The water flowing out from the first outflow holes 414 can be dried by the air. That is, water adhering to the nozzle portion 410 after cleaning can be more reliably removed by the air than in the case where the blower unit 460 is not provided. Since the water adhering to the nozzle portion 410 after cleaning is more reliably removed than in the case where the blower unit 460 is not provided, the nozzle portion 410 can be kept clean.

While the pump 421 of the blower unit 420 is stopped, the control unit 454 may cause the driver 466 to drive the pump 465. That is, the control unit 454 may cause the pump 465 to send out air toward the air passage 461 and the air passage 462 while the pump 421 is stopped. While the pump 465 is stopped, the control unit 454 may cause the driver 422 to drive the pump 421. That is, the control unit 454 may supply the sample gas to the chamber 430 by the pump 421 while the pump 465 is stopped. With such a configuration, it is possible to reduce the probability that the sample gas sent out toward the chamber 430 by the pump 421 is mixed with the air in the toilet room sent out to the region 411D of the nozzle portion 410 by the pump 465.

Other configurations and control of the gas detection device 501 according to the eighth embodiment are similar to those of the gas detection device 401 according to the seventh embodiment.

Ninth Embodiment

Figure 34:
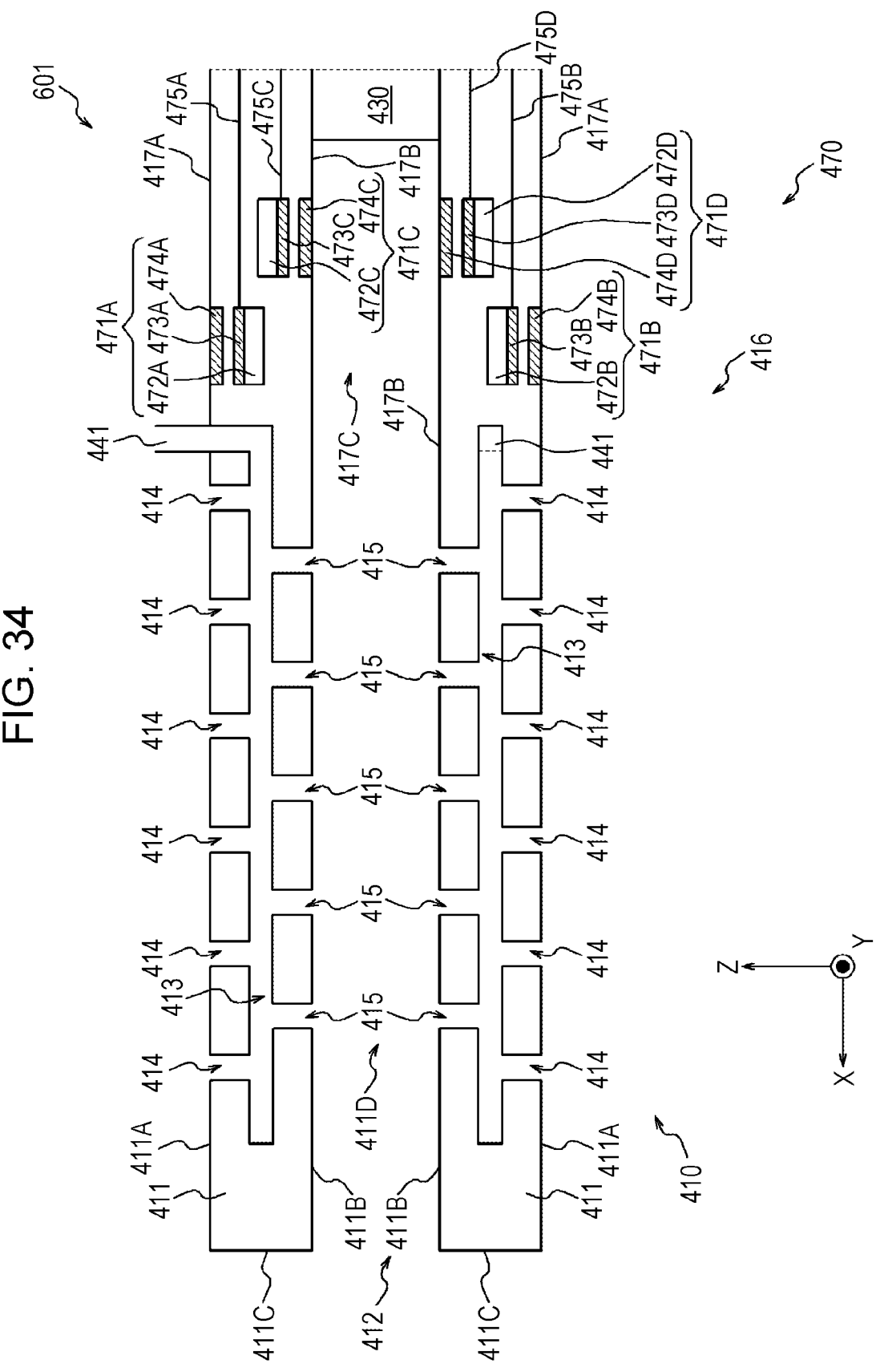
FIG. 34 is a sectional end view of a gas detection device according to a ninth embodiment of the present disclosure.
Figure 35:
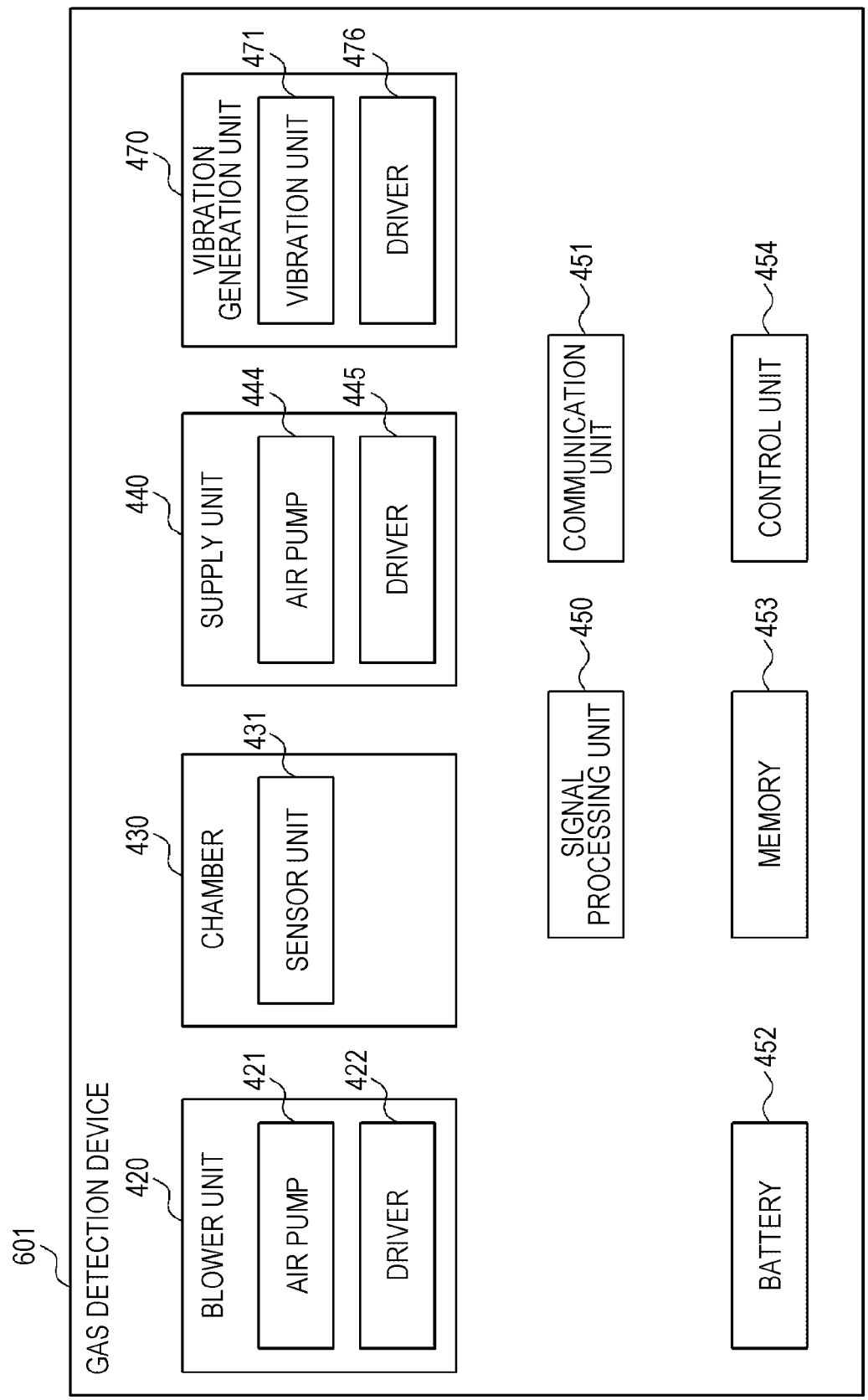
FIG. 35 is a functional block diagram of the gas detection device illustrated in FIG. 34.

FIG. 34 is a sectional end view of a gas detection device 601 according to a ninth embodiment of the present disclosure. FIG. 35 is a functional block diagram of the gas detection device 601 illustrated in FIG. 34.

As illustrated in FIG. 34, the gas detection device 601 includes a nozzle portion 410, a flow path 413, first outflow holes 414 and second outflow holes 415 as outflow holes, and a support portion 416. As illustrated in FIG. 35, the gas detection device 601 includes a blower unit 420, a chamber 430, a supply unit 440, a signal processing unit 450, a communication unit 451, a battery 452, a memory 453, a control unit 454, and a vibration generation unit 470.

As illustrated in FIG. 34, the vibration generation unit 470 includes vibration units 471A, 471B, 471C, and 471D and wires 475A, 475B, 475C, and 475D. When the vibration units 471A to 471D are not particularly distinguished from one another, the vibration units 471A to 471D are referred to as a "vibration unit 471". When the wires 475A to 475D are not particularly distinguished from one another, the wires 475A to 475D are referred to as a "wire 475". As illustrated in FIG. 35, the vibration generation unit 470 includes a driver 476.

The vibration unit 471 can generate ultrasonic vibration to be transmitted to at least one of an outer surface 411A and an inner surface 411B of a side wall 411 of the nozzle portion 410. For example, the vibration units 471A and 471B can generate ultrasonic vibration to be transmitted to the outer surface 411A of the side wall 411. The vibration units 471C and 471D can generate ultrasonic vibration to be transmitted to the inner surface 411B of the side wall 411. The vibration unit 471A includes a cavity 472A, a vibrator 473A, and a deflector 474A. The vibration unit 471B includes a cavity 472B, a vibrator 473B, and a deflector 474B. The vibration unit 471C includes a cavity 472C, a vibrator 473C, and a deflector 474C. The vibration unit 471D includes a cavity 472D, a vibrator 473D, and a deflector 474D.

The cavities 472A to 472D are formed inside the side wall 417 of the support portion 416. The cavity 472A and the cavity 472B are located on the outer surface 411A side of the side wall 417. The cavity 472C and the cavity 472D are located on the inner surface 411B side of the side wall 417.

The vibrators 473A to 473D are ultrasonic vibrators. The vibrators 473A to 473D each may include a piezoelectric element or the like. The wires 475A to 475D are electrically connected to the vibrators 473A to 473D, respectively. A voltage is applied to each of the vibrators 473A to 473D via a corresponding one of the wires 475A to 475D. When a voltage is applied, each of the vibrators 473A to 473D vibrates due to a piezoelectric effect.

The vibrator 473A is located on the outer surface 411A side in the cavity 472A. The ultrasonic vibration of the vibrator 473A can be transmitted to the deflector 474A in the +Z direction. The vibrator 473B is located on the outer surface 411A side in the cavity 472B. The ultrasonic vibration of the vibrator 473B can be transmitted to the deflector 474B in the −Z direction. The vibrator 473C is located on the inner surface 417B side in the cavity 472C. The ultrasonic vibration of the vibrator 473C can be transmitted to the deflector 474C in the −Z direction. The vibrator 473D is located on the inner surface 417B side in the cavity 472D. The ultrasonic vibration of the vibrator 473D can be transmitted to the deflector 474D in the +Z direction.

Each of the deflectors 474A to 474D faces a corresponding one of the vibrators 473A to 473D. Each of the deflector 474A and the deflector 474B is substantially parallel to the outer surface 417A of the side wall 417. Each of the deflectors 474A and 474B may be formed as a diffraction grating in which protrusions and recesses are alternately arranged on the outer surface 417A of the side wall 417. Each of the deflector 474C and the deflector 474D is substantially parallel to the inner surface 417B of the side wall 417. Each of the deflectors 474C and 474D may be formed as a diffraction grating in which protrusions and recesses are alternately arranged on the inner surface 417B of the side wall 417.

The deflector 474A deflects the ultrasonic vibration in the +Z direction from the vibrator 473A to a direction along the outer surface 411A of the nozzle portion 410. The deflector 474B deflects the ultrasonic vibration in the −Z direction from the vibrator 473B to a direction along the outer surface 411A of the nozzle portion 410. The deflector 474C deflects the ultrasonic vibration in the −Z direction from the vibrator 473C to a direction along the inner surface 411B of the nozzle portion 410. The deflector 474D deflects the ultrasonic vibration in the +Z direction from the vibrator 473D to a direction along the inner surface 411B of the nozzle portion 410.

The wire 475 is a metal wire. Each of the wires 475A to 475D electrically connects a corresponding one of the vibrators 473A to 473D to the driver 476 illustrated in FIG. 35.

The driver 476 illustrated in FIG. 35 drives each of the vibrators 473A to 473D under the control of the control unit 454. For example, the driver 476 generates a voltage to be applied to each of the vibrators 473A to 473D under the control of the control unit 454. The voltage generated by the driver 476 is applied to each of the vibrators 473A to 473D via a corresponding one of the wires 475A to 475D. The driver 476 may include any electric circuit capable of generating a voltage.

The control unit 454 illustrated in FIG. 35 can control the pump 444 and the like via the driver 445 and can also control the vibration unit 471 via the driver 476. The control unit 454 can execute the detection process for the type and concentration of the sample gas similarly to the seventh embodiment.

<Cleaning Process for Nozzle>

When the collection of the sample gas is completed, the control unit 454 causes the vibration unit 471 to generate ultrasonic vibration while causing the supply unit 440 to supply water to the flow path 413. That is, while the water flows out from the first outflow holes 414 and the second outflow holes 415, the control unit 454 causes the vibration unit 471 to generate ultrasonic vibration via the driver 476 to transmit the ultrasonic vibration to the outer surface 411A and the inner surface 411B of the nozzle portion 410. With such a configuration, the nozzle portion 410 can be vibrated while the nozzle portion 410 is cleaned with the water flowing out from the first outflow holes 414 and the second outflow holes 415. Since the nozzle portion 410 is vibrated while the nozzle portion 410 is cleaned with the water, the feces, urine, and the like adhering to the nozzle portion 410 can be more reliably removed than in the case where the vibration generation unit 470 is not provided.

Other configurations and control of the gas detection device 601 according to the ninth embodiment are similar to those of the gas detection device 401 according to the seventh embodiment.

Tenth Embodiment

Figure 36:
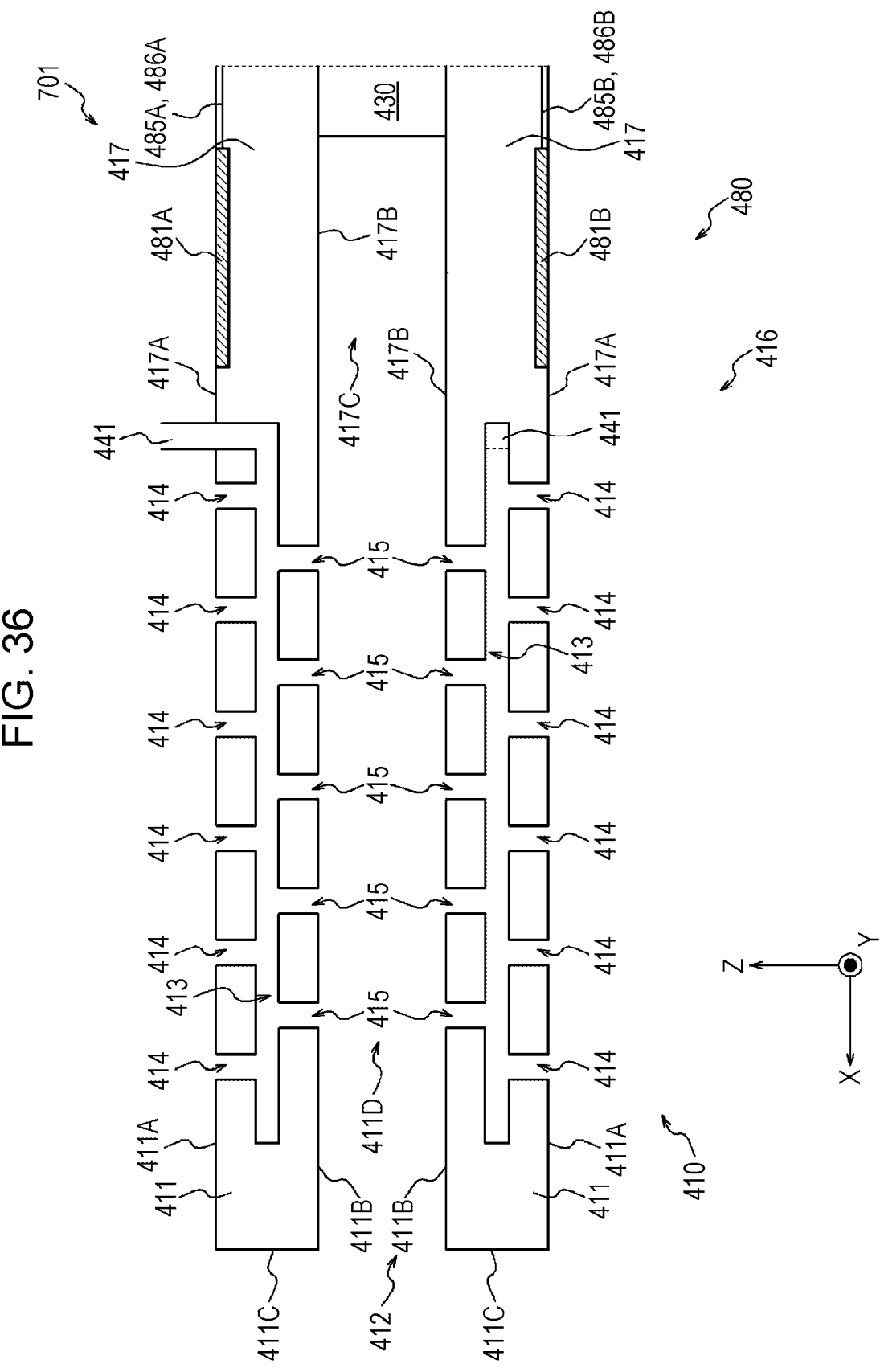
FIG. 36 is a sectional end view of a gas detection device according to a tenth embodiment of the present disclosure.
Figure 37:
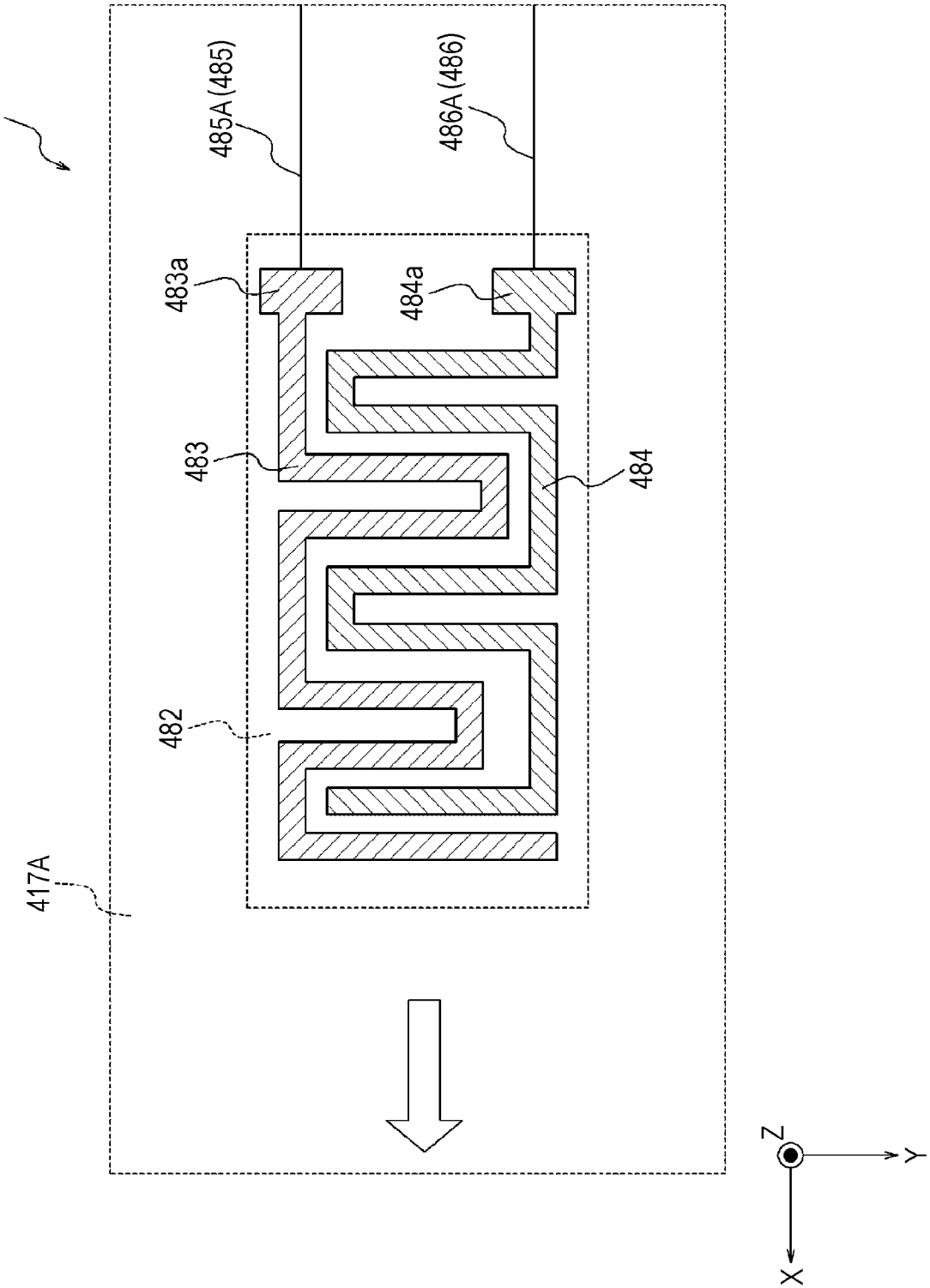
FIG. 37 is a view of a vibration unit illustrated in FIG. 36 as viewed from the positive direction side of the Z axis.
Figure 38:
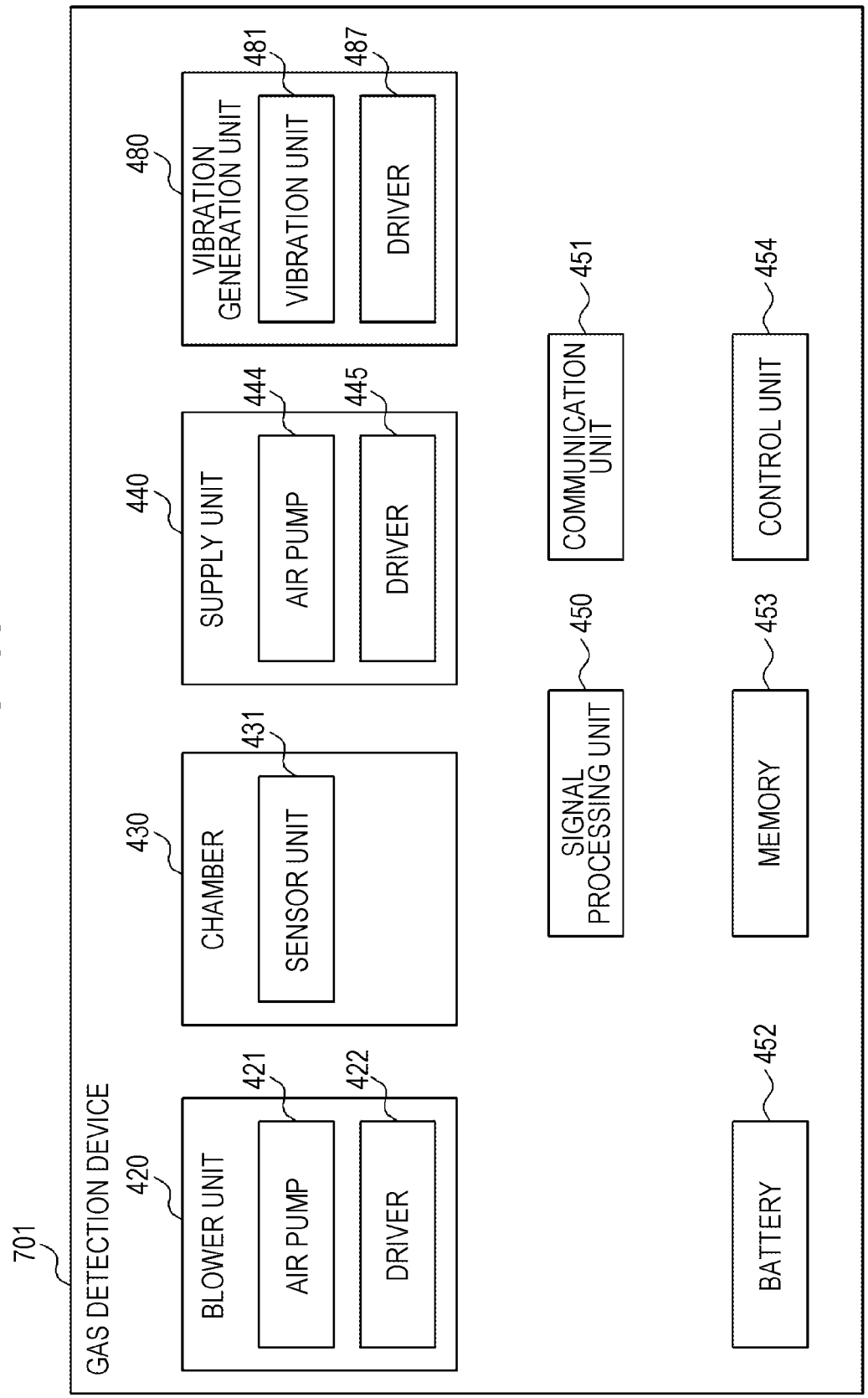
FIG. 38 is a functional block diagram of the gas detection device illustrated in FIG. 36.

FIG. 36 is a sectional end view of a gas detection device 701 according to a tenth embodiment of the present disclosure. FIG. 37 is a view of a vibration unit 481 illustrated in FIG. 36 as viewed from the +Z direction side. FIG. 38 is a functional block diagram of the gas detection device 701 illustrated in FIG. 36.

As illustrated in FIG. 36, the gas detection device 701 includes a nozzle portion 410, a flow path 413, first outflow holes 414 and second outflow holes 415 as outflow holes, and a support portion 416. As illustrated in FIG. 38, the gas detection device 701 includes a blower unit 420, a chamber 430, a supply unit 440, a signal processing unit 450, a communication unit 451, a battery 452, a memory 453, a control unit 454, and a vibration generation unit 480.

As illustrated in FIG. 36, the vibration generation unit 480 includes vibration units 481A and 481B, wires 485A and 485B, and wires 486A and 486B. When the vibration units 481A and 481B are not particularly distinguished from each other, the vibration units 481A and 481B are referred to as a "vibration unit 481". When the wires 485A and 485B are not particularly distinguished from each other, the wires 485A and 485B are referred to as a "wire 485". When the wires 486A and 486B are not particularly distinguished from each other, the wires 486A and 486B are referred to as a "wire 486". As illustrated in FIG. 38, the vibration generation unit 480 includes a driver 487.

The vibration unit 481 can generate a surface acoustic wave to be transmitted to an outer surface 411A of a side wall 411 of the nozzle portion 410. The vibration unit 481A is located near the outer surface 411A on the +Z direction side. The vibration unit 481B is located near the outer surface 411A on the −Z direction side. As illustrated in FIG. 37, the vibration unit 481 includes a piezoelectric substrate 482, an electrode 483, and an electrode 484.

The piezoelectric substrate 482 can be embedded in the side wall 417. The height of the front face of the piezoelectric substrate 482 and the height of the outer surface 417A may be substantially the same. An example of the material of the piezoelectric substrate 482 is lithium nitride.

Each of the electrode 483 and the electrode 484 is a comb-shaped electrode (IDT: Inter Digital Transducer). Each of the electrode 483 and the electrode 484 may be made of any metal. The electrode 483 and the electrode 484 are located on the piezoelectric substrate 482. The wire 485 is electrically connected to an end portion 483a of the electrode 483. The wire 486 is electrically connected to an end portion 484a of the electrode 484. A voltage generated by the driver 487 is applied to each of the electrode 483 and the electrode 484 through a corresponding one of the wire 485 and the wire 486. When a voltage is applied to each of the electrode 483 and the electrode 484, a surface acoustic wave propagating in the +X direction is generated by the piezoelectric effect of the piezoelectric substrate 482. The surface acoustic wave can be transmitted along the outer surface 411A of the side wall 411 of the nozzle portion 410.

Each of the wire 485 and the wire 486 is a metal wire. Each of the wire 485 and the wire 486 may be embedded inside the side wall 417 of the support portion 416. The wire 485A electrically connects the end portion 483a of the electrode 483 of the vibration unit 481A to the driver 487. The wire 486A electrically connects the end portion 484a of the electrode 484 of the vibration unit 481A to the driver 487. The wire 485B electrically connects the end portion 483a of the electrode 483 of the vibration unit 481B to the driver 487. The wire 486B electrically connects the end portion 484a of the electrode 484 of the vibration unit 481B to the driver 487.

The driver 487 drives the vibration unit 481 under the control of the control unit 454. For example, the driver 487 generates a voltage to be applied to each of the electrode 483 and the electrode 484 of the vibration unit 481. The voltage generated by the driver 487 is applied to each of the electrode 483 and the electrode 484 through a corresponding one of the wire 485 and the wire 486. The driver 487 may include any electric circuit capable of generating a voltage.

The control unit 454 illustrated in FIG. 38 can control the pump 444 and the like via the driver 445 and can also control the vibration unit 481 via the driver 487. The control unit 454 can execute the detection process for the type and concentration of the sample gas similarly to the seventh embodiment.

<Cleaning Process for Nozzle>

When the collection of the sample gas is completed, the control unit 454 causes the vibration unit 481 to generate a surface acoustic wave while causing the supply unit 440 to supply water to the flow path 413. That is, while water flows out from the first outflow holes 414 and the second outflow holes 415, the control unit 454 causes the vibration unit 481 to generate a surface acoustic wave via the driver 487 to vibrate the nozzle portion 410. With such a configuration, the nozzle portion 410 can be vibrated with the surface acoustic wave while the nozzle portion 410 is cleaned with the water flowing out from the first outflow holes 414 and the second outflow holes 415. Since the nozzle portion 410 is vibrated while the nozzle portion 410 is cleaned with the water, the feces, urine, and the like adhering to the nozzle portion 410 can be more reliably removed than in the case where the vibration generation unit 480 is not provided.

Other configurations and control of the gas detection device 701 according to the tenth embodiment are similar to those of the gas detection device 401 according to the seventh embodiment.

Eleventh Embodiment

Figure 39:
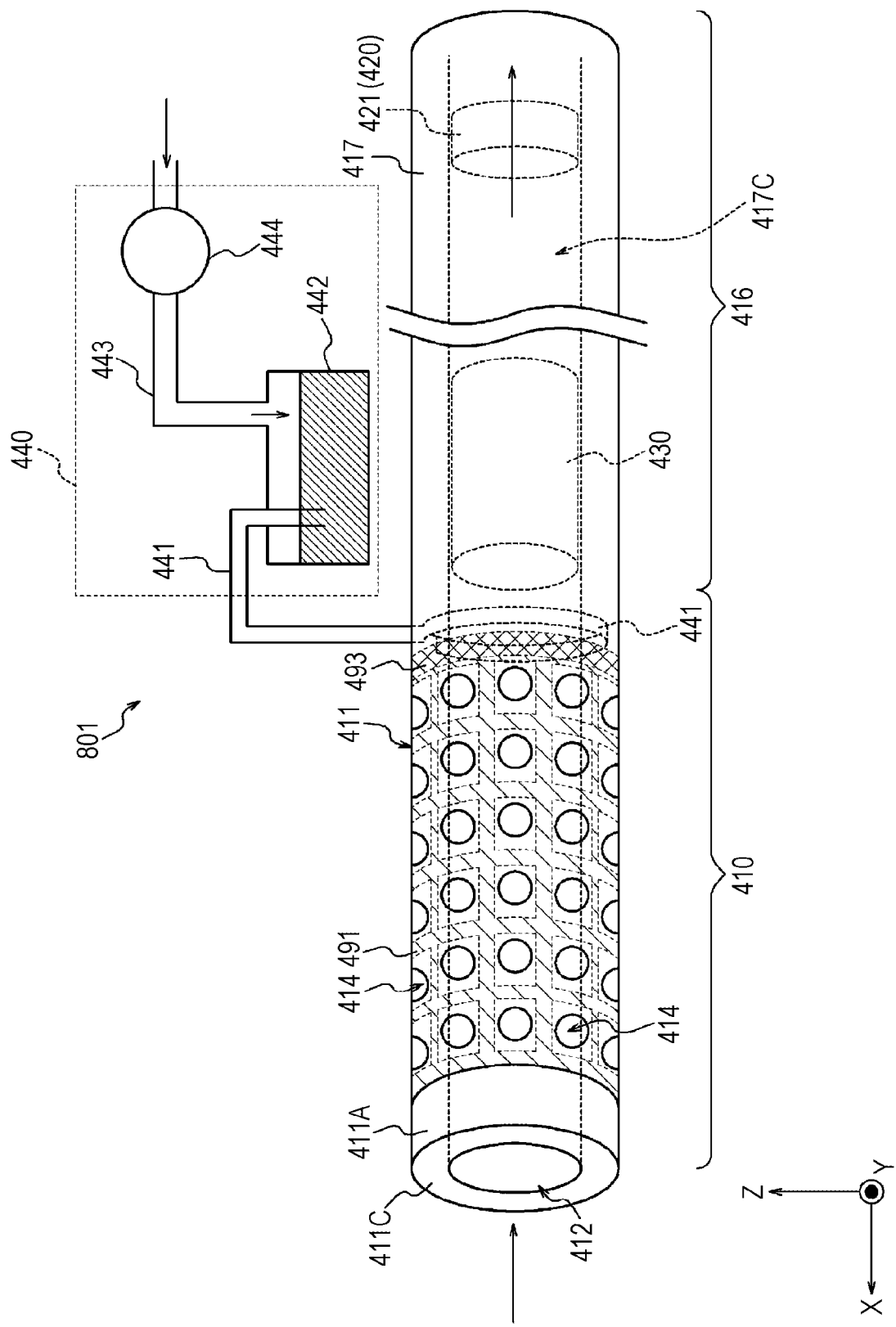
FIG. 39 is an external view of a gas detection device according to an eleventh embodiment of the present disclosure.
Figure 40:
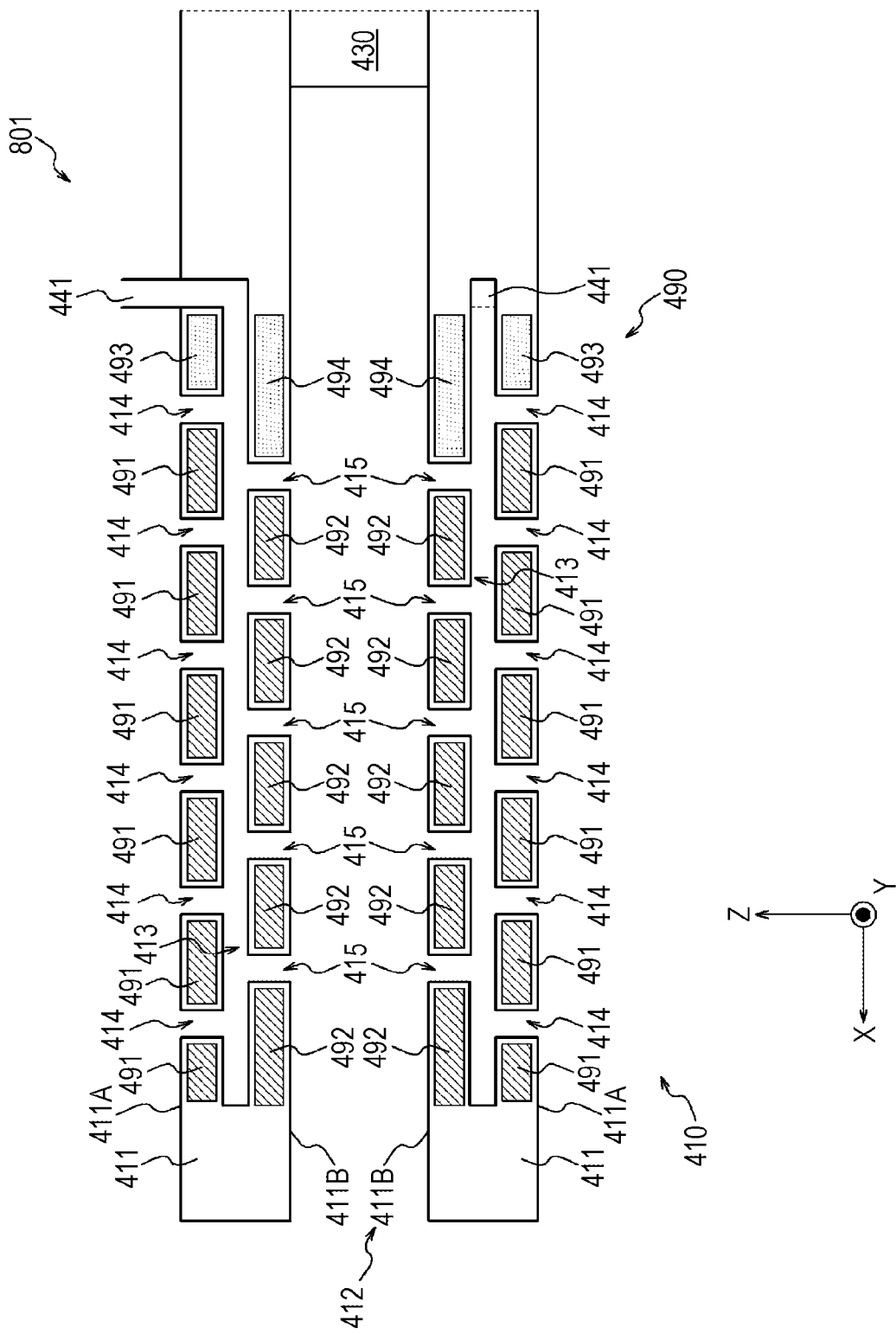
FIG. 40 is a sectional end view of the gas detection device illustrated in FIG. 39.
Figure 41:
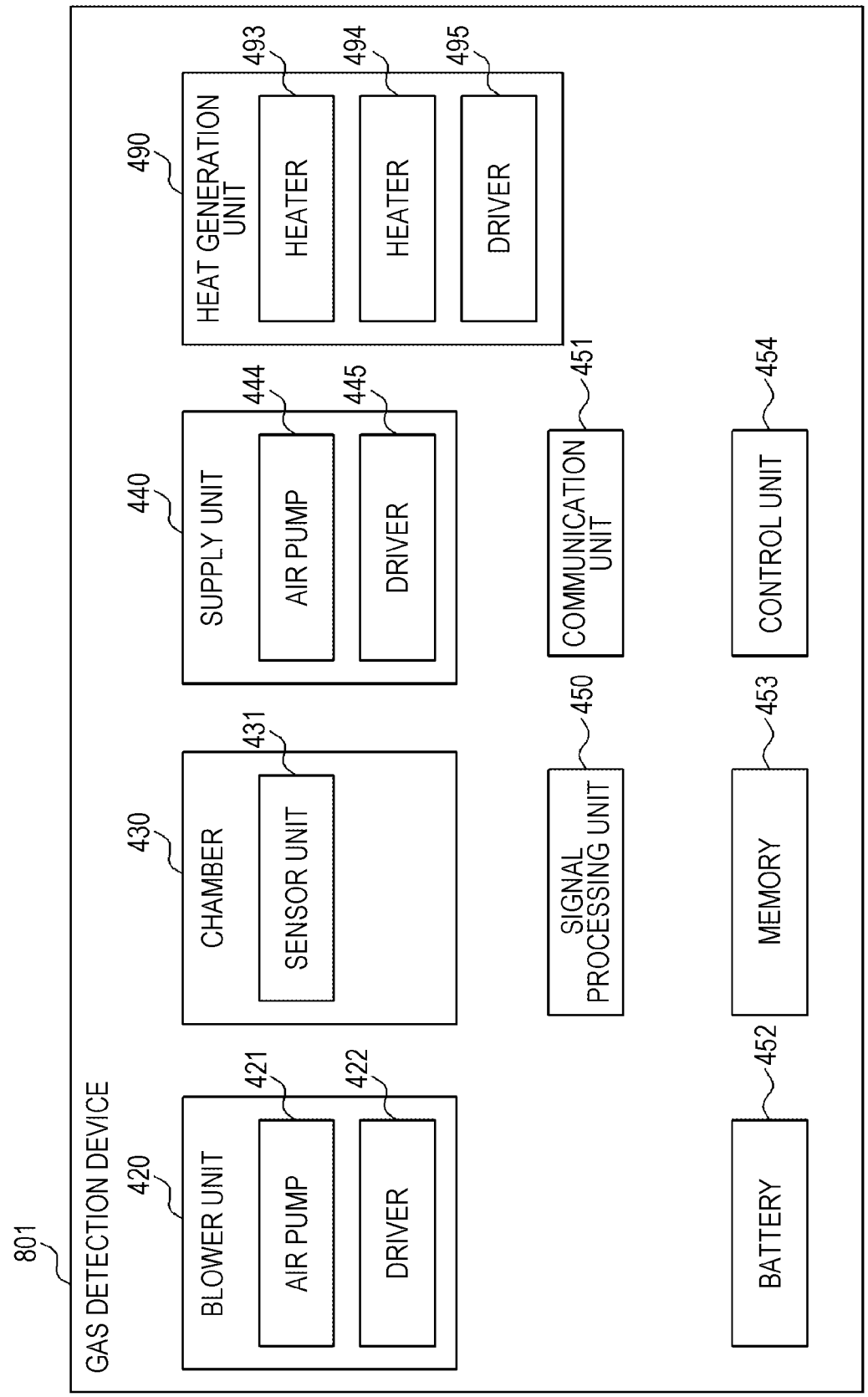
FIG. 41 is a functional block diagram of the gas detection device illustrated in FIG. 39.

FIG. 39 is an external view of a gas detection device 801 according to an eleventh embodiment of the present disclosure. FIG. 40 is a sectional end view of the gas detection device 801 illustrated in FIG. 39. FIG. 41 is a functional block diagram of the gas detection device 801 illustrated in FIG. 39.

As illustrated in FIGS. 39 and 40, the gas detection device 801 includes a nozzle portion 410, a flow path 413, first outflow holes 414 and second outflow holes 415 as outflow holes, and a support portion 416. As illustrated in FIG. 41, the gas detection device 801 includes a blower unit 420, a chamber 430, a supply unit 440, a signal processing unit 450, a communication unit 451, a battery 452, a memory 453, a control unit 454, and a heat generation unit 490.

As illustrated in FIGS. 40 and 41, the heat generation unit 490 includes heat conductors 491 and 492, heaters 493 and 494, and a driver 495.

The heat conductors 491 and the heat conductors 492 are located inside the side wall 411 of the nozzle portion 410. The heat conductors 491 are located on an outer surface 411A side of a side wall 411. As illustrated in FIG. 39, the heat conductors 491 are located to surround the first outflow holes 414. The heat conductors 491 are arranged in the X direction. As illustrated in FIG. 40, the heat conductors 492 are located on an inner surface 411B side of the side wall 411. The heat conductors 492 are located to surround the second outflow holes 415. The heat conductors 492 are arranged in the X direction. The flow path 413 may be located between the heat conductors 491 and the heat conductors 492. Examples of the material of the heat conductors 491 and the heat conductors 492 include copper and a copper alloy.

The heater 493 and the heater 494 are located inside the side wall 411 of the nozzle portion 410. The heater 493 is located on the outer surface 411A side of the side wall 411. The heater 493 is located at an end on the support portion 416 side of two ends of the heat conductors 491 arranged in the X direction. The heat generated by the heater 493 is transferred to the heat conductors 491. That is, the heater 493 can generate heat to be transferred to the heat conductors 491. The heater 494 is located on the inner surface 411B side of the side wall 411. The heater 494 is located at an end on the support portion 416 side of two ends of the heat conductors 492 arranged in the X direction. The heat generated by the heater 494 is transferred to the heat conductors 492. That is, the heater 494 can generate heat to be transferred to the heat conductors 492.

A current is supplied from the driver 495 to each of the heater 493 and the heater 494. The heater 493 and the heater 494 generate heat by being supplied with a current from the driver 495. The heater 493 and the heater 494 may be located closer to the support portion 416 in the side wall 411 than the heat conductors 491 and the heat conductors 492. Each of the heater 493 and the heater 494 may be a resistance heater, a rubber heater, or the like.

The driver 495 supplies a current to the heater 493 and the heater 494 under the control of the control unit 454. The driver 495 may include any electric circuit capable of controlling a current.

The control unit 454 can control the pump 444 and the like via the driver 445 and can also control the heater 493 and the heater 494 via the driver 495. The control unit 454 can execute the detection process for the type and concentration of the sample gas similarly to the seventh embodiment.

In the eleventh embodiment, the control unit 454 causes the supply unit 440 to supply water to the flow path 413, and then causes the heater 493 and the heater 494 to generate heat via the driver 495. That is, in the eleventh embodiment, the control unit 454 cleans the nozzle portion 410 with the water flowing out from the first outflow holes 414 and the second outflow holes 415, and then heats the heat conductors 491 and the heat conductors 492 by the heat generated by the heater 493 and the heater 494. Since the heat conductors 491 and the heat conductors 492 are heated, the water adhering to the nozzle portion 410 after cleaning can be dried more reliably than in the case where the heat generation unit 490 is not provided. Since the water adhering to the nozzle portion 410 after cleaning is more reliably dried than in the case where the heat generation unit 490 is not provided, the nozzle portion 410 can be kept clean.

Other effects and configurations of the gas detection device 801 according to the eleventh embodiment are similar to those of the gas detection device 401 according to the seventh embodiment.

Twelfth Embodiment

Figure 42:
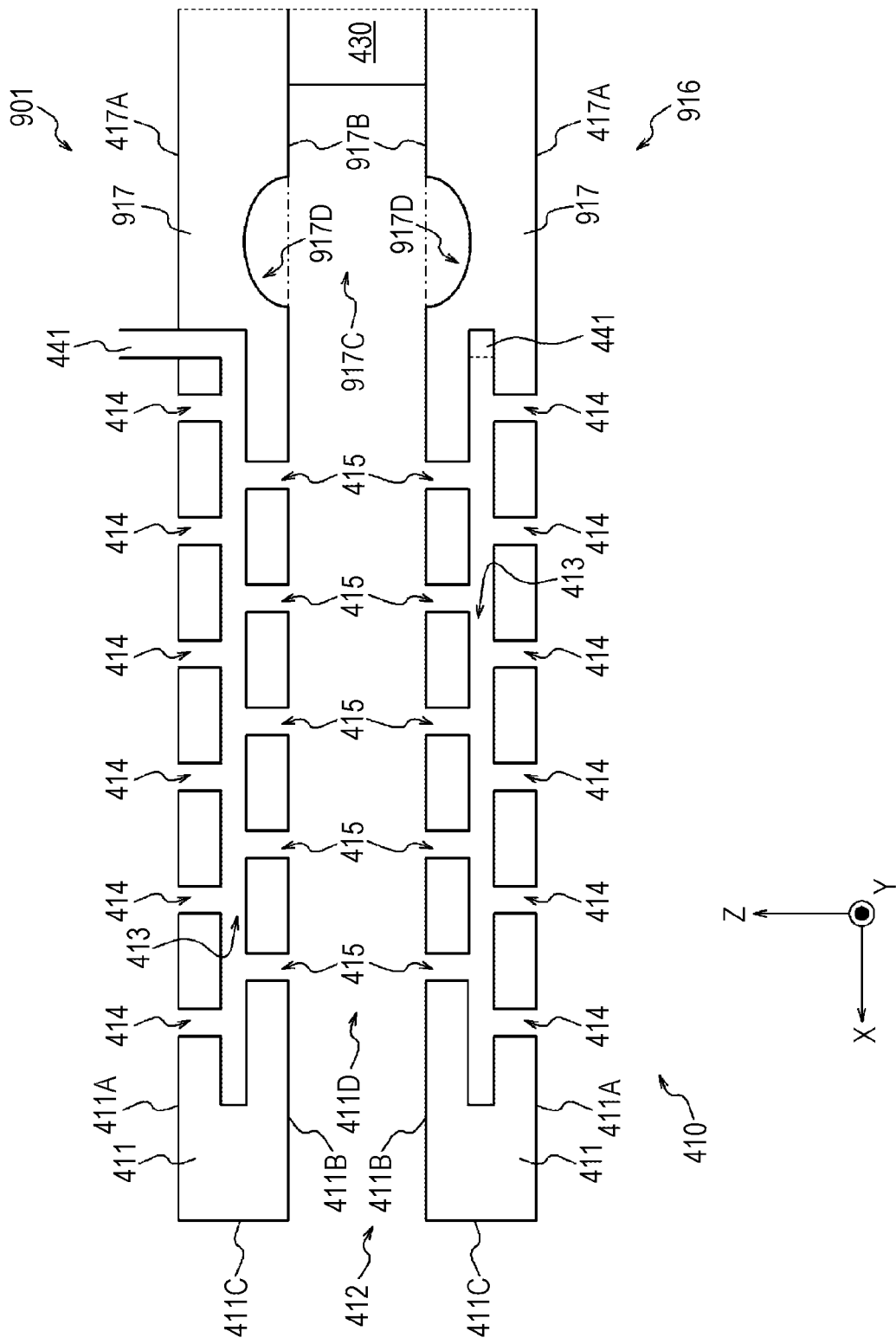
FIG. 42 is a sectional end view of a gas detection device according to a twelfth embodiment of the present disclosure.

FIG. 42 is a sectional end view of a gas detection device 901 according to a twelfth embodiment of the present disclosure. The gas detection device 901 includes a nozzle portion 410, a flow path 413, first outflow holes 414 and second outflow holes 415 as outflow holes, a support portion 916, and a chamber 430. The gas detection device 901 includes, similarly to the gas detection device 401 illustrated in FIG. 30, a blower unit 420, the chamber 430, a supply unit 440, a signal processing unit 450, a communication unit 451, a battery 452, a memory 453, and a control unit 454.

The support portion 916 supports the nozzle portion 410. The support portion 916 may extend in the X direction. For example, the support portion 916 may be substantially parallel to the X direction. The support portion 916 may house various components of the gas detection device 901. The support portion 916 may be formed integrally with the nozzle portion 410. The support portion 916 includes a tubular side wall 917.

The side wall 917 may be circular tubular. The side wall 917 may be made of a material such as metal or resin. The side wall 917 may be formed integrally with a side wall 411 of the nozzle portion 410. The side wall 917 includes an outer surface 417A, an inner surface 917B, a cavity 917C, and a liquid retaining hole 917D.

A portion of the inner surface 917B is recessed toward the outer surface 417A. The liquid retaining hole 917D may be defined as a region surrounded by the recessed portion of the inner surface 917B. The cavity 917C may be defined as a portion of the region surrounded by the inner surface 917B excluding the liquid retaining hole 917D. That is, the shape of the cavity 917C may be the same as the shape of the cavity 417C illustrated in FIG. 29. The cavity 917C is connected to a region 411D of the nozzle portion 410. For example, the cavity 917C and the region 411D are connected to each other such that air can flow therebetween.

The liquid retaining hole 917D is located on an opening 412 side of the nozzle portion 410, that is, on the +X direction side with respect to the chamber 430 in the cavity 917C. That is, the liquid retaining hole 917D is located closer to the opening 412 of the nozzle portion 410 in the cavity 917C than a sensor unit 431 of the chamber 430 located in the cavity 917C. For example, water may flow in the −X direction due to excess water flowing out from the second outflow holes 415. Even in such a case, the water flowing in the −X direction can be retained in the liquid retaining hole 917D. Since the water flowing in the −X direction is retained in the liquid retaining hole 917D, the water can be prevented from further flowing on the −X direction side with respect to the liquid retaining hole 917D. With such a configuration, it is possible to reduce the probability that the sensor unit 431 in the chamber 430 fails due to water reaching the chamber 430 and entering the chamber 430.

The liquid retaining hole 917D may surround the circumference of the cavity 917C. For example, heaters 493 and 494 illustrated in FIG. 40 may be located in the vicinity of the liquid retaining hole 917D. That is, the heaters 493 and 494 may be located at positions at which the water in the liquid retaining hole 917D can be heated by the heaters 493 and 494. In this configuration, before the detection process for the type and concentration of the sample gas, the control unit 454 may cause the heaters 493 and 494 to generate heat via the driver 495. With such a configuration, water retained in the liquid retaining hole 917D can be evaporated by heat from the heaters 493 and 494 before the detection process for the type and concentration of the sample gas. Since the water retained in the liquid retaining hole 917D is evaporated, it is possible to reduce the probability that the water retained in the liquid retaining hole 917D affects the detection process for the type and concentration of the sample gas.

Other effects and configurations of the gas detection device 901 according to the twelfth embodiment are similar to those of the gas detection device 401 according to the seventh embodiment.

Thirteenth Embodiment

A gas detection device according to a thirteenth embodiment will be described. The configuration according to the thirteenth embodiment can be applied to any of the gas detection device 401 according to the seventh embodiment, the gas detection device 501 according to the eighth embodiment, the gas detection device 601 according to the ninth embodiment, the gas detection device 701 according to the tenth embodiment, the gas detection device 801 according to the eleventh embodiment, and the gas detection device 901 according to the twelfth embodiment.

Figure 43:
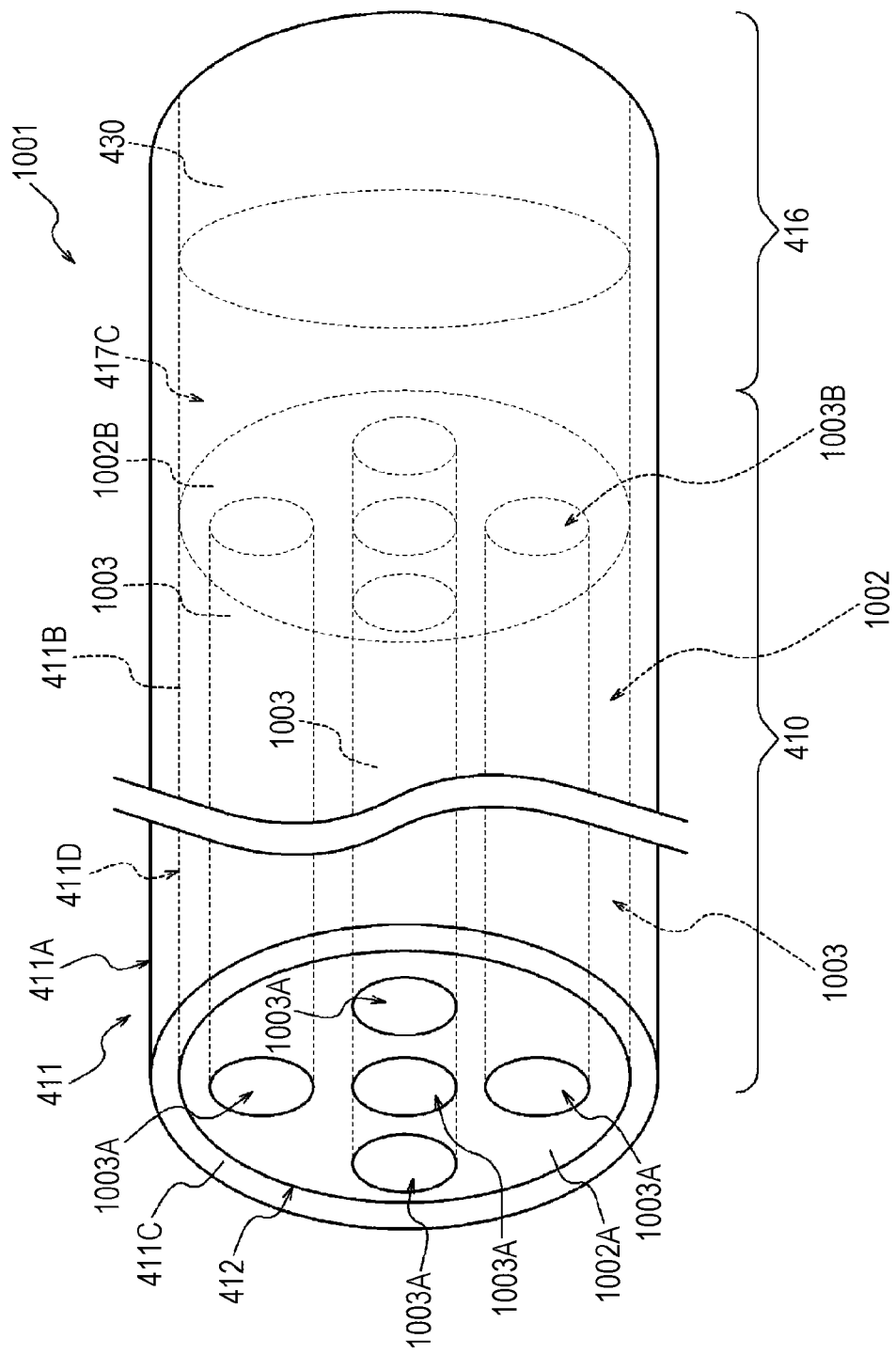
FIG. 43 is an external view of a gas detection device according to a thirteenth embodiment of the present disclosure.

FIG. 43 is an external view of a gas detection device 1001 according to a thirteenth embodiment of the present disclosure. The gas detection device 1001 includes a nozzle portion 410, a support portion 416, a chamber 430, and a member 1002. The gas detection device 1001 includes, similarly to the gas detection device 401 illustrated in FIG. 29, a flow path 413, and first outflow holes 414 and second outflow hole 415 as outflow holes. The gas detection device 1001 includes, similarly to the gas detection device 401 illustrated in FIG. 30, a blower unit 420, the chamber 430, a supply unit 440, a signal processing unit 450, a communication unit 451, a battery 452, a memory 453, and a control unit 454.

The member 1002 is located in a region 411D of a side wall 411 of the nozzle portion 410. The side surface of the member 1002 may be in close contact with an inner surface 411B. The member 1002 includes a front surface 1002A and a back surface 1002B. The member 1002 includes a plurality of tubular members 1003. As illustrated in FIG. 43, the member 1002 includes five tubular members 1003. However, the number of tubular members included in the member 1002 may be four or less, or may be six or more. A portion of the member 1002 excluding the plurality of tubular members 1003 may be made of any material such as metal or resin.

The position of the front surface 1002A in the X direction may coincide with the position of an end portion 411C in the X direction. The shape of the front surface 1002A may be circular. The diameters of the front surface 1002A may be equivalent to the diameter of an opening 412. The front surface 1002A may be coated with a water-repellent material. Examples of the water-repellent material may be the examples described in the seventh embodiment.

The back surface 1002B is located on the +X direction side with respect to the chamber 430. That is, the back surface 1002B is located closer to the opening 412 than the chamber 430.

The tubular members 1003 each are tubular. The diameter of the tubular member 1003 is smaller than the diameter of the opening 412 of the nozzle portion 410. Air from the opening 412 sucked by a pump 421 of the blower unit 420 illustrated in FIG. 30 can pass through the tubular member 1003. For example, as described above, when the blower unit 420 illustrated in FIG. 30 is driven, the gas generated from the feces 406 illustrated in FIG. 27 is drawn toward the nozzle portion 410. The gas drawn toward the nozzle portion 410 is sucked into the nozzle portion 410 as a sample gas. The sample gas sucked into the nozzle portion 410 passes through the tubular members 1003 and reaches the chamber 430. The tubular members 1003 each may be constituted of a resin tube or a metal or glass pipe.

The tubular members 1003 each include an opening 1003A and an opening 1003B. The opening 1003A is located in the front surface 1002A. The opening 1003B is located in the back surface 1002B. The shape of the opening 1003A and the shape of the opening 1003B each may be circular. The diameter of the opening 1003A and the diameter of the opening 1003B are smaller than the diameter of the opening 412.

In the gas detection device 1001 according to the thirteenth embodiment, since the plurality of tubular members 1003 are located inside the nozzle portion 410, the inside of the nozzle portion 410 is divided into reduced-diameter sections. Since the inside of the nozzle portion 410 is divided into the reduced-diameter sections, it is possible to reduce the probability that water flowing out from the first outflow holes 414 illustrated in FIG. 28 enters the inside of the support portion 416. By coating the front surface 1002A with a water-repellent material, it is possible to further reduce the probability that water flowing out from the first outflow holes 414 illustrated in FIG. 28 enters the inside of the support portion 416.

Other effects and configurations of the gas detection device 1001 according to the thirteenth embodiment are similar to those of the gas detection device 401 according to the seventh embodiment.

Fourteenth Embodiment

A gas detection device according to a fourteenth embodiment will be described. The configuration according to the fourteenth embodiment can be applied to any of the gas detection device 401 according to the seventh embodiment, the gas detection device 501 according to the eighth embodiment, the gas detection device 601 according to the ninth embodiment, the gas detection device 701 according to the tenth embodiment, the gas detection device 801 according to the eleventh embodiment, and the gas detection device 901 according to the twelfth embodiment.

Figure 44:
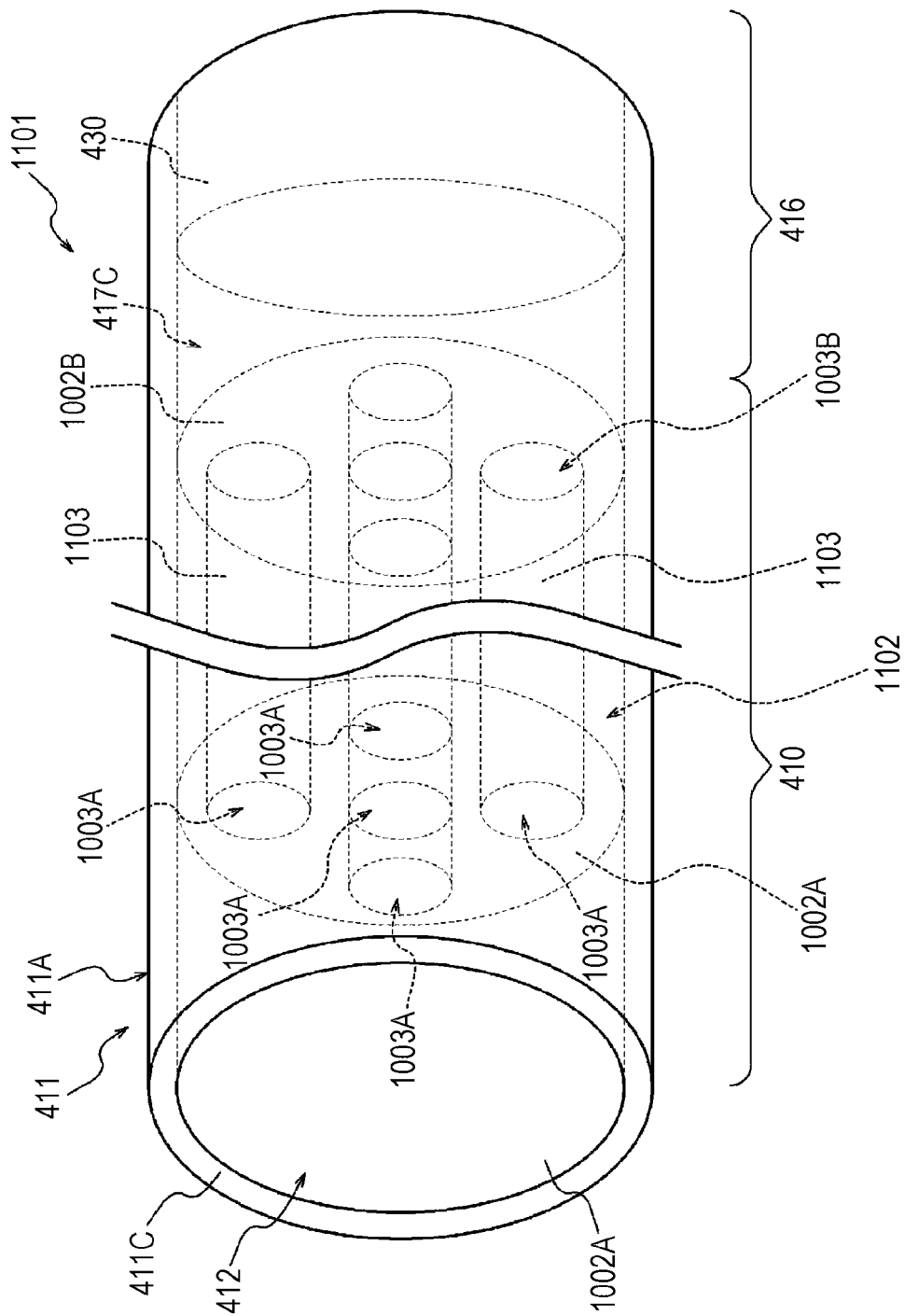
FIG. 44 is an external view of a gas detection device according to a fourteenth embodiment of the present disclosure.

FIG. 44 is an external view of a gas detection device 1101 according to the fourteenth embodiment of the present disclosure. The gas detection device 1101 includes a nozzle portion 410, a support portion 416, a chamber 430, and a member 1102. The gas detection device 1101 includes, similarly to the gas detection device 401 illustrated in FIG. 29, a flow path 413, and first outflow holes 414 and second outflow hole 415 as outflow holes. The gas detection device 1101 includes, similarly to the gas detection device 401 illustrated in FIG. 30, a blower unit 420, the chamber 430, a supply unit 440, a signal processing unit 450, a communication unit 451, a battery 452, a memory 453, and a control unit 454.

The member 1102 is located in a region 411D of a side wall 411 of the nozzle portion 410. The length of the member 1102 in the X direction is smaller than the length of the member 1002 in the X direction illustrated in FIG. 43. Similarly to the member 1002, the side surface of the member 1102 may be in close contact with the inner surface 411B. The member 1102 includes a front surface 1002A and a back surface 1002B. The member 1102 includes a plurality of tubular members 1103. As illustrated in FIG. 44, the member 1102 includes five tubular members 1103. However, the number of tubular members 1103 included in the member 1102 may be four or less, or may be six or more. A portion of the member 1102 excluding the plurality of tubular members 1103 may be made of any material such as metal or resin.

The front surface 1002A is located on the −X direction side with respect to the opening 412. That is, the member 1102 is located between the opening 412 and the chamber 430, and is retracted from the opening 412. The front surface 1002A may be coated with a water-repellent material similarly to the configuration illustrated in FIG. 43. The back surface 1002B is located on the +X direction side with respect to the chamber 430. That is, the back surface 1002B is located closer to the opening 412 than the chamber 430. The position of the back surface 1002B in the X direction may be similar to the configuration illustrated in FIG. 43.

The tubular members 1103 each are tubular. The diameter of the tubular member 1103 is smaller than the diameter of the opening 412 of the nozzle portion 410, similarly to the tubular member 1003 illustrated in FIG. 43. Similarly to the tubular member 1003 illustrated in FIG. 43, the air from the opening 412 sucked by the pump 421 of the blower unit 420 illustrated in FIG. 30 can pass through the tubular members 1103. That is, similarly to the tubular members 1003 illustrated in FIG. 43, the sample gas sucked into the nozzle portion 410 passes through the tubular members 1103 and reaches the chamber 430. The tubular members 1103 each may be constituted of a resin tube or a metal or glass pipe.

The length of the tubular members 1103 in the X direction is smaller than the length of the tubular members 1003 in the X direction illustrated in FIG. 43. The distal end portions of the tubular members 1103 on the +X direction side are located to be retracted from the opening of the nozzle portion 410.

The tubular members 1103 each include an opening 1003A and an opening 1003B. The opening 1003A is located in the front surface 1002A. The opening 1003B is located in the back surface 1002B. The shape of the opening 1003A and the shape of the opening 1003B each may be circular. The diameter of the opening 1003A and the diameter of the opening 1003B are smaller than the diameter of the opening 412.

The gas detection device 1101 according to the fourteenth embodiment can attain effects similar to those of the gas detection device 1001 according to the thirteenth embodiment. Other effects and configurations of the gas detection device 1101 according to the fourteenth embodiment are similar to those of the gas detection device 1001 according to the thirteenth embodiment and the gas detection device 401 according to the seventh embodiment.

Here, the configurations of the fourth embodiment to the sixth embodiment can be summarized in Appendices 1-1 to 1-13 below.

Appendix 1-1

A gas collection device comprising:
at least one gas collector located between a toilet seat and a toilet bowl,
wherein the gas collector includes
an ejector capable of ejecting a carrier gas toward an inside of the toilet bowl, and
an evacuator capable of sucking a gas from the toilet bowl,
wherein the evacuator is located closer to the toilet bowl than the ejector between the toilet seat and the toilet bowl, and
wherein a distal end portion of the evacuator is retracted from a distal end portion of the ejector in a direction from the inside toward an outside of the toilet bowl.

Appendix 1-2

The gas collection device according to Appendix 1-1,
wherein the gas collector is located not to protrude from an inner edge of the toilet seat and an inner edge of the toilet bowl.

Appendix 1-3

The gas collection device according to Appendix 1-1 or Appendix 1-2,
wherein the ejector includes at least one opening that faces the inside of the toilet bowl and through which the carrier gas is ejected.

Appendix 1-4

The gas collection device according to Appendix 1-1 or Appendix 1-2,
wherein the ejector includes
a first opening that faces the inside of the toilet bowl and through which the carrier gas is ejected, and
a second opening that is located between the toilet seat and the toilet bowl and closer to the toilet bowl than the first opening, that faces the inside of the toilet bowl, and through which the carrier gas is ejected, and
wherein a flow velocity of the carrier gas ejected from the first opening is higher than a flow velocity of the carrier gas ejected from the second opening.

Appendix 1-5

The gas collection device according to Appendix 1-1 or Appendix 1-2,
wherein the ejector includes a plurality of nozzles arranged substantially along an inner edge of the toilet bowl.

Appendix 1-6

The gas collection device according to any one of Appendix 1-1 to Appendix 1-5,
wherein the toilet seat includes a left portion located on a left side as viewed from a subject and a right portion located on a right side as viewed from the subject when the subject is sitting on the toilet seat, and
wherein the gas collector is located in at least one of the left portion and the right portion.

Appendix 1-7

The gas collection device according to Appendix 1-6,
wherein the gas collector includes two facing gas collectors,
wherein one of the two gas collectors is located in the left portion, and
wherein the other of the two gas collectors is located in the right portion.

Appendix 1-8

The gas collection device according to any one of Appendix 1-1 to Appendix 1-7,
wherein the evacuator includes a plurality of nozzles.

Appendix 1-9

The gas collection device according to Appendix 1-8,
wherein distal end portions of the plurality of nozzles of the evacuator protrude from a housing of the gas collector.

Appendix 1-10

The gas collection device according to Appendix 1-9,
wherein distal ends of the plurality of nozzles protruding from the housing face the inside of the toilet bowl.

Appendix 1-11

The gas collection device according to any one of Appendix 1-1 to Appendix 1-10, further comprising:
a control unit capable of controlling the ejector and the evacuator.

Appendix 1-12

The gas collection device according to any one of Appendix 1-1 to Appendix 1-10, further comprising:
a sensor unit that outputs a voltage corresponding to a concentration of a specific gas; and
a control unit that acquires a voltage waveform from the sensor unit by alternately supplying a purge gas and a sample gas to the sensor unit at a predetermined cycle, that detects a type and a concentration of a gas included in the sample gas based on the acquired voltage waveform, and that causes the ejector to eject the carrier gas and causes the evacuator to suck the sample gas for a period set based on the predetermined cycle.

Appendix 1-13

A method for controlling a gas collection device including a sensor unit, an ejector, an evacuator, and a control unit, the method comprising:
- the sensor unit outputting a voltage corresponding to a concentration of a specific gas;
- the control unit acquiring a voltage waveform from the sensor unit by alternately supplying a purge gas and a sample gas to the sensor unit at a predetermined cycle, and detecting a type and a concentration of a gas included in the sample gas based on the acquired voltage waveform; and
- the control unit causing the ejector to eject a carrier gas and causing the evacuator to suck the sample gas for a period set based on the predetermined cycle.

The configurations of the seventh embodiment to the fourteenth embodiment can be summarized in Appendices 2-1 to 2-11 below.

Appendix 2-1

A gas detection device comprising:
- a nozzle portion including a tubular side wall and an opening being open toward an inside of a toilet bowl;
- a support portion including a cavity connected to a region surrounded by the side wall and one end portion at which the nozzle portion is located;
- a first pump located in the cavity and being capable of sucking air from the opening toward the cavity;
- a flow path located inside the side wall;
- an outflow hole extending from the flow path toward an outer surface or an inner surface of the side wall; and
- a supply unit capable of supplying a liquid to the flow path.

Appendix 2-2

The gas detection device according to Appendix 2-1, wherein the outflow hole includes
- a first outflow hole extending from the flow path toward the outer surface of the side wall, and
- a second outflow hole extending from the flow path toward the inner surface of the side wall.

Appendix 2-3

The gas detection device according to Appendix 2-1, further comprising:
- a first air passage located inside the support portion, separated from the cavity, and connected to the region;
- a second air passage located on the outer surface of the side wall and having one end portion being open toward a distal end of the nozzle portion;
- a second pump capable of sending out air toward the first air passage and the second air passage; and
- a control unit that causes the supply unit to supply the liquid to the flow path and then causes the second pump to send out the air toward at least one of the first air passage and the second air passage.

Appendix 2-4

The gas detection device according to Appendix 2-3, wherein the control unit causes the second pump to send out the air toward at least one of the first air passage and the second air passage while the first pump is stopped.

Appendix 2-5

The gas detection device according to Appendix 2-1, further comprising:
- a vibration unit capable of generating ultrasonic vibration to be transmitted to at least one of the outer surface and the inner surface of the side wall; and
- a control unit that causes the vibration unit to generate the ultrasonic vibration while causing the supply unit to supply the liquid to the flow path.

Appendix 2-6

The gas detection device according to Appendix 2-1, further comprising:
- a vibration unit capable of generating a surface acoustic wave to be transmitted to the outer surface of the side wall; and
- a control unit that causes the vibration unit to generate the surface acoustic wave while causing the supply unit to supply the liquid to the flow path.

Appendix 2-7

The gas detection device according to Appendix 2-1, further comprising:
- a heat conductor located inside the side wall;
- a heater located inside the side wall and being capable of generating heat to be transferred to the heat conductor; and
- a control unit that causes the supply unit to supply the liquid to the flow path and then causes the heater to generate the heat.

Appendix 2-8

The gas detection device according to Appendix 2-1, further comprising:
- a sensor unit located in the cavity; and
- a liquid retaining hole located closer to the opening than the sensor unit in the cavity.

Appendix 2-9

The gas detection device according to any one of Appendix 2-1 to Appendix 2-8, further comprising:
- a plurality of tubular members through which the air sucked by the first pump from the opening can pass, the plurality of tubular members being disposed in the region,
- wherein a diameter of each of the tubular members is smaller than a diameter of the opening.

Appendix 2-10

The gas detection device according to Appendix 2-9, wherein distal end portions of the plurality of tubular members are retracted from the opening.

Appendix 2-11

The gas detection device according to any one of Appendix 2-1 to Appendix 2-10, wherein at least one of the outer surface and the inner surface of the side wall is coated with a water-repellent material.

Although the embodiments according to the present disclosure have been described based on the drawings and examples, it should be noted that various modifications and corrections can be easily made by those skilled in the art based on the present disclosure. Accordingly, it should be noted that these modifications and corrections fall within the scope of the present disclosure. For example, the functions or the like included in the respective components or the like can be rearranged not to be logically contradictory, and a plurality of components or the like can be combined into one or divided.

For example, in the above-described embodiments, as illustrated in FIGS. 4 and 9, the central axis of the flow path 62 has been described as coinciding with the central axis A. However, the central axis of the flow path 62 may not coincide with the central axis A. As illustrated in FIGS. 4 and 9, the center of the first opening 63a has been described as being located on the central axis A. However, the center of the first opening 63a may not be located on the central axis A. As illustrated in FIG. 9, the rotating shaft of the fan of the blower 65 has been described as coinciding with the center of the first opening 63a. However, the rotating shaft of the fan of the blower 65 may not coincide with the center of the first opening 63a.

For example, in the above-described embodiment, the central axis A illustrated in FIGS. 4 and 9 has been described as being substantially parallel to the back surface of the toilet seat 2B illustrated in FIG. 2. However, the central axis A may not be substantially parallel to the back surface of the toilet seat 2B illustrated in FIG. 2. For example, as illustrated in FIG. 10, the central axis A may be inclined toward a direction in which feces 90 are assumed to be located in the toilet bowl 2A. The feces 90 can be located at a bottom portion of the toilet bowl 2A.

For example, in the above-described embodiment, as illustrated in FIG. 6, the gas detection system 1 has been described as one device. However, the gas detection system of the present disclosure is not limited to one device and may include a plurality of independent devices. The gas detection system of the present disclosure may be configured as illustrated in FIG. 11, for example.

Figure 11:
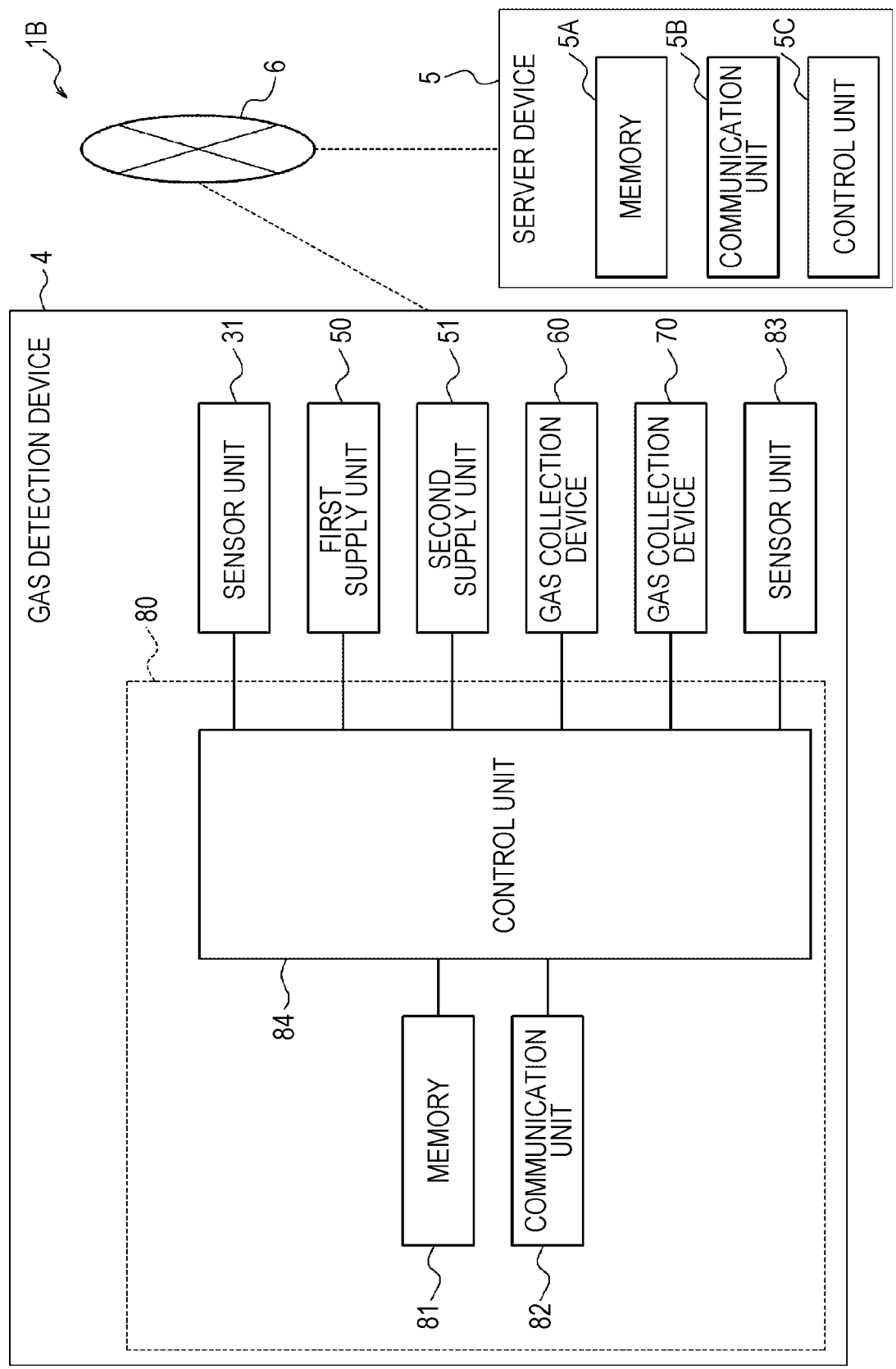
FIG. 11 is a functional block diagram of a gas detection system according to a modification of the present disclosure.

A gas detection system 1B illustrated in FIG. 11 includes a gas detection device 4 and a server device 5. The gas detection device 4 and the server device 5 can communicate with each other via a network 6. Part of the network 6 may be wired or wireless. The configuration of the gas detection device 4 is similar to the configuration of the gas detection system 1 illustrated in FIGS. 5 and 6. The server device 5 includes a memory 5A, a communication unit 5B, and a control unit 5C. The control unit 5C can execute the process of the control unit 84 illustrated in FIG. 6 described above. For example, the control unit 5C can acquire the voltage waveform output from the sensor unit 31 illustrated in FIG. 5 via the communication unit 5B and the network 6. The control unit 5C can detect the type and concentration of the gas included in the sample gas based on the voltage waveform.

For example, in the above-described fourth embodiment, in the top view illustrated in FIG. 12, the position at which the gas collector 110 is located is each of the left portion 102L and the right portion 102R of the toilet seat 102. However, the position at which the gas collector 110 is located is not limited to the above-described positions. The gas collector 110 may be located at any position of the toilet seat 102 in a top view. Other examples of the position at which the gas collector 110 is located are, in the top view illustrated in FIG. 12, a gently protruding area located on the negative direction side of the Y axis of the toilet seat 102, a gently protruding area located on the positive direction side of the Y axis of the toilet seat 102, and the like.

For example, in the sixth embodiment described above, as illustrated in FIG. 23, the nozzle 321 of the ejector 320 has been described not to protrude from the housing 111. However, the nozzle 321 may protrude from the ejector 320. In this case, the nozzle 321 may be inclined toward the negative direction side of the Z axis.

For example, in the seventh to eighth embodiments described above, as illustrated in FIG. 27, the gas detection device 401 and the nozzle portion 410 have been described as being substantially parallel to the X direction. However, the shapes of the gas detection device 401 and the nozzle portion 410 are not limited to the shapes illustrated in FIG. 27. FIG. 45 is a schematic view of a gas detection device 401a according to a modification of the present disclosure. The gas detection device 401a includes a nozzle portion 410a. An end portion on the +X direction side of the nozzle portion 410a protrudes downward to the inside of a toilet bowl 404. An end portion on the +X direction side of the gas detection device 401a is bent in the −Z direction.

For example, each of the gas detection devices according to the seventh to eighth embodiments described above may further include, for example, the following mechanism for focusing and heating feces. Since the following heating mechanism is provided, the gas detection accuracy and the like can be further improved. The mechanism for intensively heating the feces may be, for example, a linear or dot-shaped heater built in the toilet bowl 404, a heating lamp disposed below or another position of the toilet seat 403, or a laser or a LED (Light. Emitting Diode) disposed below or another position of the toilet seat 403. Here, a heating resistor having a mesh shape or the like may be employed as the heater. The laser and the LED may be configured to emit light having a wavelength that is hardly absorbed by water and ammonia. Since such a heating mechanism is added, it is possible to prevent water other than feces, such as urine, from being heated as much as possible. Substances having relatively high boiling points such as acetic acid, lactic acid, and butyric acid in feces, which are difficult to vaporize at room temperature, are also vaporized. With such a configuration, the gas detection device can accurately detect a gas.

The drawings for explaining the embodiments according to the present disclosure are schematic. Dimensional ratios and the like in the drawings do not necessarily correspond to actual ones.

In the present disclosure, descriptions such as "first" and "second" are identifiers for distinguishing the configurations. In the present disclosure, the components distinguished by the descriptions such as "first" and "second" may be numbered interchangeably. For example, the first supply unit and the second supply unit can exchange the identifiers "first" and "second" with each other. The exchange of identifiers takes place simultaneously. Even after the exchange of the identifiers, the configurations are distinguished. The identifier may be deleted. The configuration from which the identifier is deleted is distinguished by a reference numeral. Note that only the descriptions of identifiers such as "first" and "second" in the present disclosure should not be used as a basis for interpreting the order of the components or for determining the presence of identifiers with smaller numbers.

REFERENCE SIGNS LIST 1, 1A, 1A gas detection system
2 toilet
2A toilet bowl
2A1 rim portion
2B toilet seat
2B1 cushion
3 display device
3A display unit
4 gas detection device
5 server device
5A memory
5B communication unit
5C control unit
6 network
10 housing
20, 21 flow path
22 discharge path
30 chamber
31 sensor unit
40 first storage tank (predetermined tank)
41 second storage tank
50 first supply unit
51 second supply unit
60, 60A, 60B gas collection device
61 housing
62 flow path
63 introduction portion
63a first opening
63b second opening
63c introduction surface
63a1, 63b1 opening end
64 seat member
65 blower
70 gas collection device
80 circuit board
81 memory
82 communication unit
83 sensor unit
84 control unit
90 feces
101, 201, 301 gas collection device
102 toilet seat
102A inner edge
102R right portion
102L left portion
103 toilet bowl
103A inner edge
103B outer edge
103C inner surface
104 cushion
105 buttocks
105R right buttock
105L left buttock
106 feces
110, 110-1, 110-2, 210, 310 gas collector
111 housing
111A, 111B front surface
111C, 111D, 111E, 111F inner peripheral surface
111C1, 111D1, 111E1, 111F1 end portion
120, 220, 320, 420a ejector
121 flow path
1122 opening
123 blower
130, 330, 330a evacuator
131, 331, 331a nozzle
132 blower
140, 150 storage unit
141, 151 storage tank
142, 152 pump
160 sensor unit
161 memory
162 communication unit
163 control unit
221, 223, 224 flow path
222 adjustment member
222A, 222B outer peripheral surface
222A1, 222B1 end portion
225 first opening
226 second opening
321 nozzle
321A inner peripheral surface
322 needle
401, 401a, 501, 601, 701, 801, 901, 1001, 1101 gas detection device
402 toilet
403 toilet seat
404 toilet bowl
405 buttocks
406 feces
410, 410a nozzle portion
411 side wall
411A outer surface
411B inner surface
411C end portion
411D region
412 opening
413 flow path
414 first outflow hole (outflow hole)
415 second outflow hole (outflow hole)
416, 516, 916 support portion
417, 517, 917 side wall
417A, 517A outer surface
417B, 517B, 917B inner surface
517C outer surface
417C, 517D, 917C cavity
917D liquid retaining portion
420 blower unit
421 pump (first pump)
422 driver
430 chamber
431 sensor unit
440 supply unit
441 water pipe
442 tank
443 flow path
444 pump
445 driver
450 signal processing unit
451 communication unit
452 battery
453 memory
454 control unit 460 blower unit
461 air passage (first air passage)
462 air passage (second air passage)
463 air passage
464 air passage
465 pump (second pump)
466 driver
470 vibration generation unit
471, 471A, 471B, 471C, 471D vibration unit
475, 475A, 475B, 475C, 475D wire
476 driver
472A, 472B, 472C, 472D cavity
473A, 473B, 473C, 473D vibrator
474A, 474B, 474C, 474D deflector
480 vibration generation unit
481, 481A, 481B vibration unit
485, 485A, 485B, 486, 486A, 486B wire
487 driver
482 piezoelectric substrate
483, 484 electrode
483a, 484a end portion
490 heat generation unit
491, 492 heat conductor
493, 494 heater
495 driver
1002, 1003 member
1002A front surface
1002B back surface
1003, 1103 tubular member
1003A, 1003B opening
R toilet room

The invention claimed is:

1. A gas collection device including a toilet seat and a toilet bowl, the gas collection device comprising:
   a flow path connected to a predetermined tank; and
   an introducer that introduces a sample gas into the flow path and that is located between the toilet seat and the toilet bowl, wherein the introducer includes
      a first opening connected to the flow path,
      a second opening having an opening area larger than an opening area of the first opening, and
      an introduction surface that connects the first opening and the second opening, wherein the introducer
   does not protrude toward an inside of the toilet bowl from a rim portion of the toilet bowl.

2. The gas collection device according to claim 1, wherein the introduction surface has an inner diameter that gradually decreases from the second opening toward the first opening.

3. A gas collection device including a toilet seat and a toilet bowl, the gas collection device comprising:
   a flow path connected to a predetermined tank;
   an introducer that introduces a sample gas into the flow path and is located between the toilet seat and the toilet bowl, wherein the introducer does not protrude toward an inside of the toilet bowl from a rim portion of the toilet bowl; and
   a blower facing the introducer and capable of blowing the sample gas to the introducer.

4. A gas detection system comprising:
   a sensor unit that outputs a voltage corresponding to a concentration of a specific gas; and
   a gas collection device that collects a sample gas to be supplied to the sensor unit,
   wherein the gas collection device includes a toilet with a toilet seat and a toilet bowl, the gas collection device including
   a flow path connected to a predetermined tank, and
   an introducer that introduces the sample gas into the flow path and that is located between the toilet seat and the toilet bowl, wherein the introducer includes
      a first opening connected to the flow path,
      a second opening having an opening area larger than an opening area of the first opening, and
      an introduction surface that connects the first opening and the second opening, and
   wherein the introducer
   does not protrude toward an inside of the toilet bowl from a rim portion of the toilet bowl.

5. The gas collection device according to claim 1, wherein a distal end of the introducer is separated from an inside rim of the toilet seat and adjacent to an outside rim of the toilet seat.

6. The gas collection device according to claim 1, wherein a distal end of the introducer is the second opening.

7. The gas collection device according to claim 1, wherein a distal end of the introducer is separated from an inside of the rim portion of the toilet bowl and adjacent to an outside of the rim portion of the toilet bowl.

8. The gas collection device according to claim 1, wherein a central axis of the flow path is inclined with respect to an back surface of the toilet seat.

9. The gas collection device according to claim 1, wherein a central axis of the flow path is inclined with respect to a back surface of the toilet seat so as to direct a bottom of the toilet bowl.

* * * * *